United States Patent
Tsukada

(10) Patent No.: US 10,562,514 B2
(45) Date of Patent: Feb. 18, 2020

(54) POWER TRANSMISSION APPARATUS AND VEHICLE, AND POWER TRANSMISSION CONTROL METHOD

(71) Applicant: HONDA MOTOR CO., LTD., Tokyo (JP)

(72) Inventor: Yoshinari Tsukada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/538,805

(22) PCT Filed: Dec. 16, 2015

(86) PCT No.: PCT/JP2015/085208
§ 371 (c)(1),
(2) Date: Jun. 22, 2017

(87) PCT Pub. No.: WO2016/104281
PCT Pub. Date: Jun. 30, 2016

(65) Prior Publication Data
US 2017/0355359 A1    Dec. 14, 2017

(30) Foreign Application Priority Data

Dec. 26, 2014 (JP) .................. 2014-266414
Dec. 26, 2014 (JP) .................. 2014-266415
(Continued)

(51) Int. Cl.
*B60W 20/10* (2016.01)
*B60K 6/365* (2007.10)
(Continued)

(52) U.S. Cl.
CPC .............. *B60W 20/10* (2013.01); *B60K 6/26* (2013.01); *B60K 6/365* (2013.01); *B60K 6/387* (2013.01);
(Continued)

(58) Field of Classification Search
CPC ............ Y10T 477/26; F16H 2200/202; F16H 2200/2094; F16H 3/728; F16H 3/727;
(Continued)

(56) References Cited

U.S. PATENT DOCUMENTS

| 7,503,870 B2 * | 3/2009 | Tabata | ...................... B60K 6/40 477/3 |
| 8,414,436 B2 * | 4/2013 | Holmes | .................. B60K 6/365 180/65.23 |

(Continued)

FOREIGN PATENT DOCUMENTS

| JP | 4046035 B2 | 2/2008 |
| JP | 2010-254179 A | 11/2010 |

(Continued)

OTHER PUBLICATIONS

International Search Report dated Mar. 15, 2016, issued in counterpart International Application No. PCT/JP2015/085208 (2 pages).

*Primary Examiner* — Roger L Pang
(74) *Attorney, Agent, or Firm* — Westerman, Hattori, Daniels & Adrian, LLP

(57) ABSTRACT

A power transmission apparatus has a power distribution mechanism which is connected to an engine and a first motor-generator an in which at least three rotation elements enable to rotate in differential motions to one another, a power combining mechanism which is connected to the power distribution mechanism, a second motor-generator and an output shaft and in which four rotation elements enable to rotate in differential motions to one another, a (Continued)

brake mechanism which enables to selectively fix a rotation element of the power combining mechanism and a brake mechanism which enables to selectively fix a rotation element of the power combining mechanism which is connected to the engine.

18 Claims, 72 Drawing Sheets

(30) Foreign Application Priority Data

Dec. 26, 2014 (JP) .................................. 2014-266416
Dec. 26, 2014 (JP) .................................. 2014-266417

(51) Int. Cl.
| | |
|---|---|
| *B60K 6/445* | (2007.10) |
| *B60K 6/547* | (2007.10) |
| *B60K 6/26* | (2007.10) |
| *B60K 6/44* | (2007.10) |
| *B60W 10/08* | (2006.01) |
| *B60W 10/115* | (2012.01) |
| *F16H 3/72* | (2006.01) |
| *B60K 6/387* | (2007.10) |

(52) U.S. Cl.
CPC ............... *B60K 6/44* (2013.01); *B60K 6/445* (2013.01); *B60K 6/547* (2013.01); *B60W 10/08* (2013.01); *B60W 10/115* (2013.01); *F16H 3/727* (2013.01); *F16H 3/728* (2013.01); *B60W 2510/105* (2013.01); *B60W 2520/10* (2013.01); *B60W 2710/1005* (2013.01); *B60Y 2200/92* (2013.01); *B60Y 2400/73* (2013.01); *F16H 2200/202* (2013.01); *F16H 2200/2094* (2013.01); *Y02T 10/6239* (2013.01); *Y10S 903/906* (2013.01); *Y10S 903/911* (2013.01); *Y10S 903/919* (2013.01); *Y10T 477/26* (2015.01)

(58) Field of Classification Search
CPC .... B60W 20/10; B60W 10/08; B60W 10/115; B60W 2510/105; B60W 2520/10; B60W 2710/1005; Y02T 10/6239; B60K 6/26; B60K 6/44; B60K 6/387; B60K 6/547; B60K 6/445; B60K 6/365; Y10S 903/911; Y10S 903/919; Y10S 903/906; B60Y 2200/92; B60Y 2400/73
USPC .......................................................... 475/5
See application file for complete search history.

(56) References Cited

U.S. PATENT DOCUMENTS

| | | | |
|---|---|---|---|
| 8,721,482 B2* | 5/2014 | Takami | B60K 6/445 475/282 |
| 2008/0125264 A1* | 5/2008 | Conlon | B60K 6/365 475/5 |
| 2008/0207374 A1* | 8/2008 | Iwanaka | B60L 58/12 475/5 |
| 2009/0098969 A1* | 4/2009 | Tabata | B60L 50/16 475/5 |
| 2009/0156351 A1* | 6/2009 | Brouwer | B60K 6/445 475/221 |
| 2011/0245003 A1* | 10/2011 | Takami | B60K 6/365 475/5 |
| 2013/0165286 A1* | 6/2013 | Scholz | B60K 6/445 475/5 |

FOREIGN PATENT DOCUMENTS

| | | |
|---|---|---|
| JP | 4779935 B2 | 9/2011 |
| JP | 2013-159212 A | 8/2013 |
| JP | 2013-203259 A | 10/2013 |
| JP | 2014-151874 A | 8/2014 |

* cited by examiner

FIG. 2

| Driving mode | | Applying/releasing elements | Power distribution mechanism | | | | Selection mechanism | | | Power combining mechanism | | Driving devices | | |
|---|---|---|---|---|---|---|---|---|---|---|---|---|---|---|
| | | Connecting elements | B1 ENG | B2 MG1 | B3 — | B4 (SL) | SL | SH | SM | B5 MG2 | B6 — | ENG | MG1 | MG2 |
| EV driving | 2MOT Lo | | O | | | | O (EV mode) | | | | | Stopped | O | O |
| | 2MOT Hi | | O | | | | | O | | | | Stopped | O | O |
| | 2MOT Rev | | O | | | | | O | | | O | Stopped | O | O |
| | 1MOT Fwd | | O | | | | | O | | O | | Stopped | O | Stopped |
| | 1MOT Rev | | O | | | | | O | | O | | Stopped | O | Stopped |
| Power distribution / combination driving | 2MOT Lo | | | | | | O (Electric CVT mode) | | | | | O | O | O |
| | 2MOT Hi | | | | | | | O | | | | O | O | O |
| | 2MOT Rev | | | | O | | | | | | O | O | O | O |
| Hybrid driving (Fixed gear mode) | Gears 3 | | | | | | | O | | | O | O | O | O |
| | Gears 5 | | | O | | | | O | O | | | O | O | O |
| | Gears 6 | | | O | | | | | O | O | | O | O | O |
| | Gears 8 | | | O | | O | | | | O | | O | O | O |
| Fixed gear driving | Gears 1 | × | | O | | | | | | O | | O | Stopped | O |
| | Gears 2 (Mechanical pass 100% driving) | O | | O | | | | | | | O | O | Stopped | Stopped |
| | Gears 3 | × | | O | | | | | | | O | O | Stopped | O |
| | Gears 5 (Mechanical pass 100% driving) | O | | O | | | | O | | | O | O | Stopped | Stopped |
| | Gears 4 | × | | O | | | | | O | | O | O | Stopped | O |
| | Gears 7 (Mechanical pass 100% driving) | O | | O | | | | | O | | O | O | Stopped | Stopped |

FIG.66

| Driving mode | | Applying/releasing elements | Power distribution mechanism | | | | Selection mechanism | | | Power combining mechanism | | Driving devices | | |
|---|---|---|---|---|---|---|---|---|---|---|---|---|---|---|
| | | Connecting elements | B1 ENG | B2 MG1 | B3 – | B4 (SL) | SL | SH | SM | B5 MG2 | B6 – | ENG | MG1 | MG2 |
| EV driving | 2MOT | Lo | O | | | | | O | | | | Stopped | O | O |
| | | Hi | O | | | | | O | | | O | Stopped | O | O |
| | | Rev. | O | | | | | O | | | | Stopped | O | O |
| | 1MOT | Fwd. | O | | | | | O | | O | | Stopped | O | Stopped |
| | | Rev. | O | | O | | | O | | O | | Stopped | O | Stopped |
| Power distribution/combination driving | 2MOT | Lo | | O | | O | | | | | | O | O | O |
| | | Hi | | O | | O | | | | | O | O | O | O |
| | | Rev. | | O | O | | | | | | | O | O | O |
| Fixed gear driving (Partially parallel HEV) | Hybrid driving | Gears | | | | | | | | | | | | |
| O | | 3 | | | | O | | | O | O | | O | O | O |
| O | | 5 | | | | O | | | O | O | O | O | O | Stopped |
| O | | 6 | | | | O | | | O | | O | O | O | O |
| O | | 8 | | | | O | | | O | O | | O | O | Stopped |
| × | | 3 | | | | | | | O | O | O | O | Stopped | Stopped |
| O | | 5 | | | | | | | O | O | O | O | Stopped | O |
| × | | 4 | | | | | | | O | O | O | O | Stopped | Stopped |
| × | | 7 | | | | | | | O | O | O | O | Stopped | Stopped |

Mechanical pass 100% driving (rows 5 and 7 marked)

| Driving mode | Applying/releasing elements Connecting elements | Power distribution mechanism B1 ENG | B3 | B4 | Power combining mechanism B6 | Driving devices ENG | MG1 | MG2 |
|---|---|---|---|---|---|---|---|---|
| EV driving | 2MOT Lo | O | — | — | — | Stopped | O | O |
| EV driving | 2MOT Hi | O | — | — | — | Stopped | O | O |
| EV driving | 2MOT Rev | O | O | — | — | Stopped | O | O |
| | | EV mode | | | | | | |
| Power distribution /combination driving | 2MOT Lo | | | | O | O | O | O |
| Power distribution /combination driving | 2MOT Hi | | | | | O | O | O |
| Power distribution /combination driving | 2MOT Rev | | | | O | O | O | O |
| | | Electric CVT mode | | | | | | |
| Fixed gear driving | Hybrid driving Gears | | | O | | O | O | O |
| Fixed gear driving | 6 | | | | | | | O |
| | | Fixed gear mode (Partially parallel HEV) | | | | | | |

| Driving mode | Applying/releasing elements Connecting elements | Power distribution mechanism B1 ENG | Power distribution mechanism B3 - | Power combining mechanism B6 - | Driving devices ENG | Driving devices MG1 | Driving devices MG2 |
|---|---|---|---|---|---|---|---|
| EV driving | 2MOT Lo | O | | O | Stopped | O | O |
| EV driving | 2MOT Hi | O | | | Stopped | O | O |
| EV driving | 2MOT Rev. | O | | O | Stopped | O | O |
| | | | | EV mode | | | |
| Power distribution/ combination driving | 2MOT Lo | | | O | O | O | O |
| Power distribution/ combination driving | 2MOT Hi | | | | O | O | O |
| Power distribution/ combination driving | 2MOT Rev. | | O | | O | O | O |
| | | | | Electric CVT mode | | | |

| Driving mode | | | Power distribution mechanism | | | Power combining mechanism | Driving devices | | |
|---|---|---|---|---|---|---|---|---|---|
| | Applying/releasing elements | | B1 | B3 | CL | B6 | | | |
| | Connecting elements | | ENG | - | | - | ENG | MG1 | MG2 |
| EV driving | 2MOT | | EV mode | | | | | | |
| | | Lo | ○ | | | ○ | Stopped | ○ | ○ |
| | | Hi | ○ | | | | Stopped | ○ | ○ |
| | | Rev. | ○ | | | ○ | Stopped | ○ | ○ |
| Power distribution/ combination driving | 2MOT | | Electric CVT mode | | | | | | |
| | | Lo | | | | ○ | ○ | ○ | ○ |
| | | Hi | | | | | ○ | ○ | ○ |
| | | Hi direct connection | | | ○ | | ○ | ○ | ○ |
| | | Rev. | | ○ | | | ○ | ○ | ○ |

*FIG. 72*

POWER TRANSMISSION APPARATUS AND VEHICLE, AND POWER TRANSMISSION CONTROL METHOD

TECHNICAL FIELD

The present invention relates to a power transmission apparatus suitable for a vehicle which enables to be driven by means of power of an electric motor and a vehicle having the same power transmission apparatus, and a power transmission control method for the vehicle.

BACKGROUND ART

There are known hybrid electric vehicles which run on a combination of the power of an internal combustion engine and the power of an electric motor to thereby exhibit a good fuel economy (refer to, for example, patent literatures 1, 2). Among those hybrid electric vehicles, in hybrid electric vehicles referred to as a plug-in hybrid electric vehicle or an range extender EV which has an EV drive mode in which the vehicle can run only on the power of an electric motor, in order to make the fuel economy compatible with the driving performance of the vehicle, it is proposed to increase an area on a driving force curve where the electric motor can assist in the EV drive mode. Namely, if the EV drive mode in which the vehicle runs on the driving force of the electric motor can cope with a various types of driving from a low speed and high torque driving performed, for example, when the vehicle starts from a standstill to a high speed and low torque driving performed, for example, when the vehicle cruises at high speeds, the utilization of the internal combustion engine can be suppressed to as low a level as possible, which can improve the fuel economy remarkably. This is not limited to hybrid electric vehicles, and in case the area on the driving force curve where the electric motor can assist in the EV mode is also increased on electric vehicles, the driving performance thereof can be improved.

PRIOR ART LITERATURE

Patent Literature

Patent Literature 1: JP-B-4046035
Patent Literature 2: JP-B-4779935

SUMMARY OF THE INVENTION

Problem that the Invention is to Solve

In these hybrid electric vehicles and electric vehicles, in case an electric motor suitable for low speed and high torque driving and an electric motor suitable for high speed and low torque driving are installed in such a way that the electric motors can be selected for use depending upon situations, a various types of driving from low speed and high torque driving performed, for example, when the vehicle is started from a stand still to high speed and low torque driving performed, for example, when the vehicle cruises at high speeds can be attained by the EV driving mode. However, in case the electric motor suitable for low speed and high torque driving and the electric motor suitable for high speed and low torque driving are installed together, there are caused fears that the overall space, cost and weight of the electric motors are increased.

Patent literatures 1, 2 disclose hybrid electric vehicles equipped with two electric motors. In a hybrid electric vehicle described in patent literature 1, a one-motor EV driving is enabled in which one of two electric motors can be used. In other words, the other electric motor of the two electric motors is mainly used as a generator, and the configuration does not allow the powers of the two electric motors to be combined together.

In a hybrid electric vehicle described in patent literature 2, a high speed and low torque high Hi mode driving is possible in which two electric motors are used. However, a low speed and high torque low Lo mode driving is not possible in which only one of the two electric vehicles is used. Consequently, the performance of the one of the two electric motors becomes dominant, and hence, the two EV driving modes exhibiting different driving force characteristics cannot be attained by making effective use of the two electric motors.

Additionally, should a case be considered in which with a general planetary gear mechanism used, one of the two electric motors is connected to one of a sun gear and a ring gear, the other electric motor of the two electric motors is connected to the other of the sun gear and the ring gear, and an output shaft is connected to a carrier, different revolution speeds can be transmitted to the output shaft by combining the powers of the two electric motors. Even in this case, however, since almost the same torques are transmitted to the output shaft, a request for a torque increase cannot be satisfied, and there still remains room for improvement in providing greatly different driving force characteristics during EV driving.

The invention has been made in view of the problems that have been described heretofore, and an object thereof is to provide a power transmission apparatus and a vehicle, and a power transmission control method which can realize a plurality of EV driving modes having different driving force characteristics while avoiding an increase in overall space, cost and weight of electric motors.

Means for Solving the Problem

The invention provides the following aspects.

According to a first aspect, there is provided a power transmission apparatus (for example, power transmission apparatuses 100, 100B to 100F in embodiments which will be described later) which has:

an internal combustion engine (for example, an engine ENG in the embodiments which will be described later);

a first electric motor (for example, a first motor-generator MG1 in the embodiments which will be described later); a second electric motor (for example, a second motor-generator in the embodiments which will be described later);

a power distribution mechanism (for example, a power distribution mechanism 1 in the embodiments which will be described later) including a first differential transmission (for example, a planetary gear mechanism 10 or a planetary gear mechanism 10 and a planetary gear mechanism 20 in the embodiments which will be described later) which is connected to the internal combustion engine and the first electric motor and in which at least three rotation elements (for example, rotation elements a to d in the embodiments which will be described later) enable to rotate in differential motions to one another;

a power combining mechanism (for example, a power combining mechanism 2 in the embodiments which will be described later) including a second differential transmission (for example, a planetary gear mechanism 30 in the embodiments which will be described later) which is connected to the power distribution mechanism, the second electric motor and an output shaft (for example, an output shaft OUT in the embodiments which will be described later) and in which four rotation elements (for example, rotation elements e to h in the embodiments which will be described later) enable to rotate in differential motions to one another;

a first fixing mechanism (for example, a sixth brake mechanism B6 in the embodiments which will be described later) which enables to fix selectively any one of the rotation elements of the power combining mechanism so as not to rotate; and a second fixing mechanism (for example, a first brake mechanism B1 in the embodiments which will be described later) which enables to fix selectively a rotation element (for example, the rotation element c in the embodiments which will be described later) of the power distribution mechanism which is connected to the power distribution mechanism so as not to rotate, wherein the power combining mechanism is configured so that the rotation element (for example, the rotation element e in the embodiments which will be described later) which is connected to the power distribution mechanism, the rotation element (for example, the rotation element f in the embodiments which will be described later) which is connected to the output shaft, the rotation element (for example, the rotation element g in the embodiments which will be described later) which is connected to either of the second electric motor and the first fixing mechanism, and the rotation element (for example, the rotation element h in the embodiments which will be described later) which is connected to the other of the second electric motor and the first fixing mechanism are aligned sequentially in that order on a nomographic chart.

According to a second aspect, in the power transmission apparatus according to the first aspect, the power combining mechanism is configured so that the rotation element (for example, the rotation element e in the embodiments which will be described later) which is connected to the power distribution mechanism, the rotation element (for example, the rotation element f in the embodiments which will be described later) which is connected to the output shaft, the rotation element (for example, the rotation element g in the embodiments which will be described later) which is connected to the first fixing mechanism, and the rotation element (for example, the rotation element h in the embodiments which will be described later) which is connected to the second electric motor are aligned sequentially in that order on a nomographic chart.

According to a third aspect, in the power transmission apparatus according to the first aspect, the power distribution mechanism has three rotation elements, and the power distribution mechanism is configured so that the rotation element (for example, the rotation element a in the embodiments which will be described later) which is connected to the first electric motor, the rotation element (for example, the rotation element c in the embodiments which will be described later) which is connected to the internal combustion engine, and the rotation element (for example, the rotation element d in the embodiments which will be described later) which is connected to the power combining mechanism are aligned sequentially in that order on a nomographic chart.

According to a fourth aspect, in the power transmission apparatus according to the second aspect, the power combining mechanism has four rotation elements, and the apparatus has a third fixing mechanism (for example, a fourth brake mechanism B4 in the embodiments which will be described later) which enables to fix selectively the rotation element of the power distribution mechanism which is connected to neither the internal combustion engine nor the first electric motor so as not to rotate.

According to a fifth aspect, in the power transmission apparatus according to the fourth aspect, the power combining mechanism is configured so that the rotation element (for example, the rotation element a in the embodiments which will be described later) which is connected to the first electric motor, the rotation element (for example, the rotation element b in the embodiments which will be described later) which is connected to the third fixing mechanism, the rotation element (for example, the rotation element c in the embodiments which will be described later) which is connected to the internal combustion engine, and the rotation element (for example, the rotation element d in the embodiments which will be described later) which is connected to none of the first electric motor, the third fixing mechanism and the internal combustion engine are aligned sequentially in that order on a nomographic chart.

According to a sixth aspect, in the power transmission apparatus according to the fifth aspect, the rotation element which is connected to none of the first electric motor, the third fixing mechanism and the internal combustion engine is connected to the power combining mechanism.

According to a seventh aspect, the power transmission apparatus according to the sixth aspect further has:

a first connecting mechanism (for example, a selection mechanism 3 in the embodiments which will be described later) which enables to selectively connect the rotation element (for example, the rotation element e in the embodiments which will be described later) of the power combining mechanism which is connected to the power distribution mechanism to at least the rotation element (for example, the rotation element d in the embodiments which will be described later) which is connected to none of the first electric motor, the third fixing mechanism and the internal combustion engine in the rotation elements of the power distribution mechanism, and the rotation element (for example, the rotation element c in the embodiments which will be described later) which is connected to the internal combustion engine.

According to an eighth aspect, in the power transmission apparatus according to the seventh aspect, the first connecting mechanism enables to selectively connect the rotation element (for example, the rotation element e in the embodiments which will be described later) of the power combining mechanism which is connected to the power distribution mechanism to the rotation element (for example, the rotation element d in the embodiments which will be described later) which is connected to none of the first electric motor, the third fixing mechanism and the internal combustion engine in the rotation elements of the power distribution mechanism, the rotation element (for example, the rotation element c in the embodiments which will be described later) which is connected to the internal combustion engine and, the rotation element (for example, the rotation element b in the embodiments which will be described later) which is connected to the third fixing mechanism.

According to a ninth aspect, the power transmission apparatus according to the first aspect has:

a connecting mechanism (for example, a clutch mechanism C1 in the embodiments which will be described later)

which enables to connect at least two of the rotation elements of the power distribution mechanism together.

According to a 10th aspect, the power transmission apparatus according to the first aspect has:

a fourth fixing mechanism (for example, a third brake mechanism B3 in the embodiments which will be described later) which enables to fix selectively at least one of the rotation element (for example, the rotation element d in the embodiments which will be described later) of the power distribution mechanism which is connected to the power combining mechanism and the rotation element (for example, the rotation element e in the embodiments which will be described later) of the power combining mechanism which is connected to the power distribution mechanism so as not to rotate.

According to an 11th aspect, the power transmission apparatus according to the first aspect has:

a fifth fixing mechanism (for example, a fifth brake mechanism B5 in the embodiments which will be described later) which enables to fix selectively the rotation element which is connected to the second electric motor so as not to rotate.

According to a 12th aspect, the power transmission apparatus according to the first aspect has:

a sixth fixing mechanism (for example, a second brake mechanism B2 in the embodiments which will be described later) which enables to fix selectively the rotation element (for example, a second brake mechanism B2 in the embodiments which will be described later) which is connected to the first electric motor so as not to rotate.

According to a 13th aspect, a vehicle has the power transmission apparatus (for example, the power transmission apparatus 100 in the embodiment which will be described later) according to the first aspect.

According to a 14th aspect, there is provided a power transmission control method for the vehicle according to the 13th aspect, wherein the power transmission apparatus has at least a first power combining mode (for example, a 2MOT_electric CVT_Lo mode in the embodiments which will be described later) and a second power combining mode (for example, a 2MOT_electric CVT_Hi mode in the embodiments which will be described later) which have different driving force characteristics, the method include:

a mode determination step of determining whether or not the present power combining mode is the first power combining mode;

a speed determination step of determining whether or not a speed deviation (for example, a speed deviation ΔV in the embodiments which will be described later) which is a difference between a predetermined speed and a driving speed of the vehicle is equal to or smaller than a first threshold (for example, a threshold ΔVth in the embodiments which will be described later);

a driving control step of controlling to drive at least the second electric motor in an event that it is determined in the mode determination step that the present power combining mode is the first power combining mode and that it is determined in the speed determination step that the speed deviation is equal to or smaller than the first threshold;

a torque determination step of determining whether or not a torque (for example, a reaction torque TB6 in the rotation element g in the embodiments which will be described later) applied to the rotation element which is fixed by the first fixing mechanism is equal to or smaller than a second threshold (for example, a threshold Tth in the embodiments which will be described later); and a shifting step of executing a shift from the first power combining mode to the second power combining mode by releasing the rotation element which is fixed by the first fixing mechanism so as to rotate in an event that it is determined in the torque determination step that the torque is equal to or smaller than the second threshold.

According to a 15th aspect, in the power transmission control method according to the 14th aspect, in the driving control step, the second electric motor is controlled to be driven as a generator, and the torque applied to the rotation element which is fixed by the first fixing mechanism is brought down towards 0 while holding a revolution speed of the output shaft.

According to a 16th aspect, in the power transmission control method according to the 14th aspect, a maximum speed of the vehicle in the first power combining mode differs from a maximum speed of the vehicle in the second power combining mode.

According to a 17th aspect, in the power transmission control method according to the 14th aspect, a maximum torque of the output shaft in the first power combining mode differs from a maximum torque of the output shaft in the second power combining mode.

According to an 18th aspect, in the power transmission control method according to the 14th aspect, a maximum speed of the vehicle in the first power combining mode is smaller than a maximum speed of the vehicle in the second power combining mode.

According to a 19th aspect, in the power transmission control method according to the 14th aspect, a maximum torque of the output shaft in the first power combining mode is greater than a maximum torque of the output shaft in the second power combining mode.

According to a 20th aspect, in the power transmission control apparatus according to the 14th aspect, the power combining mechanism is configured so that the rotation element (for example, the rotation element e in the embodiments which will be described later) which is connected to the power distribution mechanism, the rotation element (for example, the rotation element f in the embodiments which will be described later) which is connected to the output shaft, the rotation element (for example, the rotation element g in the embodiments which will be described later) which is connected to the first fixing mechanism, and the rotation element (for example, the rotation element h in the embodiments which will be described later) which is connected to the second electric motor are aligned sequentially in that order on a nomographic chart.

According to a 21st aspect, in the power transmission control apparatus according to the 14th aspect, the power distribution mechanism is configured so that the rotation element (for example, the rotation element a in the embodiments which will be described later) which is connected to the first electric motor, the rotation element (for example, the rotation element c in the embodiments which will be described later) which is connected to the internal combustion engine, and the rotation element (for example, the rotation element d in the embodiments which will be described later) which is connected to the power combining mechanism are aligned sequentially in that order on a nomographic chart.

According to a 22nd aspect, in the power transmission control method according to the 14th aspect, wherein the power transmission apparatus has a connecting mechanism (for example, the clutch mechanism C1 in the embodiments which will be described later) for connecting together at least two of the rotation elements of the power distribution mechanism, the method includes a connecting step of connecting together the rotation elements of the power distribution mechanism by the connecting mechanism in an event that it is determined in the mode determination step that the present power combining mode is the first power combining mode and that it is determined in the speed determination step that the speed deviation is equal to or smaller than the first threshold, and the first electric motor and the second electric motor are controlled to be driven in the driving control step which follows the connecting step.

According to a 23rd aspect, in the power transmission control method according to the 22nd aspect, in the driving control step, the first electric motor is controlled to be driven as an electric motor and the second electric motor is controlled to be driven as a generator, and the torque applied to the rotation element which is fixed by the first fixing mechanism is brought down towards 0 while holding a revolution speed of the output shaft.

Advantages of the Invention

According to the first aspect, since the power transmission apparatus has the second fixing mechanism which enables to selectively fix the rotation element of the power distribution mechanism which is connected to the internal combustion engine, in the two motor EV driving mode, the power of the first electric motor which is connected to the power distribution mechanism is transmitted to the power combining mechanism by fixing the rotation element which is connected to the internal combustion engine by the second fixing mechanism, so that the power transmitted can be combined with the power of the second electric motor, thereby making it possible to realize the two motor EV driving mode utilizing the two electric motors.

In addition, in the two motor EV driving mode, a great change is caused in not only the revolution speed transmitted to the output shaft but also the torque also transmitted to the output shaft by switching the first fixing mechanism, whereby the torque characteristics can be changed, thereby making it possible to realize the plurality of EV driving modes having the different driving force characteristics while avoiding the increase in size, cost and weight of the electric motors.

According to the second aspect, since the lever ratio (the gear ratio) to the output shaft of the power combining mechanism can be changed largely by switching the first fixing mechanism, the Hi mode EV driving and the Lo mode EV driving whose driving force performances are largely different can be realized in the two motor EV driving mode.

According to the third aspect, not only can the power of the internal combustion engine be distributed to the first electric motor and the power combining mechanism but also the electric pass which connects the first electric motor and the second electric motor together is provided, whereby one of the electric motors can be driven by means of electric power which is generated by the other electric motor. In addition, by controlling the energy thereof, the fuel economy and the power economy can be enhanced by controlling the charging and discharging of the battery and the electric CVT operations.

According to the fourth aspect, since the third fixing mechanism is provided which can fix selectively the rotation element of the rotation elements of the power distribution mechanism which is connected to neither the internal combustion engine nor the second fixing mechanism so as not to rotate, in the driving mode utilizing the internal combustion engine, it is possible to realize the driving in which the vehicle is driven at different speeds while shifting the gears by switching the third fixing mechanism, in addition to the EV driving mode.

According to the fifth aspect and the sixth aspect, not only can the power of the internal combustion engine be distributed to the first electric motor and the power combining mechanism but also the electric pass which connects the first electric motor and the second electric motor together is provided, whereby one of the electric motors can be driven by means of electric power which is generated by the other electric motor. In addition, by controlling the energy thereof, the fuel economy and the power economy can be enhanced by controlling the charging and discharging of the battery and the electric CVT operations.

According to the seventh aspect, since the connecting positions between the power distribution mechanism and the power combining mechanism can be switched by the first connecting mechanism, in the driving mode utilizing the internal combustion engine, the number of gears to be shifted to enable the vehicle to be driven at different speeds while shifting the gears can be increased.

According to the eighth aspect, in the driving mode utilizing the internal combustion engine, the number of gears to be shifted to enable the vehicle to be driven at different speeds while shifting the gears can be increased.

According to the ninth aspect, the torque change or revolution speed change on the power distribution mechanism side can be suppressed by switching the connecting mechanisms when shifting the driving modes. Because of this, the modes can be shifted smoothly without generating vibration or noise.

According to the 10th aspect, since the power transmission between the power combining mechanism and the power distribution mechanism can be stopped by switching the fourth fixing mechanism, the one motor EV driving by the second electric motor can be realized.

According to the 11th aspect, the one motor EV driving by the first electric motor can be realized by switching the fifth fixing mechanism.

According to the 12th aspect, since the power transmission apparatus has further the sixth fixing mechanism which can selectively fix the rotation element which is connected to the first electric motor so as not to rotate, the number of gears to be shifted to enable the vehicle to be driven at different speeds while shifting the gears can be increased in the driving mode utilizing the internal combustion engine. In addition, the 100% mechanical pass in which the power of the engine only is used without using the electric motor can also be realized by switching the fifth fixing mechanism and the sixth fixing mechanism.

According to the 13th aspect, in the two motor EV driving mode, the vehicle can be provided which can realize the plurality of EV driving modes having the different driving force characteristics.

According to the 14th aspect, when shifting from the first power combining mode to the second power combining mode by enabling the rotation element which is fixed by the first fixing mechanism to rotate, there is no change in revolution speed of the output shaft, and the torque applied to the rotation element which can rotate is so small as to be equal to or smaller than the second threshold. Therefore, noise or vibration generated during the mode shifting can be reduced.

According to the 15th aspect, when shifting from the first power combining mode to the second power combining mode, there is no change in revolution speed of the output shaft, and the torque applied to the rotation element which can rotate is nearer to 0, and therefore, noise or vibration generated during the mode shifting can be reduced.

According to the 16th aspect, when shifting between the two power combining modes having the different maximum speeds, vibration or noise can be reduced.

According to the 17th aspect, when shifting between the two power combining modes having the different maximum output shaft torques, vibration or noise can be reduced.

According to the 18th aspect, when shifting from the first power combining mode having the smaller maximum speed to the second power combining mode having the greater maximum speed, vibration or noise can be reduced.

According to the 19th aspect, when shifting from the first power combining mode having the greater maximum output shaft torque to the second power combining mode having the smaller maximum output shaft torque, vibration or noise can be reduced.

According to the 20th aspect, since the lever ratio (the gear ratio) to the output shaft of the power combining mechanism can be changed largely by fixing or releasing the rotation element by the first fixing mechanism, the two power combining modes whose driving force characteristics are different largely can be realized.

According to the 21st aspect, not only can the power of the internal combustion engine be distributed to the first electric motor and the power combining mechanism but also the electric pass which connects the first electric motor and the second electric motor together is provided, whereby one of the electric motors can be driven by means of electric power which is generated by the other electric motor.

According to the 22nd aspect, when shifting from the first power combining mode to the second power combining mode by enabling the rotation element which is fixed by the first fixing mechanism to rotate with at least two rotation elements of the power distribution mechanism connected together by the connecting mechanism, there is no change in revolution speed of the output shaft, the torque applied to the rotation element which can rotate is so small as to be equal to or smaller than the second threshold, and there is no change in output shaft torque. Therefore, noise or vibration generated during the mode shifting can be reduced further.

According to the 23rd aspect, when shifting from the first power combining mode to the second power combining mode, there is no change in revolution speed of the output shaft, and the torque applied to the rotation element which can rotate is nearer to 0, and therefore, noise or vibration generated during the mode shifting can be reduced.

BRIEF DESCRIPTION OF DRAWINGS

FIGS. 1A and 1B show an apparatus of a power transmission apparatus according to a first embodiment of the invention, in which FIG. 1A is a skeleton diagram of the power transmission apparatus, and FIG. 1B is a block diagram of the power transmission apparatus.

FIG. 2 is an operation table showing operation patterns of the power transmission apparatus according to the first embodiment of the invention.

FIG. 66 is an operation table showing operation patterns of the power transmission apparatus according to the third embodiment of the invention.

FIG. 68 is an operation table showing operation patterns of the power transmission apparatus according to the fourth embodiment of the invention.

FIG. 70 is an operation table showing operation patterns of the power transmission apparatus according to the fifth embodiment of the invention.

FIG. 72 is an operation table showing operation patterns of the power transmission apparatus according to the sixth embodiment of the invention.

MODE FOR CARRYING OUT THE INVENTION

Figure 1A:
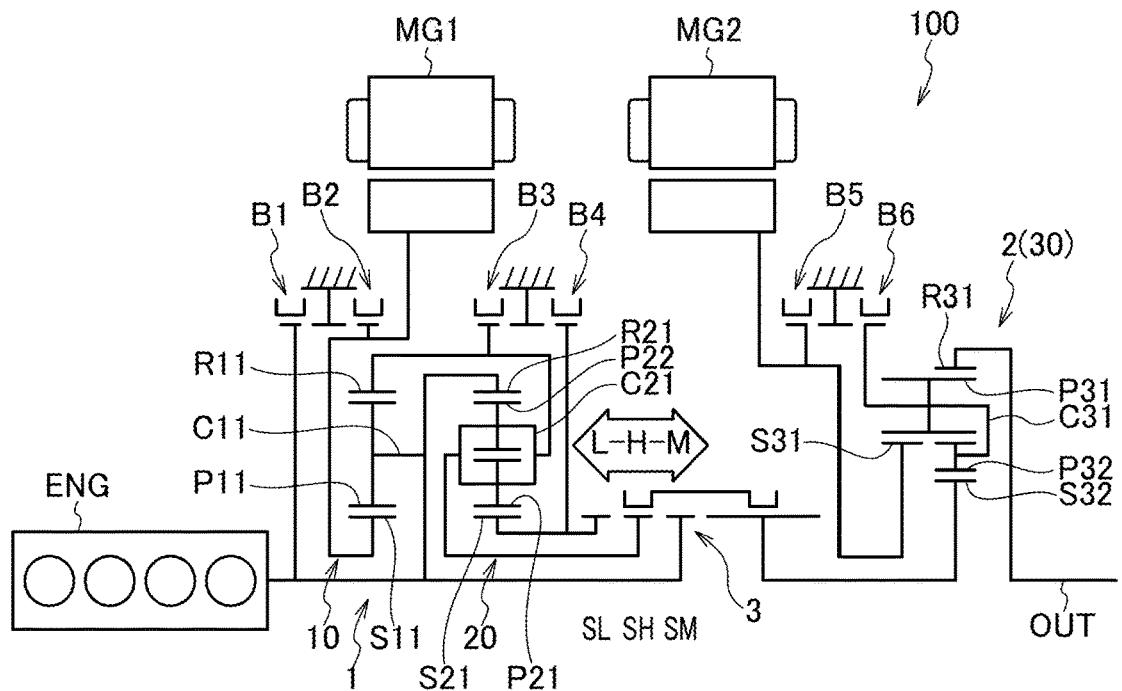

Hereinafter, embodiments of the power transfer apparatus of the invention will be described based on the accompanying drawings. The drawings should be seen in a direction in which given reference numerals look normal. Power transmission apparatuses according to embodiments to be described herebelow are installed on a hybrid electric vehicle which runs on powers of an electric motor and/or an internal combustion engine according to a driving state of the vehicle.

First Embodiment

<Power Transmission Apparatus>

Figure 1B:
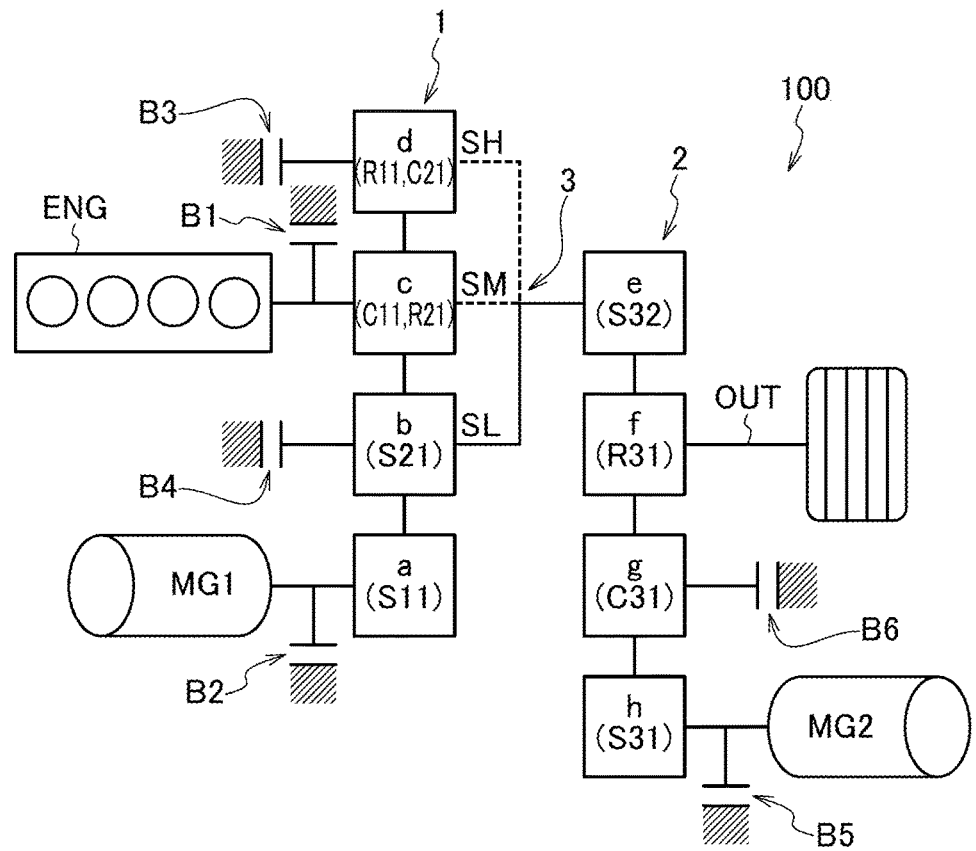

A power transmission apparatus 100 according to a first embodiment of the invention shown in FIGS. 1A and 1B is a power transmission apparatus suitable for use on a hybrid electric vehicle and has an engine ENG which is an internal combustion engine, two motor-generators or a first motor-generator MG1 and a second motor-generator MG2 which each function as an electric motor and a generator, a power transfer or distribution mechanism 1 which is made up of a first differential transmission which is connected to the engine ENG and the first motor-generator MG1 and in which four rotation elements a to d can rotate in differential motions to one another, a power combining mechanism 2 which is made up of a second differential transmission which is connected to the power distribution mechanism 1, the second motor-generator MG2 and an output shaft OUT and in which four rotation elements e to h can rotate in differential motions to one another, a selection mechanism (SL, SM, SH) 3 for switching selectively the rotation elements b to d of the power distribution mechanism 1 which are connected to the power combining mechanism 2, and six brake mechanisms or a first brake mechanism B1 to a sixth brake mechanism B6 which are fixing mechanisms for fixing selectively the rotation elements so as not to rotate.

<Power Distribution Mechanism>

The power distribution mechanism 1 of this embodiment is made up of a combination of a single pinion planetary gear mechanism 10 and a double pinion planetary gear mechanism 20. The single pinion planetary gear mechanism 10 has a sun gear S11, a ring gear R11 which is provided concentrically with the sun gear S11, and a carrier C11 which holds a pinion gear P11 which meshes with the sun gear S11 and the ring gear R11. The double pinion planetary gear mechanism 20 has a sun gear S21, a ring gear R21 which is provided concentrically with the sun gear S21, and a carrier C21 which holds an inner pinion P21 which meshes with the sun gear S21 and an outer pinion P22 which meshes with the inner pinion P21 and the ring gear R21.

Then, the sun gear S11 of the planetary gear mechanism 10 makes up the rotation element a of the power distribution mechanism 1, and the first motor-generator MG1 and the second brake mechanism B2 are connected to the sun gear 11. The ring gear R11 of the planetary gear mechanism 10 is connected to the carrier C21 of the planetary gear mechanism 20 and makes up the rotation element d of the power distribution mechanism 1. The third brake mechanism B3 and a selection element SH of the selection mechanism 3 are connected to the ring gear R11. The carrier C11 of the planetary gear mechanism 10 is connected to the ring gear R21 of the planetary gear mechanism 20 and makes up the rotation element c of the power distribution mechanism 1. The engine ENG, the first brake mechanism B1 and a selection element SM of the selection mechanism 3 are connected to the carrier C11. In addition, the sun gear S21 of the planetary gear mechanism 20 makes up the rotation element b of the power distribution mechanism 1. The fourth brake mechanism B4 and a selection element SL of the selection mechanism 3 are connected to the sun gear S21.

<Power Combining Mechanism>

On the other hand, the power combining mechanism 2 utilizes a Ravigneaux planetary gear mechanism 30. The Ravigneaux planetary gear mechanism 30 has a first sun gear S31 and a second sun gear S32 which are disposed coaxially, a ring gear R31 which is provided concentrically with the first sun gear S31 and the second sun gear S32, and a carrier C31 which holds a long pinion P31 which meshes with the first sun gear S31 and the ring gear R31 and a short pinion P32 which meshes with the long pinion P31 and the second sun gear S32.

Then, the first sun gear S31 of the planetary gear mechanism 30 makes up the rotation element h of the power combining mechanism 2, and the second motor-generator MG2 and the fifth brake mechanism B5 are connected to the first sun gear S31. In addition, the second sun gear S32 of the planetary gear mechanism 30 makes up the rotation element e of the power combining mechanism 2 which is an input portion thereof, and the selection mechanism 3 is connected to the second sun gear S32. In addition, the ring gear R31 of the planetary gear mechanism 30 makes up the rotation element f of the power combining mechanism 2 which is an output portion thereof, and the output shaft OUT is connected to the ring gear R31. Additionally, the carrier C31 of the planetary gear mechanism 30 makes up the rotation element g of the power combining mechanism 2, and the sixth brake mechanism B6 is connected to the carrier C31.

Figure 4:
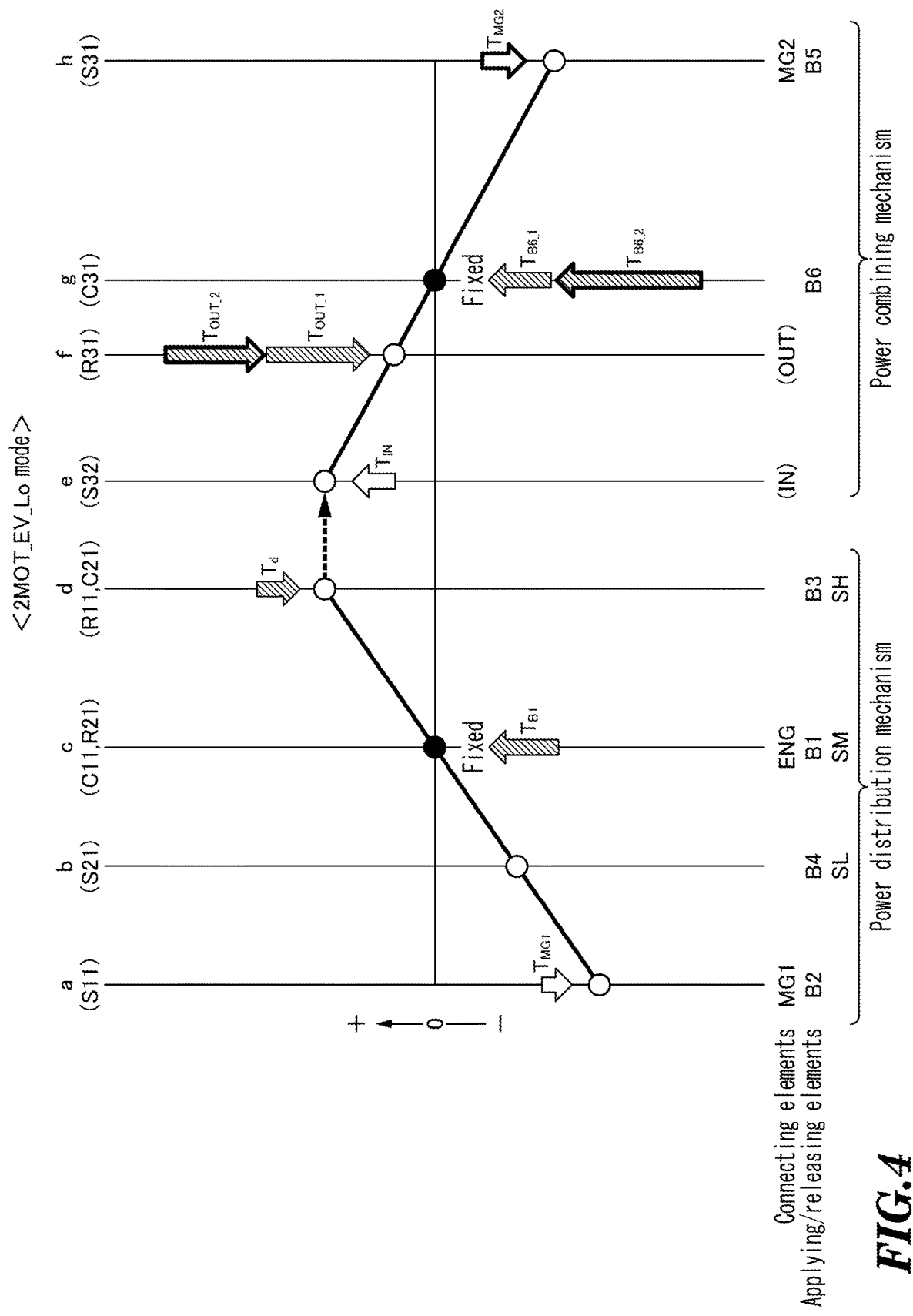
FIG. 4 is a nomographic chart of a 2MOT_EV_Lo mode.

Namely, in the power distribution mechanism 1 of the power transmission apparatus 100 according to this embodiment of the invention, the rotation element a (the sun gear S11) to which the first motor-generator MG1 and the second brake mechanism B2 are connected, the rotation element b (the sun gear S21) to which the fourth brake mechanism B4 and the selection element SL of the selection mechanism 3 are connected, the rotation element c (the carrier C11, the ring gear R21) to which the engine ENG, the first brake mechanism B1 and the selection element SM of the selection mechanism 3 are connected, and the rotation element d (the ring gear R11, the carrier C21) to which the third brake mechanism B3 and the selection element SH of the selection mechanism 3 are connected are in a collinear relation in which those rotation elements are positioned on a single straight line, and as shown figures from FIG. 4 on, the rotation elements a to d are designed to be aligned sequentially in that order on nomographic charts showing the collinear relation.

In the power combining mechanism 2 of the power transmission apparatus 100 according to this embodiment of the invention, the rotation element e (the second sun gear S32) which is the input portion from the power distribution mechanism 1 and to which the selection mechanism 3 is connected, the rotation element f (the ring gear R31) to which the output shaft OUT is connected, the rotation element g (the carrier C31) to which the sixth brake mechanism B6 is connected, and the rotation element h (the first sun gear S31) to which the second motor-generator MG2 and the fifth brake mechanism B5 are connected are in a collinear relation, and as shown in the figures from FIG. 4 on, the rotation elements e to h are designed to be aligned sequentially in that order on nomographic charts showing the collinear relation.

<Driving Modes>

Then, in the power transmission apparatus 100 according to this embodiment of the invention, various types of driving modes can be realized by controlling the engine ENG, the first motor-generator MG1 and the second motor-generator MG2, which are drive sources, and the first brake mechanism B1 to the sixth brake mechanism B6, which are application/release elements, and the selection mechanism 3 using operation patterns shown in an operation table shown in FIG. 2.

As shown in FIG. 2, the driving modes include an EV mode, an electric CVT mode and a fixed gear mode. The EV mode is a driving mode in which the vehicle runs only on the powers of the electric motors, and the EV mode includes a two-motor EV mode in which the vehicle runs on the powers of the first motor-generator MG1 and the second motor-generator MG2 and a one-motor EV mode in which the vehicle runs only on the power of the first motor-generator MG1. The electric CVT mode is a driving mode in which the vehicle runs on the engine power and the motor power using a continuously variable gear shift and includes a two-motor electric CVT mode in which the vehicle runs on the powers of the first motor-generator MG1 and the second motor-generator MG2 using the continuously variable gear shift. The fixed gear mode is a driving mode in which the vehicle runs on the engine power and the motor power by shifting gears and has a hybrid driving mode in which the first motor-generator MG1 and/or the second motor-generator MG2 is used as the drive source in addition to the engine ENG. Additionally, the fixed gear mode includes an engine drive mode in which with the first motor-generator MG1 and the second motor-generator MG2 stopped, only the engine ENG is used as the drive source.

Next, specific operation patterns of the driving modes described above will be described by reference to the operation table shown in FIG. 2 and driving curves and nomographic charts which are shown in figures from FIG. 3 on. In the driving curves shown in the figures from FIG. 3 on, an axis of abscissa denotes vehicle speeds and an axis of ordinate denotes driving forces.

<EV Mode>

Figure 3:
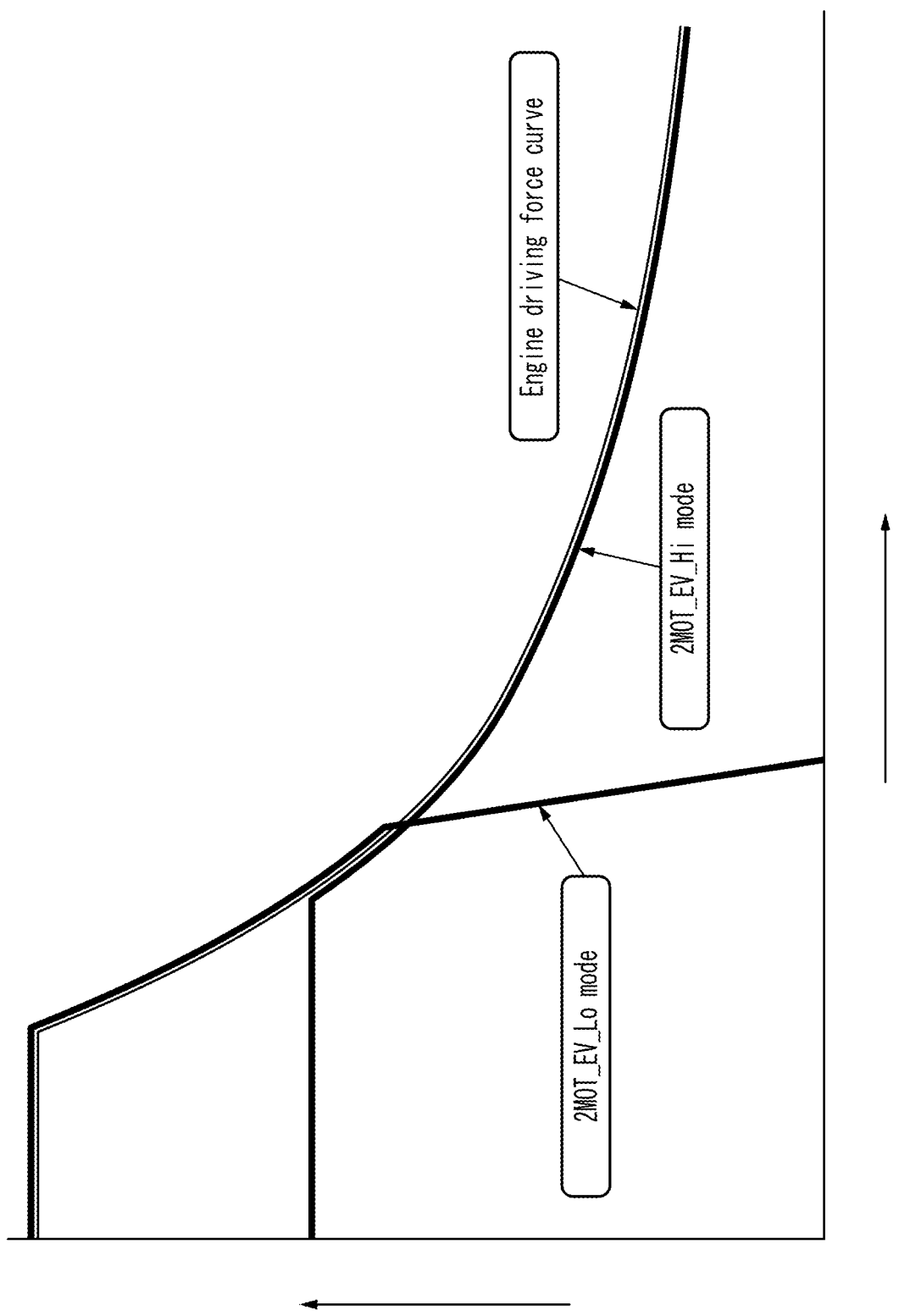
FIG. 3 is a driving force curve of a two-motor EV mode.

As shown in FIG. 3, in the power transmission apparatus 100 of this embodiment, the two-motor EV mode is enabled in which the vehicle runs on the powers of the first motor-generator MG1 and the second motor-generator MG2, and in the two-motor EV mode, a 2MOT_EV_Lo mode exhibiting a low speed and high torque driving force characteristic and a 2MOT_EV_Hi mode exhibiting a high speed and low torque driving characteristic are enabled.

<2MOT_EV_Lo mode>

As shown in FIGS. 2 and 4, in the 2MOT_EV_Lo mode, the engine ENG is stopped, and the first brake mechanism B1 and the sixth brake mechanism B6 are applied, whereby the rotation element c of the power distribution mechanism 1 and the rotation element g of the power combining mechanism 2 are fixed so as not to rotate. In addition, the selection mechanism 3 connects the rotation element d of the power distribution mechanism 1 and the rotation element e of the power combining mechanism 2 together via the selection element SH.

Here, as shown in FIG. 4, when the first motor-generator MG1 is driven in a reverse rotating direction for power running, a collinearity on the power distribution mechanism 1 side changes its gradient at the rotation element c, which is a fixed point, as a fulcrum. By doing so, the rotation speed of the rotation element d is increased in a forward rotating direction, and the rotation of the rotation element d is inputted into the rotation element e of the power combining mechanism 2. As this occurs, an action torque TMG1 of the first motor-generator MG1 is generated in the reverse rotating direction in the rotation element a of the power distribution mechanism 1, and this action torque TMG1 is transmitted to the rotation element d in a lever ratio of ac/cd (a gear ratio between a and c/a gear ratio between c and d, and this will be true herebelow) based on the rotation element c, which is the fixed point, as the fulcrum. Namely, a reaction torque Td acting in the reverse rotating direction which is obtained by multiplying the action torque TMG1 by the lever ratio of ac/cd is generated in the rotation element d, and this reaction torque Td is transmitted to the rotation element e of the power combining mechanism 2 as an action torque TIN acting in the forward rotating direction. A reaction torque TB1 acting in the forward rotating direction is generated in the rotation element c, which is the fixed point, and a total sum of torque on the power distribution mechanism 1 side is caused to become 0 by the reaction torque TB1.

On the other hand, on the power combining mechanism 2 side, a low-speed rotation in the forward rotating direction (a low-speed forward traveling) is transmitted to the rotation element f of the power combining mechanism 2, which is the output portion thereof, by driving the second motor-generator MG2 in the reverse rotating direction for power running. Additionally, a reaction torque attributed to the action torque TIN which is inputted from the power distribution mechanism 1 and an action torque TMG2 of the second motor-generator MG2 is generated in the rotation element f. However, in the 2MOT_EV_Lo mode, since the rotation element g of the power combining mechanism 2 is fixed, the action torques TIN, TMG2 are transmitted to the rotation element f in a lever ratio based on the rotation element g, which is a fixed point, as a fulcrum. Namely, a reaction torque TOUT_1 in the reverse rotating direction which is obtained by multiplying the action torque TIN by a lever ratio of eg/fg and a reaction torque TOUT_2 in the reverse rotating direction which is obtained by multiplying the action torque TMG2 by a lever ratio of gh/fg is generated in the rotation element f. The application of the torque in the reverse rotating direction to the rotation element f to which the output shaft OUT is connected means the application of the torque in the forward rotating direction (a forward traveling direction) to the output shaft OUT. By doing so, the 2MOT_EV_Lo mode is realized in which the vehicle can travel forwards on a low speed and high torque driving force characteristic. Reaction torques TB6_1, TB6_2 in the forward rotating direction are generated in the rotation element g, which is the fixed point, and a total sum of torque on the power combining mechanism 2 side is caused to become 0 by the reaction toques TB6_1, TB6_2.

<2MOT_EV_Hi Mode>

Figure 5:
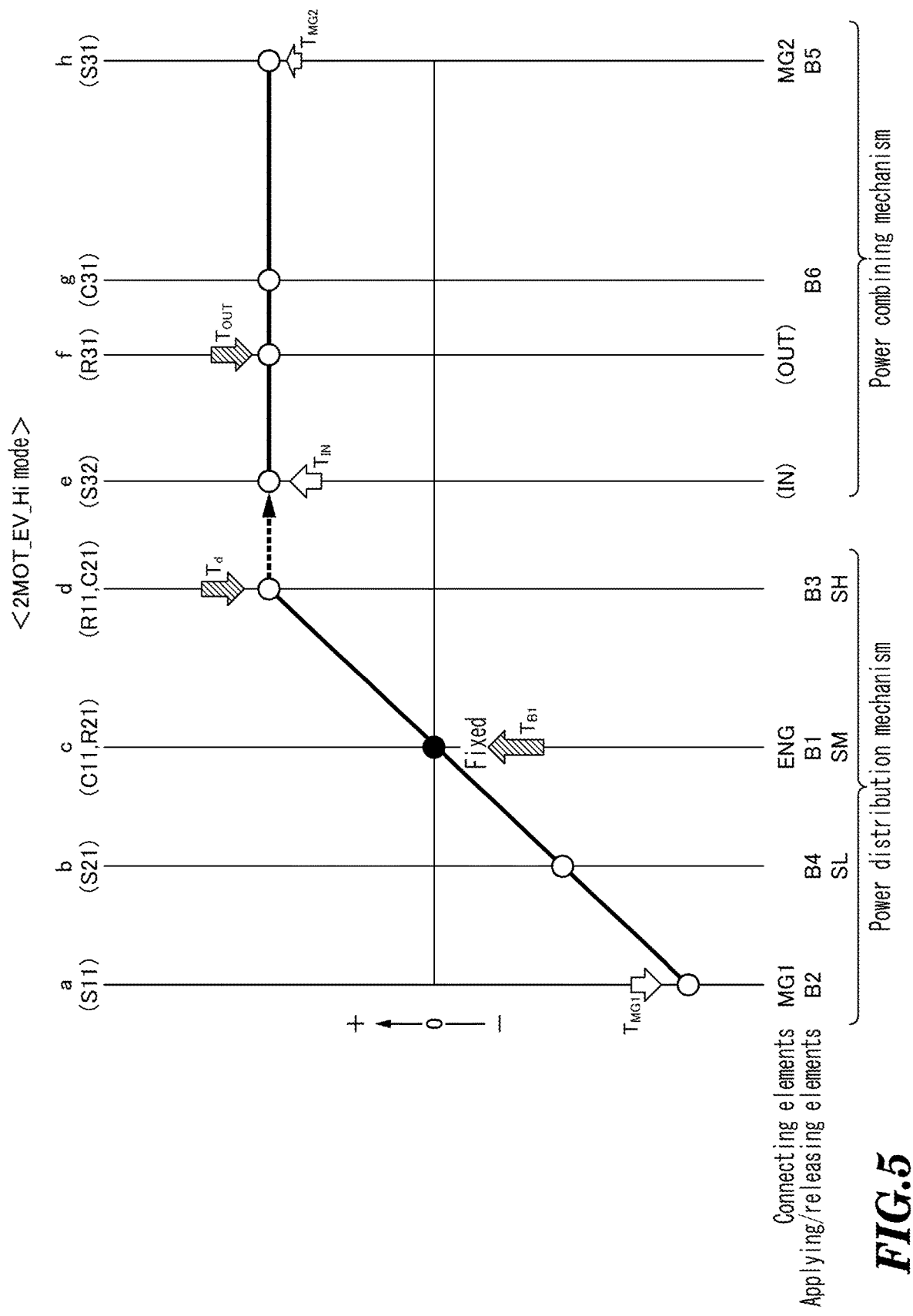
FIG. 5 is a nomographic chart of a 2MOT_EV_Hi mode.

As shown in FIGS. 2 and 5, in the 2MOT_EV_Hi mode, the engine ENG is stopped, and the first brake mechanism B1 is applied, whereby the rotation element c of the power distribution mechanism 1 is fixed so as not to rotate. In addition, the selection mechanism 3 connects the rotation element d of the power distribution mechanism 1 and the rotation element e of the power combining mechanism 2 together via the selection element SH. Namely, the 2MOT_EV_Hi mode differs from the 2MOT_EV_Lo mode in that the rotation element g of the power combining mechanism 2 is not fixed.

As shown in FIG. 5, in the 2MOT_EV_Hi mode, too, the first motor-generator MG1 is driven in the reverse rotating direction for power running. In the 2MOT_EV_Hi mode, since the vehicle is driven at high speeds, the first motor-generator MG1 is driven at higher speeds than in the 2MOT_EV_Lo mode. However, since the basic operation on the power combining mechanism 1 side is similar to that of the 2MOT_EV_Lo mode, the operation on the power distribution mechanism 1 side will be omitted here.

On the other hand, on the power combining mechanism 2 side, a high-speed rotation in the forward rotating direction (a high-speed forward traveling) is transmitted to the rotation element f of the power combining mechanism 2, which is the output portion thereof, by driving the second motor-generator MG2 in the forward rotating direction for power running. Additionally, the reaction torque attributed to the action torque TIN which is inputted from the power distribution mechanism 1 and the action torque TMG2 of the second motor-generator MG2 is generated in the rotation element f. However, in the 2MOT_EV_Hi mode, since the rotation element g of the power combining mechanism 2 is not fixed, a reaction torque TOUT which is generated in the rotation element f becomes simply a total value of the action torque TIN which is inputted from the power distribution mechanism 1 and the action torque TMG2 of the second motor-generator MG2. By doing so, the 2MOT_EV_Hi mode is realized in which the vehicle can travel forwards on a high speed and low torque driving force characteristic.

In this way, in the power transmission apparatus 100 of this embodiment, by applying the first brake mechanism B1 to fix the rotation element c of the power distribution mechanism 1, the action torque TIN is applied to the power combining mechanism 2 side by means of the action torque TMG1 of the first motor-generator MG1. Further, by applying the sixth brake mechanism B6 to fix the rotation element g of the power combining mechanism 2, in the rotation element f to which the output shaft OUT is connected, a reaction torque TOUT_1 in which the action torque TIN is amplified is generated and a reaction torque TOUT_2 in which the action torque TMG2 of the second motor-generator MG2 is amplified. On the other hand, when the sixth brake mechanism B6 is released, a reaction torque TOUT is generated in the rotation element f whose magnitude is equal to a total value of the action torque TIN and the action torque TMG2 of the second motor-generator MG2. As a result, the EV drive mode having the low speed and high torque driving force characteristic and the EV drive mode having the high speed and low torque driving force characteristic can be realized by the first motor-generator MG1 and the second motor-generator MG2.

<2MOT_EV_Rev Mode>

Figure 6:
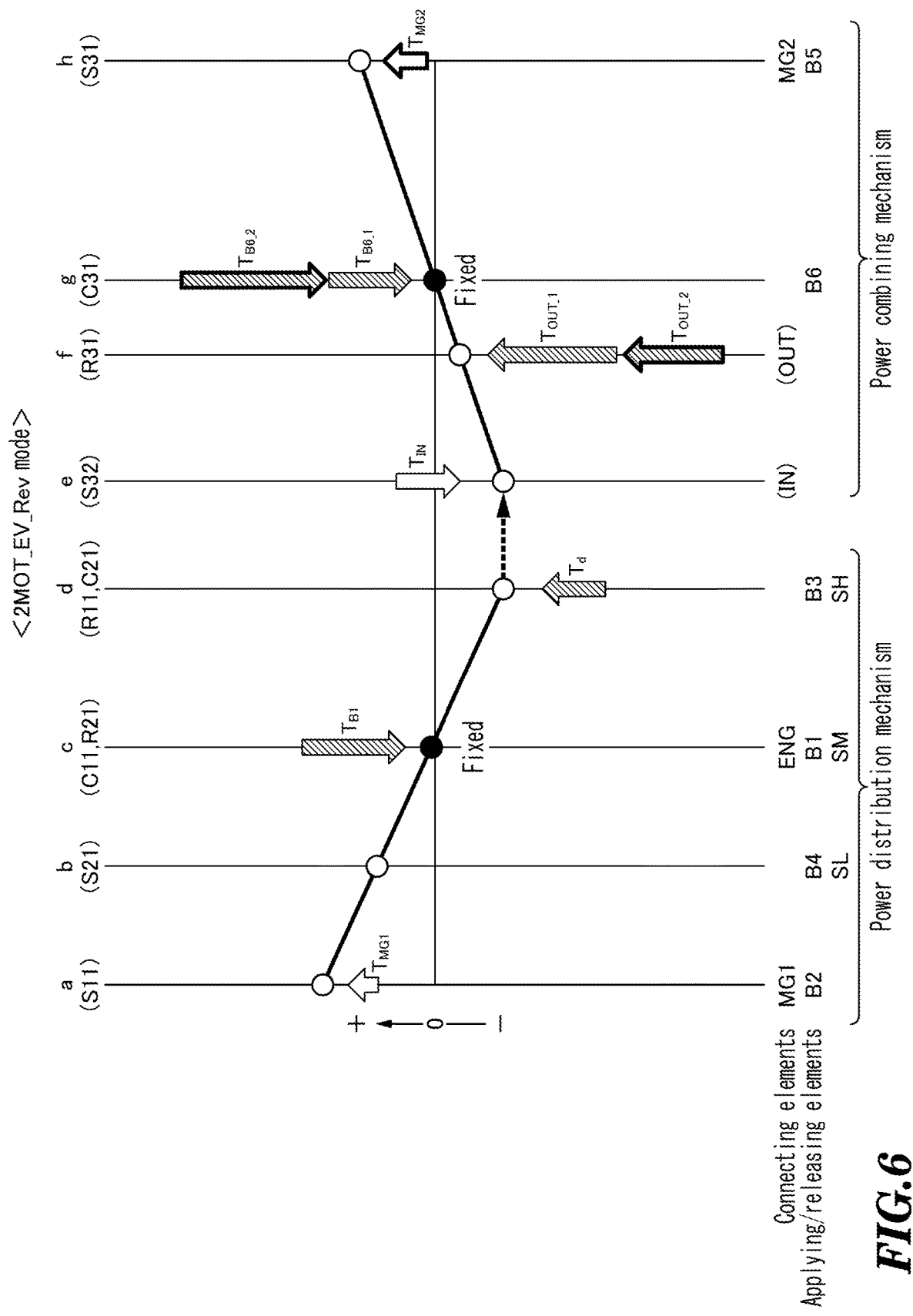
FIG. 6 is a nomographic chart of a 2MOT_EV_Rev mode.

As shown in FIGS. 2 and 6, in a 2MOT_EV_Rev mode, the engine ENG is stopped, and the first brake mechanism B1 and the sixth brake mechanism B6 are applied, whereby the rotation element c of the power distribution mechanism 1 and the rotation element g of the power combining mechanism 2 are fixed so as not to rotate. In addition, the selection mechanism 3 connects the rotation element d of the power distribution mechanism 1 and the rotation element e of the power combining mechanism 2 together via the selection element SH.

Here, as shown in FIG. 6, when the first motor-generator MG1 is driven in the forward rotating direction for power running, a collinearity on the power distribution mechanism 1 side changes its gradient at the rotation element c, which is the fixed point, as a fulcrum. By doing so, the rotation speed of the rotation element d is increased in the reverse rotating direction, and the rotation of the rotation element d is inputted into the rotation element e of the power combining mechanism 2. As this occurs, the action torque TMG1 of the first motor-generator MG1 is generated in the forward rotating direction in the rotation element a of the power distribution mechanism 1, and this action torque TMG1 is transmitted to the rotation element d in the lever ratio of ac/cd based on the rotation element c, which is the fixed point, as the fulcrum. Namely, a reaction torque Td acting in the forward rotating direction which is obtained by multiplying the action torque TMG1 by the lever ratio of ac/cd is generated in the rotation element d, and this reaction torque Td is transmitted to the rotation element e of the power combining mechanism 2 as an action torque TIN acting in the reverse rotating direction. A reaction torque TB1 acting in the reverse rotating direction is generated in the rotation element c, which is the fixed point, and the total sum of torque on the power distribution mechanism 1 side is caused to become 0 by the reaction torque TB1.

On the other hand, on the power combining mechanism 2 side, a low-speed rotation in the reverse rotating direction (a low-speed reverse traveling) is transmitted to the rotation element f of the power combining mechanism 2, which is the output portion thereof, by driving the second motor-generator MG2 in the forward rotating direction for power running. Additionally, a reaction torque attributed to the action torque TIN which is inputted from the power distribution mechanism 1 and an action torque TMG2 of the second motor-generator MG2 is generated in the rotation element f. However, in the 2MOT_EV_Rev mode, since the rotation element g of the power combining mechanism 2 is fixed, the action torques TIN, TMG2 are transmitted to the rotation element f in the lever ratio based on the rotation element g, which is a fixed point, as the fulcrum. Namely, a reaction torque TOUT_1 in the forward rotating direction which is obtained by multiplying the action torque TIN by the lever ratio of eg/fg and a reaction torque TOUT_2 in the forward rotating direction which is obtained by multiplying the action torque TMG2 by the lever ratio of gh/fg is generated in the rotation element f. The application of the torque in the forward rotating direction to the rotation element f to which the output shaft OUT is connected means the application of the torque in the reverse rotating direction (a rearward traveling direction) to the output shaft OUT. By doing so, the 2MOT_EV_Rev mode is realized in which the vehicle can travel rearwards on the low speed and high torque driving force characteristic. Reaction torques TB6_1, TB6_2 in the reverse rotating direction are generated in the rotation element g, which is the fixed point, and the total sum of torque on the power combining mechanism 2 side is caused to become 0 by the reaction toques TB6_1, TB6_2.

<1MOT_EV Mode>

Figure 7:
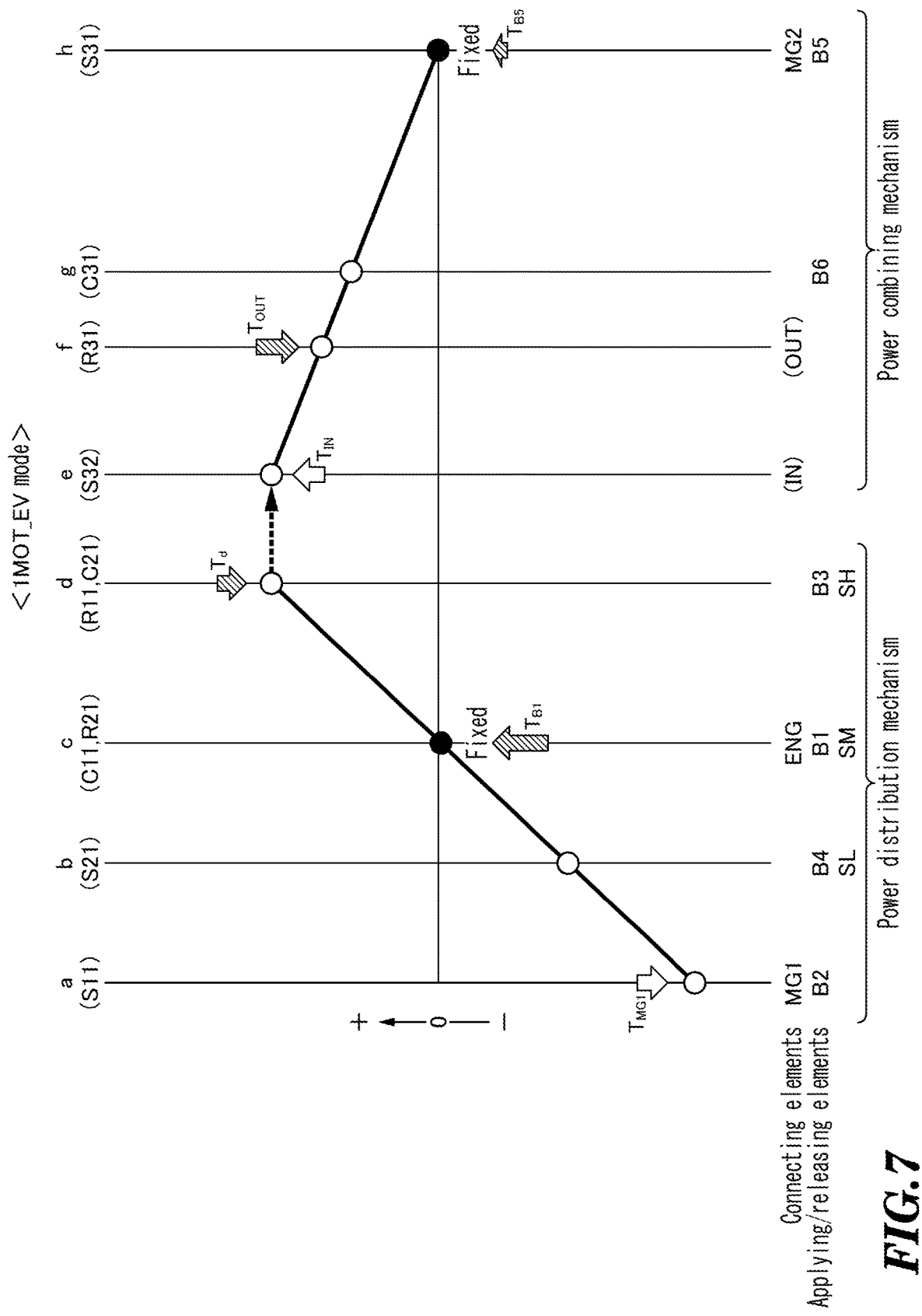
FIG. 7 is a nomographic chart of a 1MOT_EV mode.

As shown in FIGS. 2 and 7, in a 1MOT_EV mode, the engine ENG and the second motor-generator MG2 are stopped, and the first brake mechanism B1 and the fifth brake mechanism B5 are applied, whereby the rotation element c of the power distribution mechanism 1 and the rotation element h of the power combining mechanism 2 are fixed so as not to rotate. In addition, the selection mechanism 3 connects the rotation element d of the power distribution mechanism 1 and the rotation element e of the power combining mechanism 2 together via the selection element SH.

Here, as shown in FIG. 7, when the first motor-generator MG1 is driven in the reverse rotating direction for power running, a collinearity on the power distribution mechanism 1 side changes its gradient at the rotation element c, which is the fixed point, as the fulcrum. By doing so, the rotation speed of the rotation element d is increased in a forward rotating direction, and the rotation of the rotation element d is inputted into the rotation element e of the power combining mechanism 2. As this occurs, the action torque TMG1 of the first motor-generator MG1 is generated in the reverse rotating direction in the rotation element a of the power distribution mechanism 1, and this action torque TMG1 is transmitted to the rotation element d in the lever ratio of ac/cd based on the rotation element c, which is the fixed point, as the fulcrum. Namely, a reaction torque Td acting in the reverse rotating direction which is obtained by multiplying the action torque TMG1 by the lever ratio of ac/cd is generated in the rotation element d, and this reaction torque Td is transmitted to the rotation element e of the power combining mechanism 2 as an action torque TIN acting in the forward rotating direction. A reaction torque TB1 acting in the forward rotating direction is generated in the rotation element c, which is the fixed point, and a total sum of torque on the power distribution mechanism 1 side is caused to become 0 by the reaction torque TB1.

On the other hand, on the power combining mechanism 2 side, when forward rotational power is inputted into the rotation element e, the gradient of the collinearity changes at the rotation element h, which is a fixed point, as a fulcrum, and rotation in the forward rotating direction according to the inputted rotation (a forward traveling) is transmitted to the rotation element f, which is the output portion. The action torque TIN inputted from the power distribution mechanism 1 is transmitted to the rotation element f in a lever ratio based on the rotation element h as the fulcrum. Namely, a reaction torque TOUT in the reverse rotating direction which is obtained by multiplying the action torque TIN by a lever ratio of eh/fh is generated in the rotation element f. As a result, the 1MOT_EV mode is realized in which the vehicle can travel forwards on a low torque driving characteristic from low speeds to high speeds even with one motor. A reaction torque TB5 in the forward rotating direction is generated in the rotation element h, which is the fixed point, and the total sum of torque on the power combining mechanism 2 side is caused to become 0 by this reaction torque TB5.

<1MOT_EV_Rev Mode>

Figure 8:
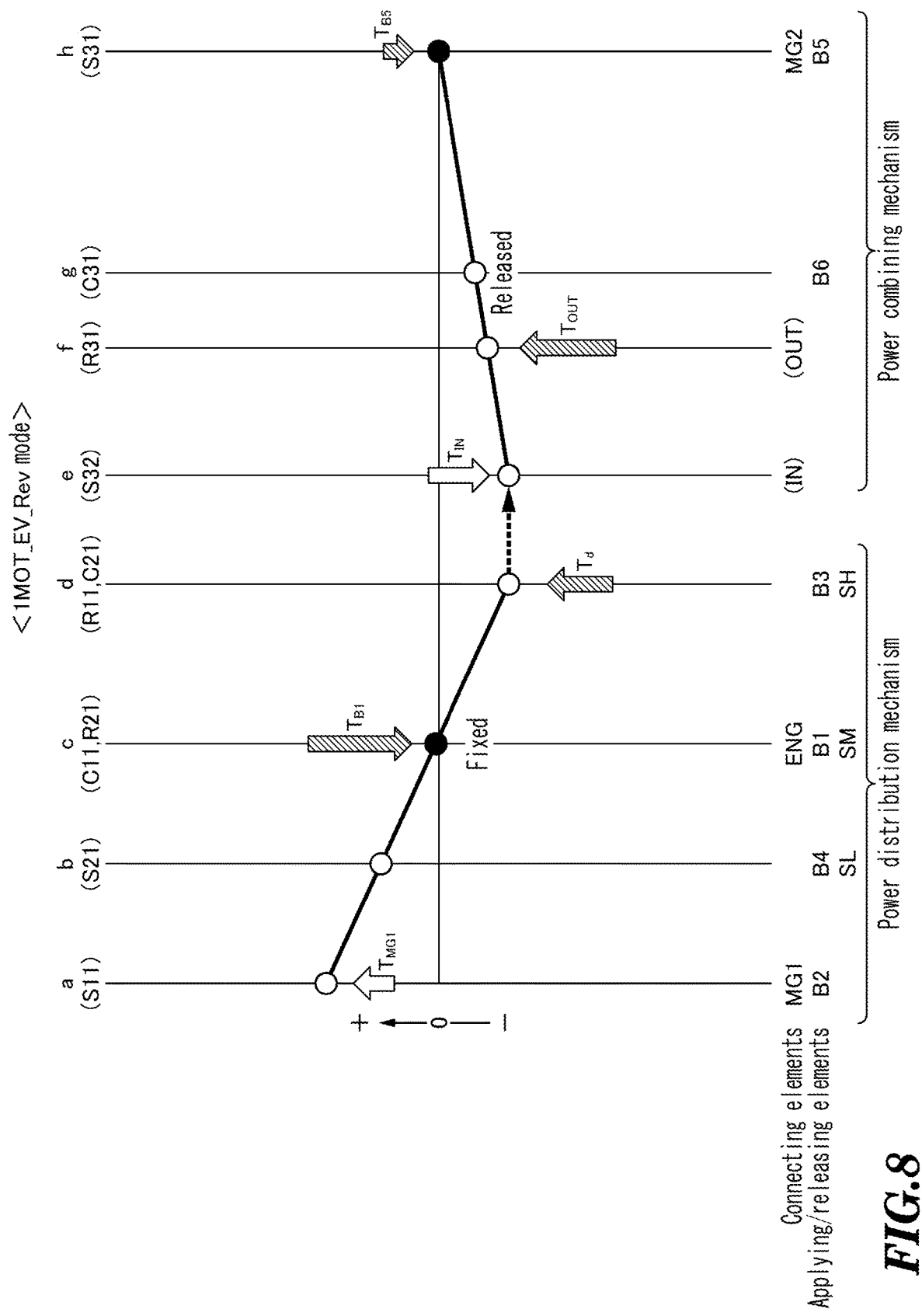
FIG. 8 is a nomographic chart of a 1MOT_EV_Rev mode.

As shown in FIGS. 2 and 8, in a 1MOT_EV_Rev mode, the engine ENG and the second motor-generator MG2 are stopped, and the first brake mechanism B1 and the fifth brake mechanism B5 are applied, whereby the rotation element c of the power distribution mechanism 1 and the rotation element h of the power combining mechanism 2 are fixed so as not to rotate. In addition, the selection mechanism 3 connects the rotation element d of the power distribution mechanism 1 and the rotation element e of the power combining mechanism 2 together via the selection element SH.

Here, as shown in FIG. 8, when the first motor-generator MG1 is driven in the forward rotating direction for power running, a collinearity on the power distribution mechanism 1 side changes its gradient at the rotation element c, which is the fixed point, as a fulcrum. By doing so, the rotation speed of the rotation element d is increased in the reverse rotating direction, and the rotation of the rotation element d is inputted into the rotation element e of the power combining mechanism 2. As this occurs, the action torque TMG1 of the first motor-generator MG1 is generated in the forward rotating direction in the rotation element a of the power distribution mechanism 1, and this action torque TMG1 is transmitted to the rotation element d in the lever ratio of ac/cd based on the rotation element c, which is the fixed point, as the fulcrum. Namely, a reaction torque Td acting in the forward rotating direction which is obtained by multiplying the action torque TMG1 by the lever ratio of ac/cd is generated in the rotation element d, and this reaction torque Td is transmitted to the rotation element e of the power combining mechanism 2 as an action torque TIN acting in the reverse rotating direction. A reaction torque TB1 acting in the reverse rotating direction is generated in the rotation element c, which is the fixed point, and the total sum of torque on the power distribution mechanism 1 side is caused to become 0 by the reaction torque TB1.

On the other hand, on the power combining mechanism 2 side, when reverse rotational power is inputted into the rotation element e, the gradient of the collinearity changes at the rotation element h, which is the fixed point, as a fulcrum, and rotation in the reverse rotating direction according to the inputted rotation (a reverse traveling) is transmitted to the rotation element f, which is the output portion. The action torque TIN inputted from the power distribution mechanism 1 is transmitted to the rotation element f in a lever ratio based on the rotation element h as the fulcrum. Namely, a reaction torque TOUT in the forward rotating direction which is obtained by multiplying the action torque TIN by the lever ratio of eh/fh is generated in the rotation element f. As a result, the 1MOT_EV_Rev mode is realized in which the vehicle can travel reversely from low speeds to high speeds even with one motor. A reaction torque TB5 in the reverse rotating direction is generated in the rotation element h, which is the fixed point, and the total sum of torque on the power combining mechanism 2 side is caused to become 0 by this reaction torque TB5.

<2MOT_electric CVT Mode>

Figure 9:
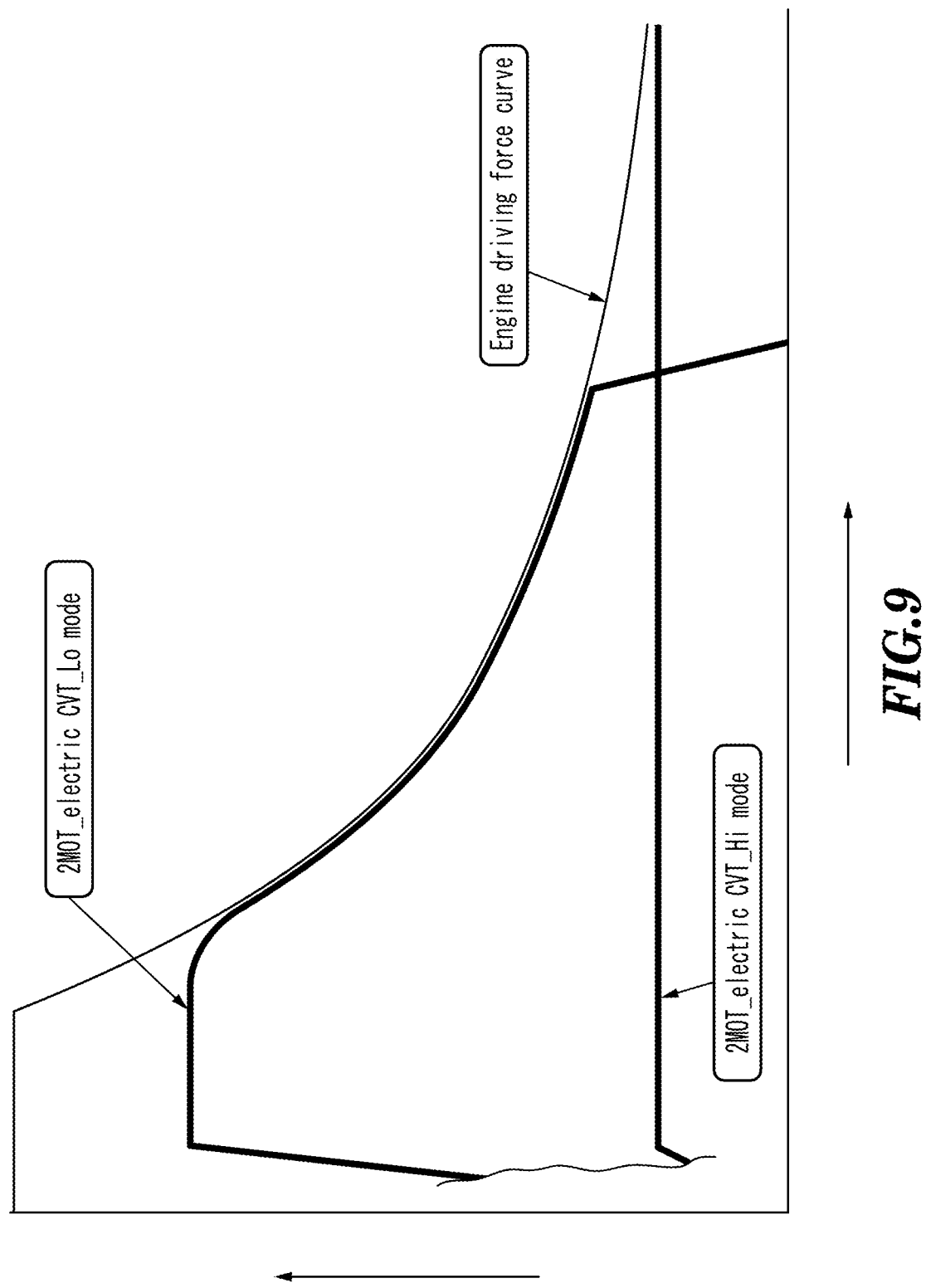
FIG. 9 is a driving force curve of a 2MOT_electric CVT mode.

As shown in FIG. 9, in the power transmission apparatus 100 of this embodiment, the two-motor electric CVT mode is enabled in which the vehicle runs on the powers of the engine ENG, the first motor-generator MG1 and the second motor-generator MG2 using a continuously variable gear shift, and in the two-motor electric CVT mode, a 2MOT_electric CVT_Lo mode exhibiting a low speed and high torque driving force characteristic and a 2MOT_electric CVT_Hi mode exhibiting a high speed and low torque driving force characteristic are enabled.

<2MOT_electric CVT_Lo Mode>

Figure 10:
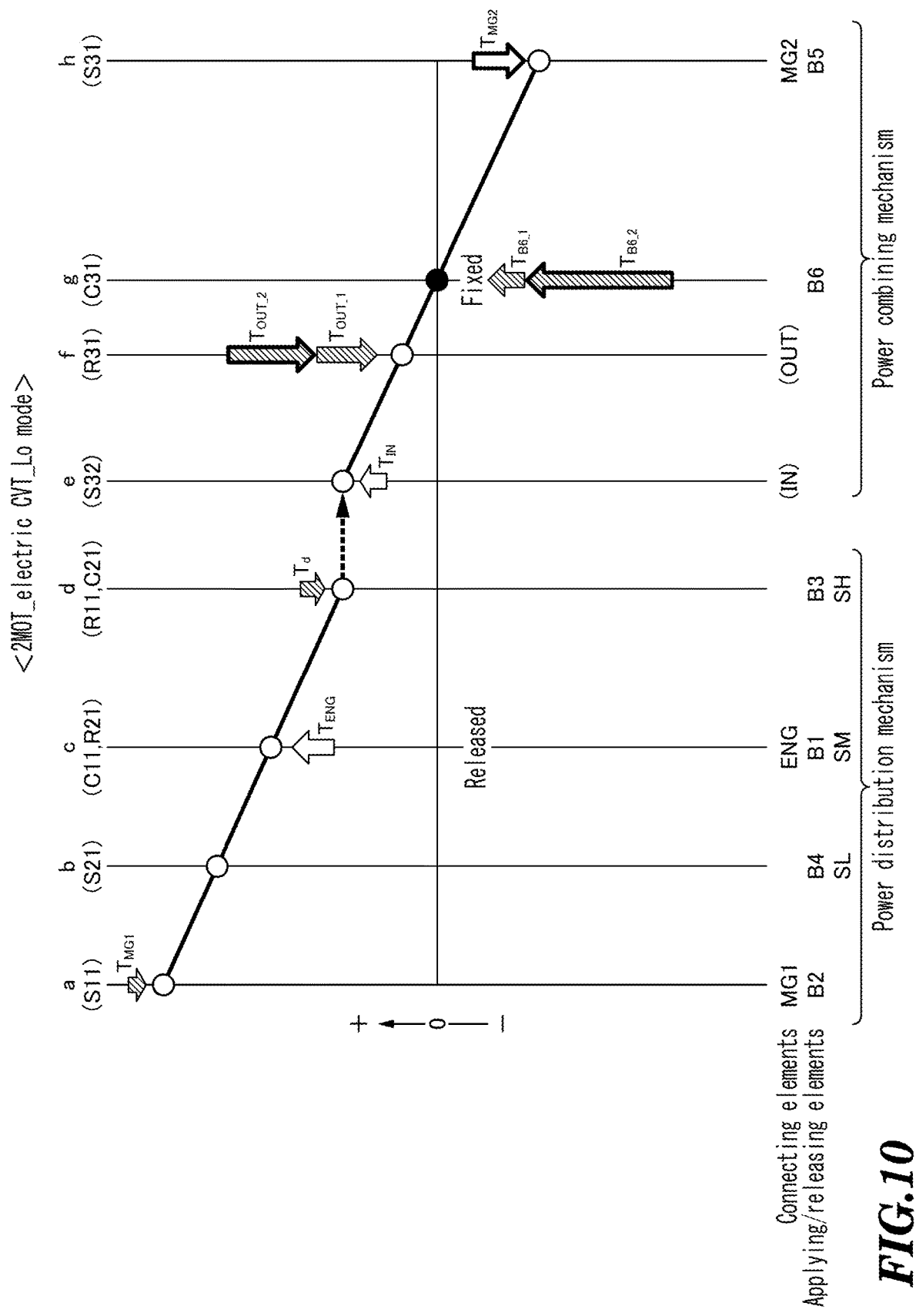
FIG. 10 is a nomographic chart of a 2MOT_electric CVT_Lo mode.

As shown in FIGS. 2 and 10, in the 2MOT_electric CVT_Lo mode, the sixth brake mechanism B6 is applied to fix the rotation element g of the power combining mechanism 2 so as not to rotate. In addition, the selection mechanism 3 connects the rotation element d of the power distribution mechanism 1 and the rotation element e of the power combining mechanism 2 together via the selection element SH.

As shown in FIG. 10, in this mode, the engine ENG is driven, and the first motor-generator MG1 is driven for regeneration. The first motor-generator MG1 is driven for regeneration, whereby the first motor-generator MG1 can be used as a generator, and a so-called electric pass may be executed in which generated electric power is supplied to the second motor-generator MG2 as required or a battery, not shown, may be charged with generated electric power. The gradient of a collinearity on the power distribution mechanism 1 side is controlled based on the revolution speeds of the engine ENG and the first motor-generator MG1, and the rotation speed of the rotation element d is increased in the forward rotating direction, the rotation of the rotation element d being inputted into the rotation element e of the power combining mechanism 2. As this occurs, an action torque TENG of the engine ENG is generated in the forward rotating direction in the rotation element c of the power distribution mechanism 1, whereby a reaction torque TMG1 in the reverse rotating direction is generated in the rotation element a and a reaction torque Td in the reverse rotating direction is generated in the rotation element d, this reaction torque Td then being transmitted to the rotation element e of the power combining mechanism 2 as a forward rotating action torque TIN.

On the other hand, on the power combining mechanism 2 side, a low-speed rotation in the forward rotating direction (a low-speed forward traveling) is transmitted to the rotation element f of the power combining mechanism 2, which is the output portion thereof, by driving the second motor-generator MG2 in the reverse rotating direction for power running. Additionally, a reaction torque attributed to the action torque TIN which is inputted from the power distribution mechanism 1 and an action torque TMG2 of the second motor-generator MG2 is generated in the rotation element f. However, in the 2MOT_electric CVT_Lo mode, since the rotation element g of the power combining mechanism 2 is fixed, the action torques TIN, TMG2 are transmitted to the rotation element f in the lever ratio based on the rotation element g, which is the fixed point, as the fulcrum. Namely, a reaction torque TOUT_1 in the reverse rotating direction which is obtained by multiplying the action torque TIN by a lever ratio of eg/fg and a reaction torque TOUT_2 in the reverse rotating direction which is obtained by multiplying the action torque TMG2 by a lever ratio of gh/fg is generated in the rotation element f. By doing so, the 2MOT_electric CVT_Lo mode is realized in which the vehicle can travel forwards on the low speed and high torque driving force characteristic. Reaction torques TB6_1, TB6_2 in the forward rotating direction are generated in the rotation element g, which is the fixed point, and a total sum of torque on the power combining mechanism 2 side is caused to become 0 by the reaction toques TB6_1, TB6_2.

<2MOT_electric CVT_Hi Mode>

Figure 11:
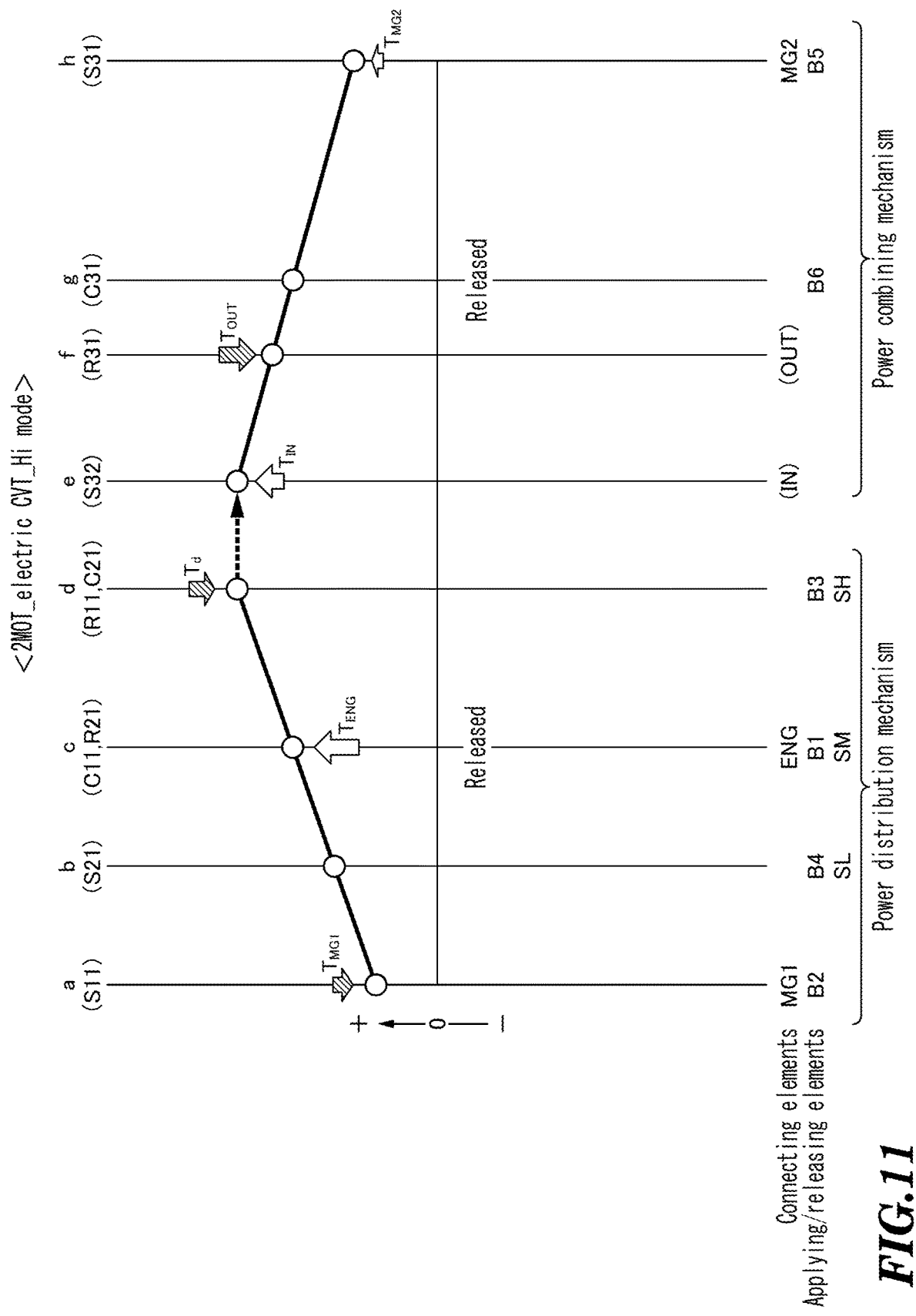
FIG. 11 is a nomographic chart of a 2MOT_electric CVT_Hi mode.

As shown in FIGS. 2 and 11, in the 2MOT_electric CVT_Hi mode, all the first brake mechanism B1 to the sixth brake mechanism B6 are released. In addition, the selection mechanism 3 connects the rotation element d of the power distribution mechanism 1 and the rotation element e of the power combining mechanism 2 together via the selection element SH. Namely, the 2MOT_electric CVT_Hi mode differs from the 2MOT_electric CVT_Lo mode in that the rotation element g of the power combining mechanism 2 is not fixed.

As shown in FIG. 11, in the 2MOT_electric CVT_Hi mode, too, the engine ENG is driven, and the first motor-generator MG1 is driven for regeneration. In the 2MOT_electric CVT_Hi mode, since the vehicle is driven at high speeds, the revolution speed of the first motor-generator MG1 is decreased to a lower revolution speed than that in the 2MOT_electric CVT_Lo mode and the rotation speed of the rotation element d is increased. However, since the basic operation on the power distribution mechanism 1 side remains the same as that in the 2MOT_electric CVT_Lo mode, a description of the basic operation on the power distribution mechanism 1 side will be omitted here.

On the other hand, on the power combining mechanism 2 side, a high-speed rotation in the forward rotating direction (a high-speed forward traveling) is transmitted to the rotation element f of the power combining mechanism 2, which is the output portion thereof, by driving the second motor-generator MG2 in the forward rotating direction for power running. Additionally, the reaction torque attributed to the action torque TIN which is inputted from the power distribution mechanism 1 and the action torque TMG2 of the second motor-generator MG2 is generated in the rotation element f. However, in the 2MOT_electric CVT_Hi mode, since the rotation element g of the power combining mechanism 2 is not fixed, a reaction torque TOUT which is generated in the rotation element f becomes simply a total value of the action torque TIN which is inputted from the power distribution mechanism 1 and the action torque TMG2 of the second motor-generator MG2. By doing so, the 2MOT_electric CVT_Hi mode is realized in which the vehicle can travel forwards on the high speed and low torque driving force characteristic.

<2MOT_electric CVT_Rev Mode>

Figure 12:
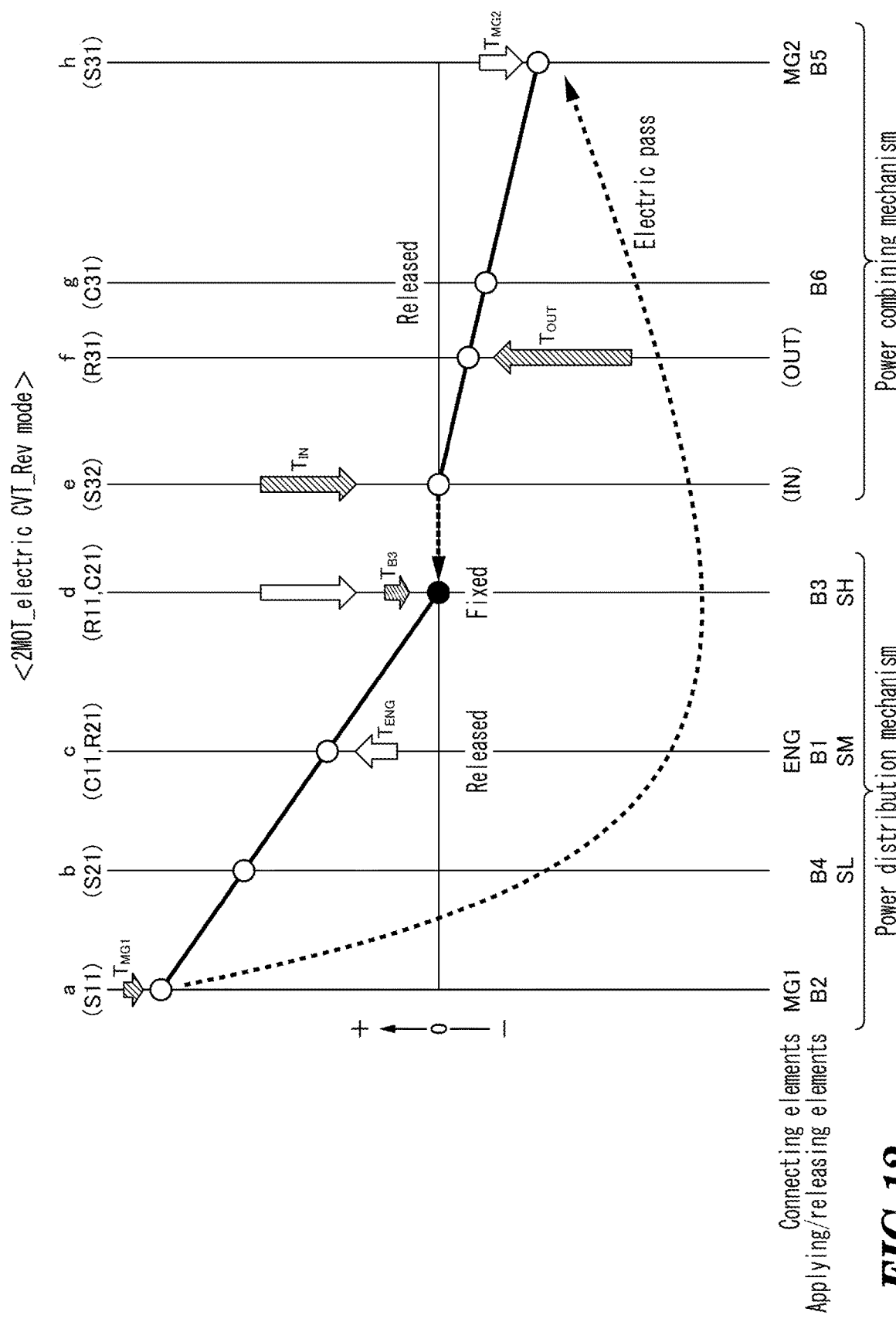
FIG. 12 is a nomographic chart of a 2MOT_electric CVT_Rev mode.

As shown in FIGS. 2 and 12, in a 2MOT_electric CVT_Rev mode, the third brake mechanism B3 is applied to fix the rotation element d of the power distribution mechanism 1 so as not to rotate. In addition, the selection mechanism 3 connects the rotation element d of the power distribution mechanism 1 and the rotation element e of the power combining mechanism 2 together via the selection element SH.

As shown in FIG. 12, in this mode, the engine ENG is driven, and the first motor-generator MG1 is driven for regeneration. As this occurs, since the rotation element d is fixed, the gradient of a collinearity on the power distribution mechanism 1 side changes at the rotation element d, which is a fixed point, as a fulcrum. As this occurs, an action torque TENG of the engine ENG is generated in the forward rotating direction in the rotation element c of the power distribution mechanism 1, whereby a reaction torque TMG1 in the reverse rotating direction is generated in the rotation element a and a reaction torque TB3 in the reverse rotating direction is generated in the rotation element d. However, this reaction torque TB3 is not transmitted to the rotation element e of the power combining mechanism 2 since the rotation element d is fixed.

On the other hand, on the power combining mechanism 2 side, since the rotation element e which is connected to the rotation element d is fixed so as not to rotate, the gradient of a collinearity on the power combining mechanism 2 side changes according to the rotation of the second motor-generator MG2 at the rotation element e as a fulcrum. Here, as shown in FIG. 12, a low speed rotation in the reverse rotating direction (a low speed reverse traveling) is transmitted to the rotation element f of the power combining mechanism 2, which is the output portion thereof, by driving the second motor-generator MG2 in the reverse rotating direction for power running. Additionally, a reaction torque attributed to the action torque TMG2 of the second motor-generator MG2 is generated in the rotation element f. However, in the 2MOT_electric CVT_Rev mode, since the rotation element e of the power combining mechanism 2 is also fixed, the action torque TMG2 is transmitted to the rotation element f in a lever ratio based on the rotation element e, which is a fixed point, as a fulcrum. Namely, a reaction torque TOUT in the forward rotating direction which is obtained by multiplying the action torque TMG2 by a lever ratio of eh/ef is generated in the rotation element f. By doing so, the 2MOT_electric CVT_Rev mode is realized in which the vehicle can travel reversely on the low speed and high torque driving force characteristic. A reaction torque TIN in the reverse rotating direction is generated in the rotation element e, which is the fixed point, and the total sum of torque on the power combining mechanism 2 side is caused to become 0 by this reaction torque TIN. In this mode, since there are no fears that unnecessary vibrations which are generated when the engine ENG is started are transmitted due to the rotation element d and the rotation element e which are connected together being unable to rotate relative to each other, it is possible to utilize preferably a so-called electric pass in which the second motor-generator MG2 is driven by means of generated electric power of the first motor-generator MG1.

<Fixed Gear Mode>

Figure 13:
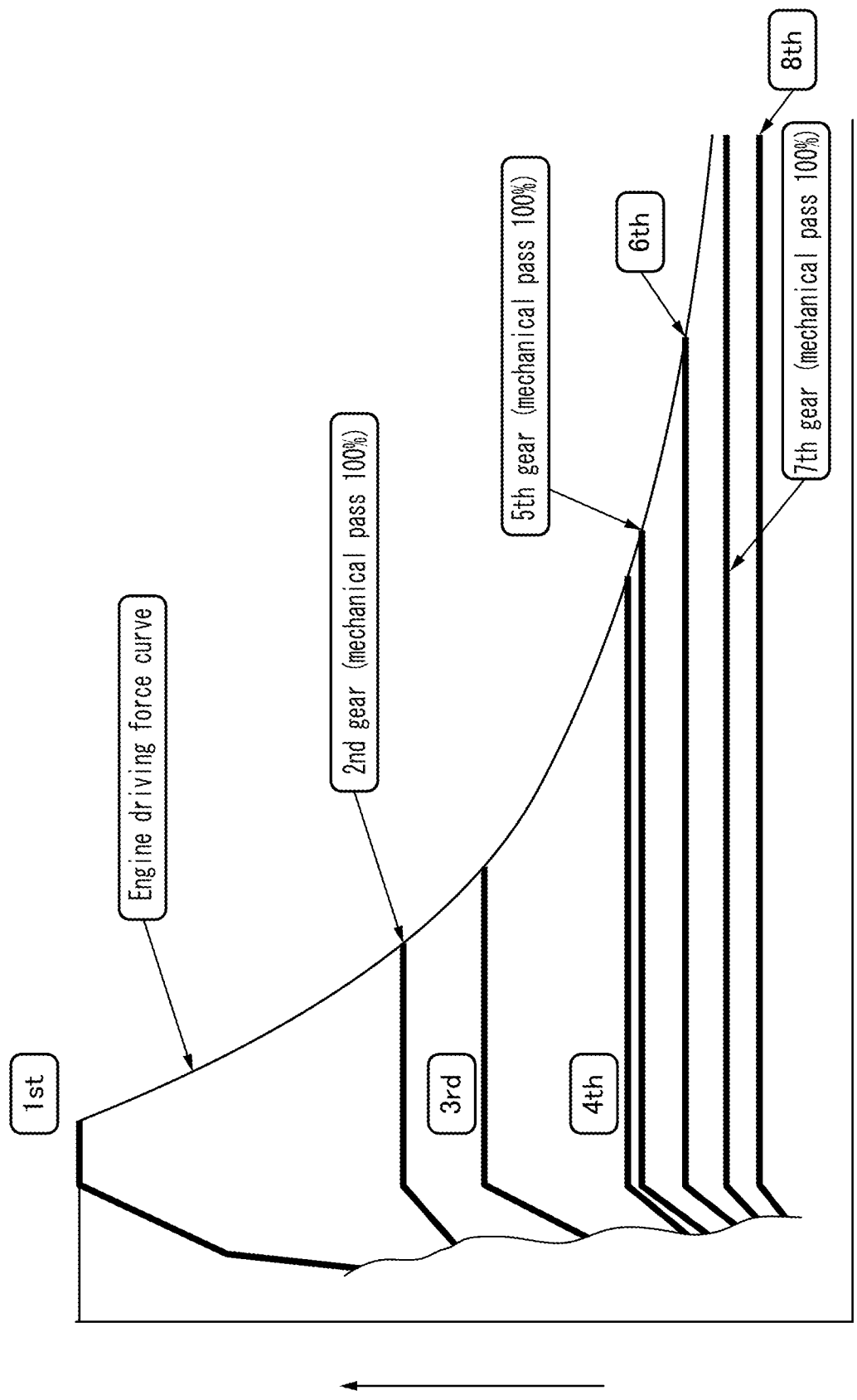
FIG. 13 is a driving force curve of a fixed gear mode.

As shown in FIG. 13, in the power transmission apparatus 100 of this embodiment, a fixed gear mode becomes possible in which the vehicle travels on the powers of the engine ENG, the first motor-generator MG1 and the second motor-generator MG2 while performing a gear shift in eight gears. Then, in three gears (second gear, fifth gear, seventh gear) of the eight gears, a so-called mechanical pass is realized 100% in which with the first motor-generator MG1 and the second motor-generator MG2 stopped, the vehicle runs only on the power of the engine ENG. In the fixed gear mode, unless the rotation elements a, h are fixed so as not to rotate by the second brake mechanism B2 and the fifth brake mechanism B5, the first motor-generator MG1 and the second motor-generator MG2 can be made use of as the electric motor or the generator. However, in the fixed gear mode of this embodiment which will be described below, the first motor-generator MG1 and the second motor-generator MG2 should be understood as rotating idly.

<Fixed Gear Mode—First Gear (Hybrid Driving)>

Figure 14:
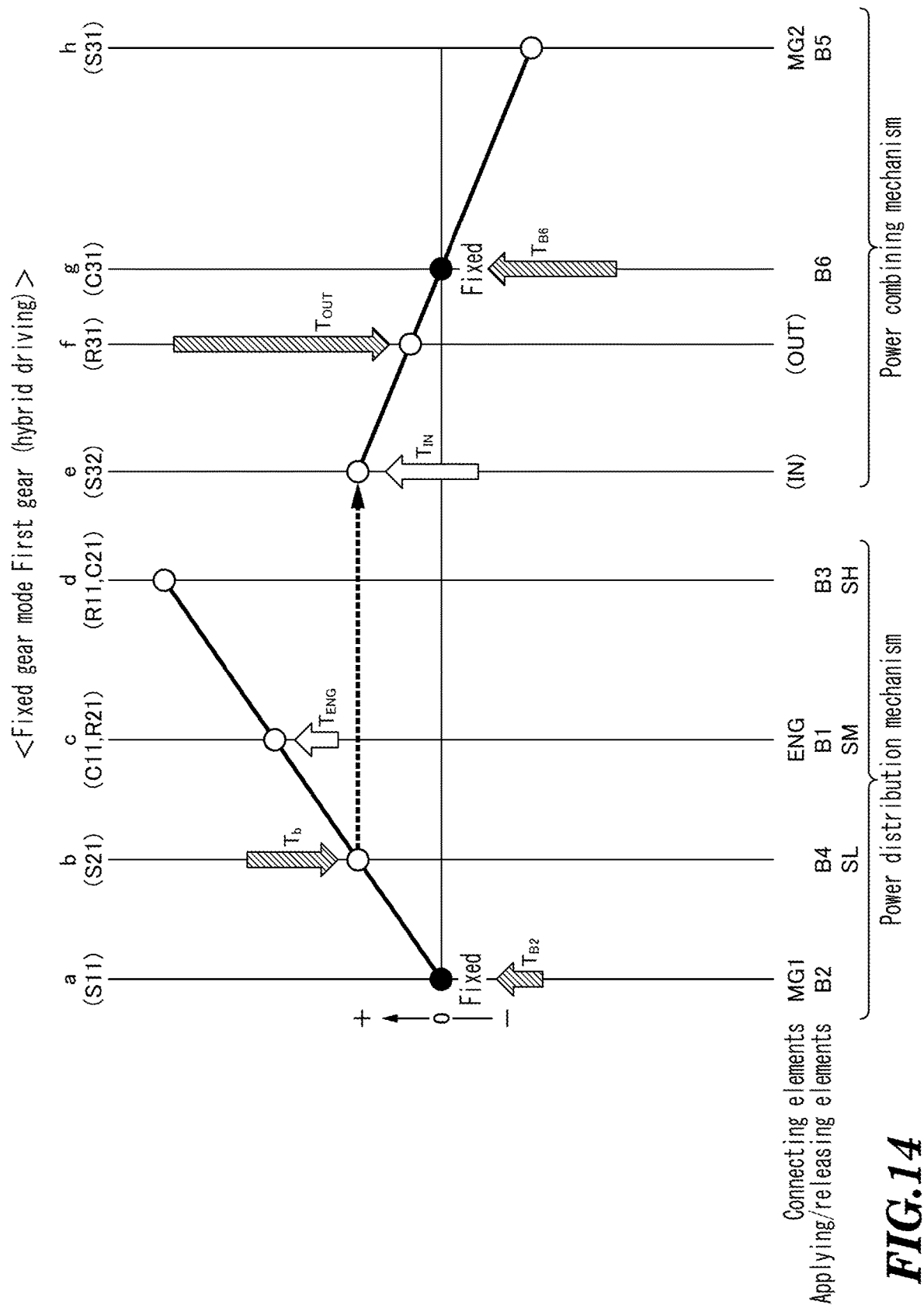
FIG. 14 is a nomographic chart of a fixed gear mode first gear (hybrid driving).

As shown in FIGS. 2 and 14, in a fixed gear mode—first gear (hybrid driving), the second brake mechanism B2 and the sixth brake mechanism B6 are applied, whereby the rotation element a of the power distribution mechanism 1 and the rotation element g of the power combining mechanism 2 are fixed so as not to rotate. In addition, the selection mechanism 3 connects the rotation element b of the power distribution mechanism 1 and the rotation element e of the power combining mechanism 2 together via the selection element SL.

As shown in FIG. 14, in the fixed gear mode—first gear (hybrid driving), the engine ENG is driven, and the first motor-generator MG1 is stopped. The gradient of a collinearity on the power distribution mechanism 1 side changes at the rotation element a, which is a fixed point, as a fulcrum. By doing so, the rotation element b rotates in low speeds in the forward rotating direction, and the rotation of the rotation element b is inputted into the rotation element e of the power combining mechanism 2. As this occurs, an action torque TENG of the engine ENG is generated in the rotation element c of the power distribution mechanism 1, and this action torque TENG is transmitted to the rotation element b in a lever ratio of ac/ab based on the rotation element a, which is a fixed point, as a fulcrum. Namely, a reaction torque Tb in the reverse rotating direction which is obtained by multiplying the action torque TENG by the lever ratio of ac/ab is generated in the rotation element b, and this reaction torque Tb is transmitted to the rotation element e of the power combining mechanism 2 as an action torque TIN in the forward rotating direction. A reaction torque TB2 acting in the forward rotating direction is generated in the rotation element a, which is the fixed point, and the total sum of torque on the power distribution mechanism 1 side is caused to become 0 by the reaction torque TB2.

On the other hand, the gradient of a collinearity on the power combining mechanism 2 side changes at the rotation element g, which is a fixed point, as a fulcrum. Consequently, when a low speed rotation in the forward rotating direction is inputted into the rotation element e from the power distribution mechanism 1 side, a low speed rotation in the forward rotating direction whose rotation speed is decreased according to the gradient (a forward traveling in first gear) is transmitted to the rotation element f of the power combining mechanism 2, which is the output portion thereof. In addition, a reaction torque attributed to an action torque TIN which is inputted from the power distribution mechanism 1 is generated in the rotation element f. However, in this mode, since the rotation element g of the power combining mechanism 2 is fixed, the action torque TIN is transmitted to the rotation element f in a lever ratio of eg/fg based on the rotation element g, which is a fixed point, as a fulcrum. Namely, a reaction torque TOUT in the reverse rotating direction which is obtained by multiplying the action torque TIN by the lever ratio of eg/fg is generated in the rotation element f. By doing so, the fixed gear mode—first gear (hybrid driving) is realized in which the vehicle can travel forwards on the low speed and high torque driving force characteristic. A reaction torque TB6 in the forward rotating direction is generated in the rotation element g, which is the fixed point, and the total sum of torque on the power combining mechanism 2 side is caused to become 0 by this reaction torque TB6.

<Fixed Gear Mode—Second Gear (Engine Driving)>

Figure 15:
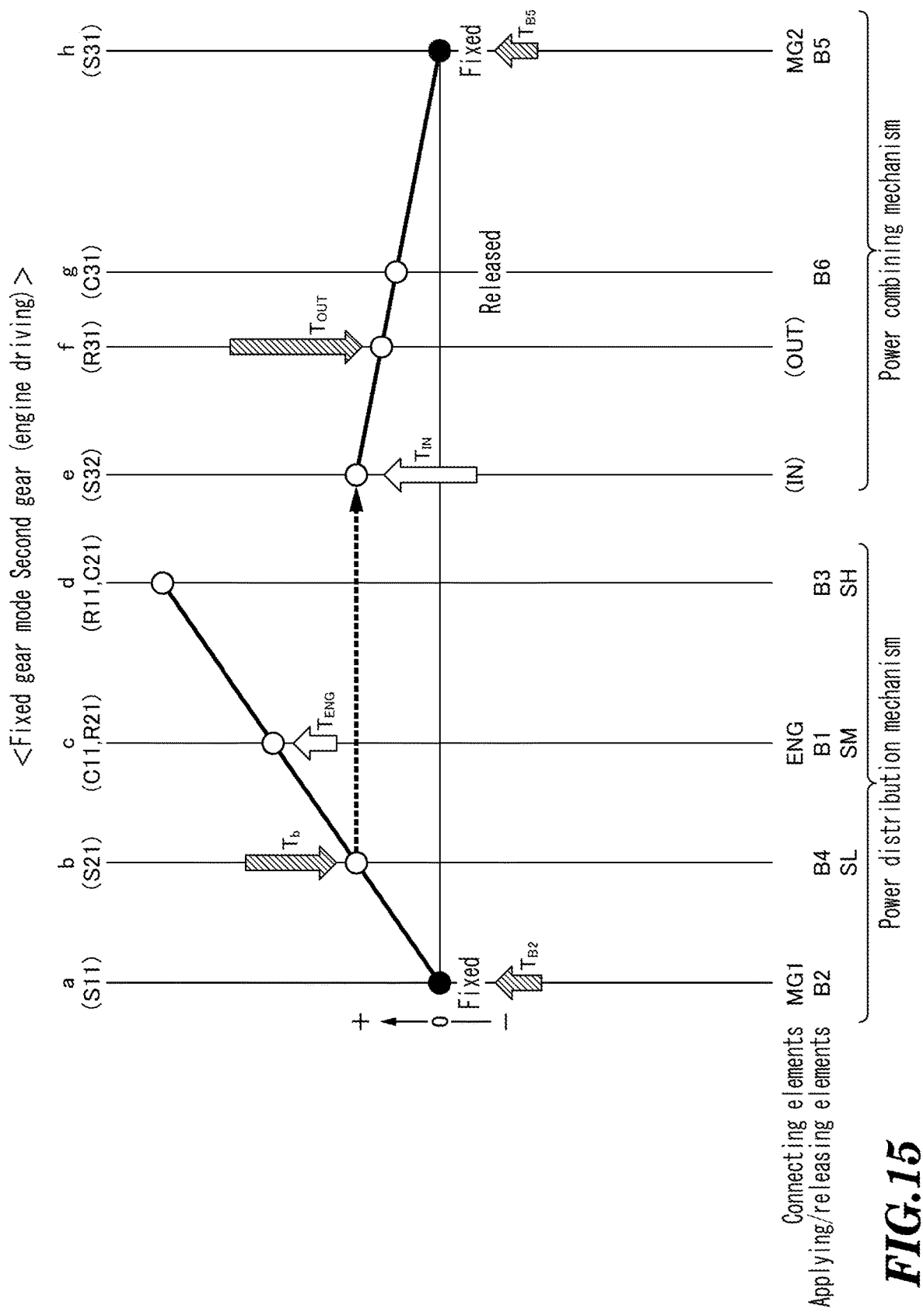
FIG. 15 is a nomographic chart of a fixed gear mode second gear (engine driving).

As shown in FIGS. 2 and 15, in a fixed gear mode—second gear (engine driving), the second brake mechanism B2 and the fifth brake mechanism B5 are applied, whereby the rotation element a of the power distribution mechanism 1 and the rotation element h of the power combining mechanism 2 are fixed so as not to rotate. In addition, the selection mechanism 3 connects the rotation element b of the power distribution mechanism 1 and the rotation element e of the power combining mechanism 2 together via the selection element SL. In the fixed gear mode—second gear (engine driving), since the rotation element a of the power distribution mechanism 1 and the rotation element h of the power combining mechanism 2 are fixed so as not to rotate, both the first motor-generator MG1 which is connected to the rotation element a and the second motor-generator MG2 which is connected to the rotation element h are unable to rotate, whereby a mechanical pass is realized 100%.

As shown in FIG. 15, the operation on the power distribution mechanism 1 side in the fixed gear mode—second gear (engine driving) is similar to the operation on the power distribution mechanism 1 side in the fixed gear mode—first gear (hybrid driving).

On the other hand, the gradient of a collinearity on the power combining mechanism 2 side (which is smaller than that in the first gear) changes at the rotation element h, which is a fixed point, as a fulcrum. Consequently, when a low speed rotation in the forward rotating direction is inputted into the rotation element e from the power distribution mechanism 1 side, a low speed rotation in the forward rotating direction whose rotation speed is decreased according to the gradient (a forward traveling in second gear) is transmitted to the rotation element f of the power combining mechanism 2, which is the output portion thereof. In addition, a reaction torque attributed to the action torque TIN which is inputted from the power distribution mechanism 1 is generated in the rotation element f. However, in this mode, since the rotation element h of the power combining mechanism 2 is fixed, the action torque TIN is transmitted to the rotation element f in a lever ratio of eh/fh based on the rotation element h, which is a fixed point, as a fulcrum. Namely, a reaction torque TOUT in the reverse rotating direction which is obtained by multiplying the action torque TIN by a lever ratio of eh/fh is generated in the rotation element f. By doing so, the fixed gear mode—second gear (engine driving) is realized in which the vehicle can travel forwards on the low speed and high torque driving force characteristic. A reaction torque TB5 in the forward rotating direction is generated in the rotation element h, which is the fixed point, and the total sum of torque on the power combining mechanism 2 side is caused to become 0 by this reaction torque TB5.

<Fixed Gear Mode—Third Gear (Hybrid Driving I)>

Figure 16:
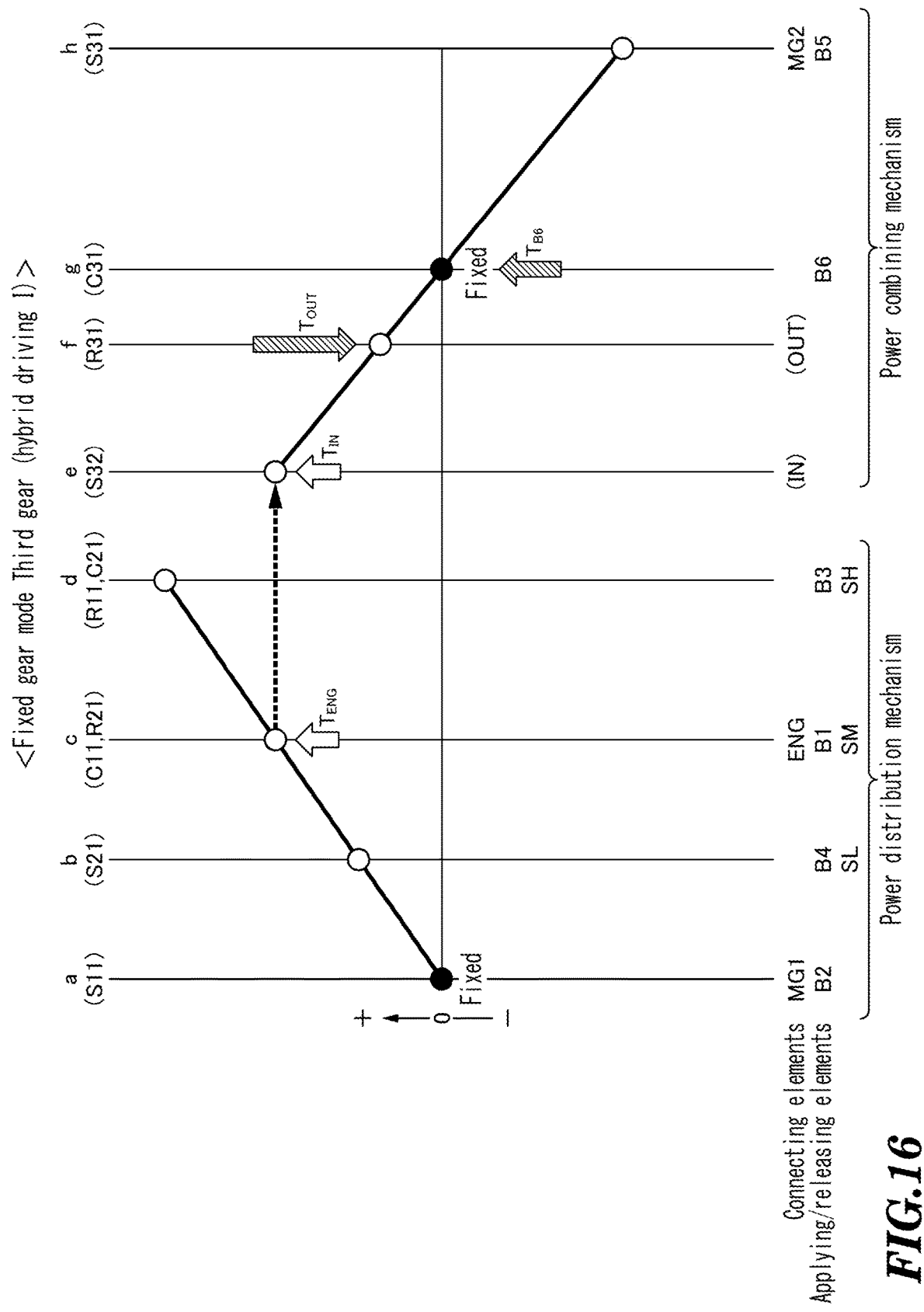
FIG. 16 is a nomographic chart of a fixed gear mode third gear (hybrid driving I).

As shown in FIGS. 2 and 16, in a fixed gear mode—third gear (hybrid driving I), the second brake mechanism B2 and the sixth brake mechanism B6 are applied, whereby the rotation element a of the power distribution mechanism 1 and the rotation element g of the power combining mechanism 2 are fixed so as not to rotate. In addition, the selection mechanism 3 connects the rotation element c of the power distribution mechanism 1 and the rotation element e of the power combining mechanism 2 together via the selection element SM.

As shown in FIG. 16, in the fixed gear mode—third (hybrid driving I), the engine ENG is driven, and the first motor-generator MG1 is stopped. The gradient of a collinearity on the power distribution mechanism 1 side changes at the rotation element a, which is a fixed point, as a fulcrum. By doing so, the rotation element c rotates in middle speeds in the forward rotating direction, and the rotation of the rotation element c is inputted into the rotation element e of the power combining mechanism 2. As this occurs, an action torque TENG of the engine ENG is generated in the rotation element c of the power distribution mechanism 1, and this action torque TENG is transmitted to the rotation element e of the power combining mechanism 2 as an action torque TIN in the forward rotating direction.

On the other hand, the gradient of a collinearity on the power combining mechanism 2 side changes at the rotation element g, which is a fixed point, as a fulcrum. Consequently, when a middle speed rotation in the forward rotating direction is inputted into the rotation element e from the power distribution mechanism 1 side, a middle speed rotation in the forward rotating direction whose rotation speed is decreased according to the gradient (a forward traveling in third gear) is transmitted to the rotation element f of the power combining mechanism 2, which is the output portion thereof. In addition, a reaction torque attributed to an action torque TIN which is inputted from the power distribution mechanism 1 is generated in the rotation element f. However, in this mode, since the rotation element g of the power combining mechanism 2 is fixed, the action torque TIN is transmitted to the rotation element f in a lever ratio of eg/fg based on the rotation element g, which is a fixed point, as a fulcrum. Namely, a reaction torque TOUT in the reverse rotating direction which is obtained by multiplying the action torque TIN by the lever ratio of eg/fg is generated in the rotation element f. By doing so, the fixed gear mode—third gear (hybrid driving I) is realized in which the vehicle can travel forwards on a middle speed and middle torque driving force characteristic. A reaction torque TB6 in the forward rotating direction is generated in the rotation element g, which is the fixed point, and the total sum of torque on the power combining mechanism 2 side is caused to become 0 by this reaction torque TB6.

<Fixed Gear Mode—Third Gear (Hybrid Driving II)>

Figure 17:
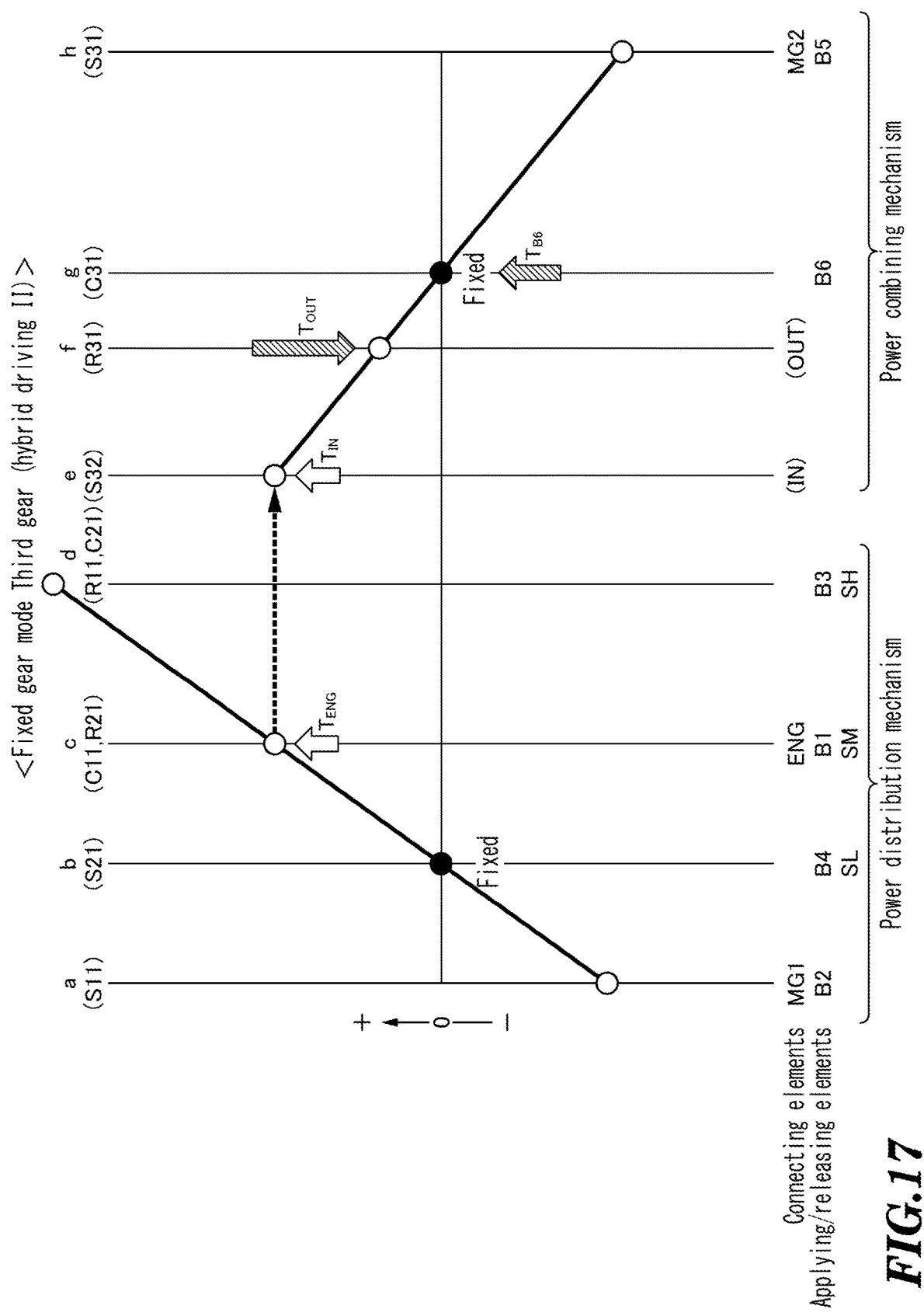
FIG. 17 is a nomographic chart of a fixed gear mode third gear (hybrid driving II).

As shown in FIGS. 2 and 17, in a fixed gear mode—third gear (hybrid driving II), the fourth brake mechanism B4 and the sixth brake mechanism B6 are applied, whereby the rotation element b of the power distribution mechanism 1 and the rotation element g of the power combining mechanism 2 are fixed so as not to rotate. In addition, the selection mechanism 3 connects the rotation element c of the power distribution mechanism 1 and the rotation element e of the power combining mechanism 2 together via the selection element SM.

As shown in FIG. 17, in the fixed gear mode—third gear (hybrid driving II), the engine ENG is driven. A collinearity on the power distribution mechanism 1 side takes the rotation element b which is a fixed point as a fulcrum. However, the rotation of the rotation element c is inputted directly into the rotation element e of the power combining mechanism 2. As this occurs, an action torque TENG of the engine ENG is generated in the rotation element c of the power distribution mechanism 1, and this action torque TENG is transmitted to the rotation element e of the power combining mechanism 2 as an action torque TIN in the forward rotating direction.

On the other hand, the operation on the power combining mechanism 2 side is similar to the operation on the power combining mechanism 2 side in the fixed gear mode—third gear (hybrid driving I). Consequently, also, by doing so, the fixed gear mode—third gear (hybrid driving II) is realized in which the vehicle can travel forwards on the middle speed and middle torque driving force characteristic.

<Fixed Gear Mode—Fourth Gear (Hybrid Driving)>

Figure 18:
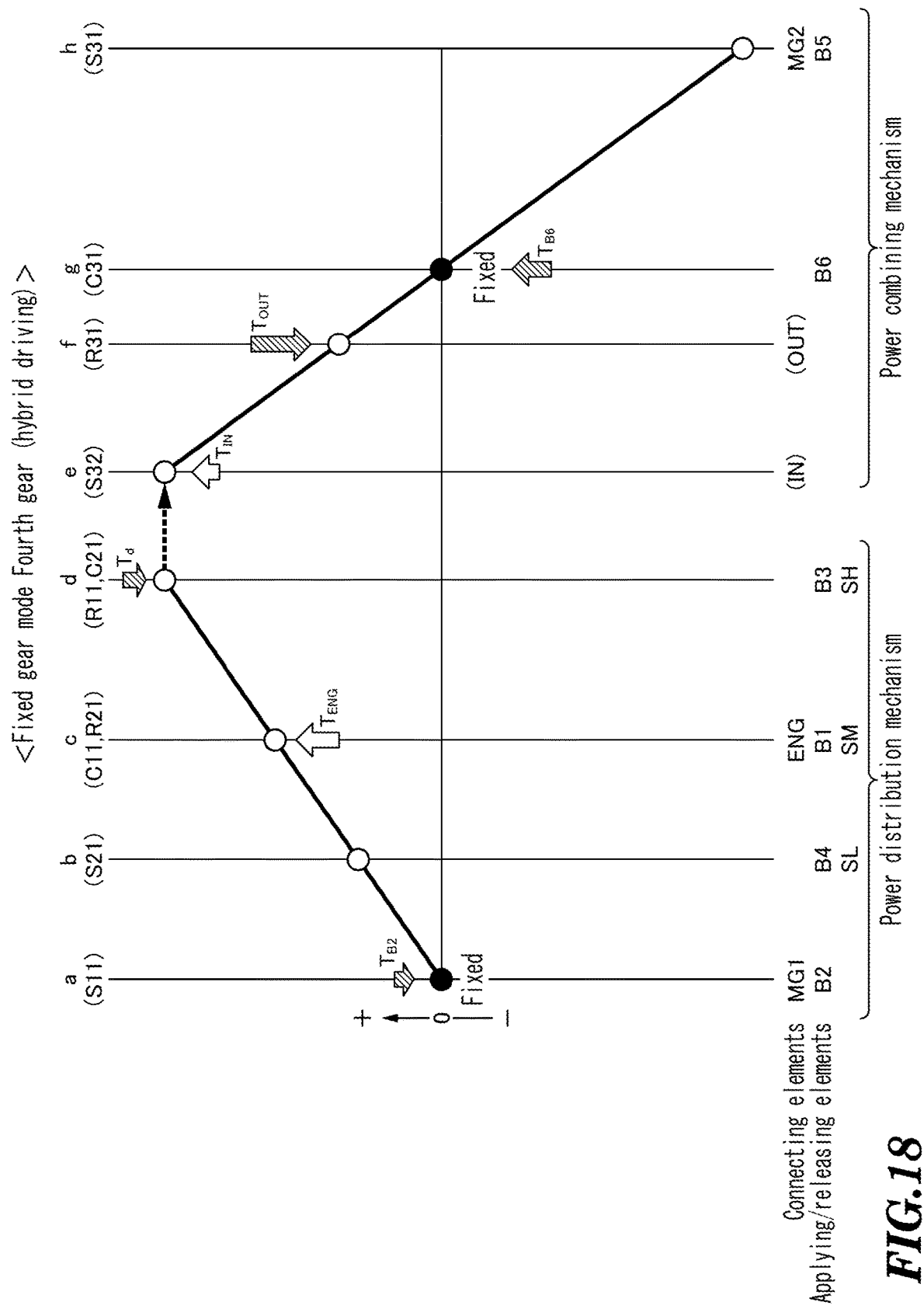
FIG. 18 is a nomographic chart of a fixed gear mode fourth gear (hybrid driving).

As shown in FIGS. 2 and 18, in a fixed gear mode—fourth gear (hybrid driving), the second brake mechanism B2 and the sixth brake mechanism B6 are applied, whereby the rotation element a of the power distribution mechanism 1 and the rotation element g of the power combining mechanism 2 are fixed so as not to rotate. In addition, the selection mechanism 3 connects the rotation element d of the power distribution mechanism 1 and the rotation element e of the power combining mechanism 2 together via the selection element SH.

As shown in FIG. 18, in the fixed gear mode—fourth gear (hybrid driving), the engine ENG is driven, and the first motor-generator MG1 is stopped. The gradient of a collinearity on the power distribution mechanism 1 side changes at the rotation element a, which is a fixed point, as a fulcrum. By doing so, the rotation element d rotates in high speeds in the forward rotating direction, and the rotation of the rotation element d is inputted into the rotation element e of the power combining mechanism 2. As this occurs, an action torque TENG of the engine ENG is generated in the rotation element c of the power distribution mechanism 1, and this action torque TENG is transmitted to the rotation element d in a lever ratio of ac/ad based on the rotation element a, which is the fixed point, as a fulcrum. Namely, a reaction torque Td acting in the reverse rotating direction which is obtained by multiplying the action torque TENG by the lever ratio of ac/ad is generated in the rotation element d, and this reaction torque Td is transmitted to the rotation element e of the power combining mechanism 2 as an action torque TIN acting in the forward rotating direction. A reaction torque TB2 acting in the forward rotating direction is generated in the rotation element a, which is the fixed point, and the total sum of torque on the power distribution mechanism 1 side is caused to become 0 by the reaction torque TB2.

On the other hand, the gradient of a collinearity on the power combining mechanism 2 side changes at the rotation element g, which is a fixed point, as a fulcrum. Consequently, when a high speed rotation in the forward rotating direction is inputted into the rotation element e from the power distribution mechanism 1 side, a middle speed rotation in the forward rotating direction whose rotation speed is decreased according to the gradient (a forward traveling in fourth gear) is transmitted to the rotation element f of the power combining mechanism 2, which is the output portion thereof. In addition, a reaction torque attributed to an action torque TIN which is inputted from the power distribution mechanism 1 is generated in the rotation element f. However, in this mode, since the rotation element g of the power combining mechanism 2 is fixed, the action torque TIN is transmitted to the rotation element f in a lever ratio of eg/fg based on the rotation element g, which is a fixed point, as a fulcrum. Namely, a reaction torque TOUT in the reverse rotating direction which is obtained by multiplying the action torque TIN by the lever ratio of eg/fg is generated in the rotation element f. By doing so, the fixed gear mode—fourth gear (hybrid driving) is realized in which the vehicle can travel forwards on the middle speed and middle torque driving force characteristic. A reaction torque TB6 in the forward rotating direction is generated in the rotation element g, which is the fixed point, and the total sum of torque on the power combining mechanism 2 side is caused to become 0 by this reaction torque TB6.

<Fixed Gear Mode—Fifth Gear (Engine Driving)>

Figure 19:
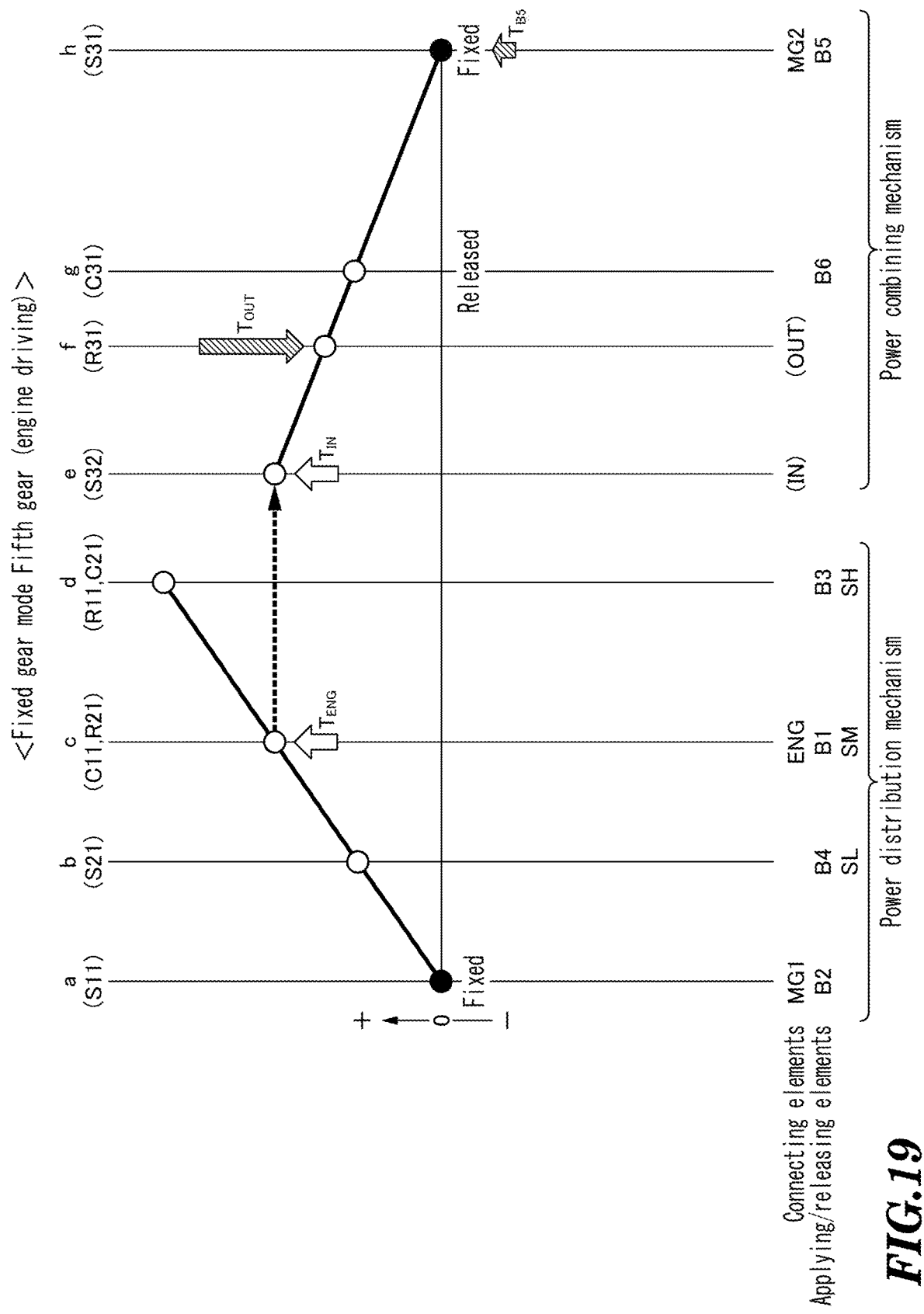
FIG. 19 is a nomographic chart of a fixed gear mode fifth gear (engine driving).

As shown in FIGS. 2 and 19, in a fixed gear mode—fifth gear (engine driving), the second brake mechanism B2 and the fifth brake mechanism B5 are applied, whereby the rotation element a of the power distribution mechanism 1 and the rotation element h of the power combining mechanism 2 are fixed so as not to rotate. In addition, the selection mechanism 3 connects the rotation element c of the power distribution mechanism 1 and the rotation element e of the power combining mechanism 2 together via the selection element SM. In the fixed gear mode—fifth gear (engine driving), since the rotation element a of the power distribution mechanism 1 and the rotation element h of the power combining mechanism 2 are fixed so as not to rotate, both the first motor-generator MG1 which is connected to the rotation element a and the second motor-generator MG2 which is connected to the rotation element h are unable to rotate, whereby a mechanical pass is realized 100%.

As shown in FIG. 19, in the fixed gear mode—fifth gear (engine driving), the engine ENG is driven, and the first motor-generator MG1 is stopped. A collinearity on the power distribution mechanism 1 side takes the rotation element a which is a fixed point as a fulcrum. However, the rotation of the rotation element c is inputted directly into the rotation element e of the power combining mechanism 2. As this occurs, an action torque TENG of the engine ENG is generated in the rotation element c of the power distribution mechanism 1, and this action torque TENG is transmitted to the rotation element e of the power combining mechanism 2 as an action torque TIN in the forward rotating direction.

On the other hand, the gradient of a collinearity on the power combining mechanism 2 side changes at the rotation element h, which is a fixed point, as a fulcrum. Consequently, when a middle speed rotation in the forward rotating direction is inputted into the rotation element e from the power distribution mechanism 1 side, a middle speed rotation in the forward rotating direction whose rotation speed is decreased according to the gradient (a forward traveling in fifth gear) is transmitted to the rotation element f of the power combining mechanism 2, which is the output portion thereof. In addition, a reaction torque attributed to the action torque TIN which is inputted from the power distribution mechanism 1 is generated in the rotation element f. However, in this mode, since the rotation element h of the power combining mechanism 2 is fixed, the action torque TIN is transmitted to the rotation element f in a lever ratio of eh/fh based on the rotation element h, which is a fixed point, as a fulcrum. Namely, a reaction torque TOUT in the reverse rotating direction which is obtained by multiplying the action torque TIN by a lever ratio of eh/fh is generated in the rotation element f. By doing so, the fixed gear mode—fifth gear (engine driving) is realized in which the vehicle can travel forwards on a middle speed and middle torque driving force characteristic. A reaction torque TB5 in the forward rotating direction is generated in the rotation element h, which is the fixed point, and the total sum of torque on the power combining mechanism 2 side is caused to become 0 by this reaction torque TB5.

<Fixed Gear Mode—Fifth Gear (Hybrid Driving)>

Figure 20:
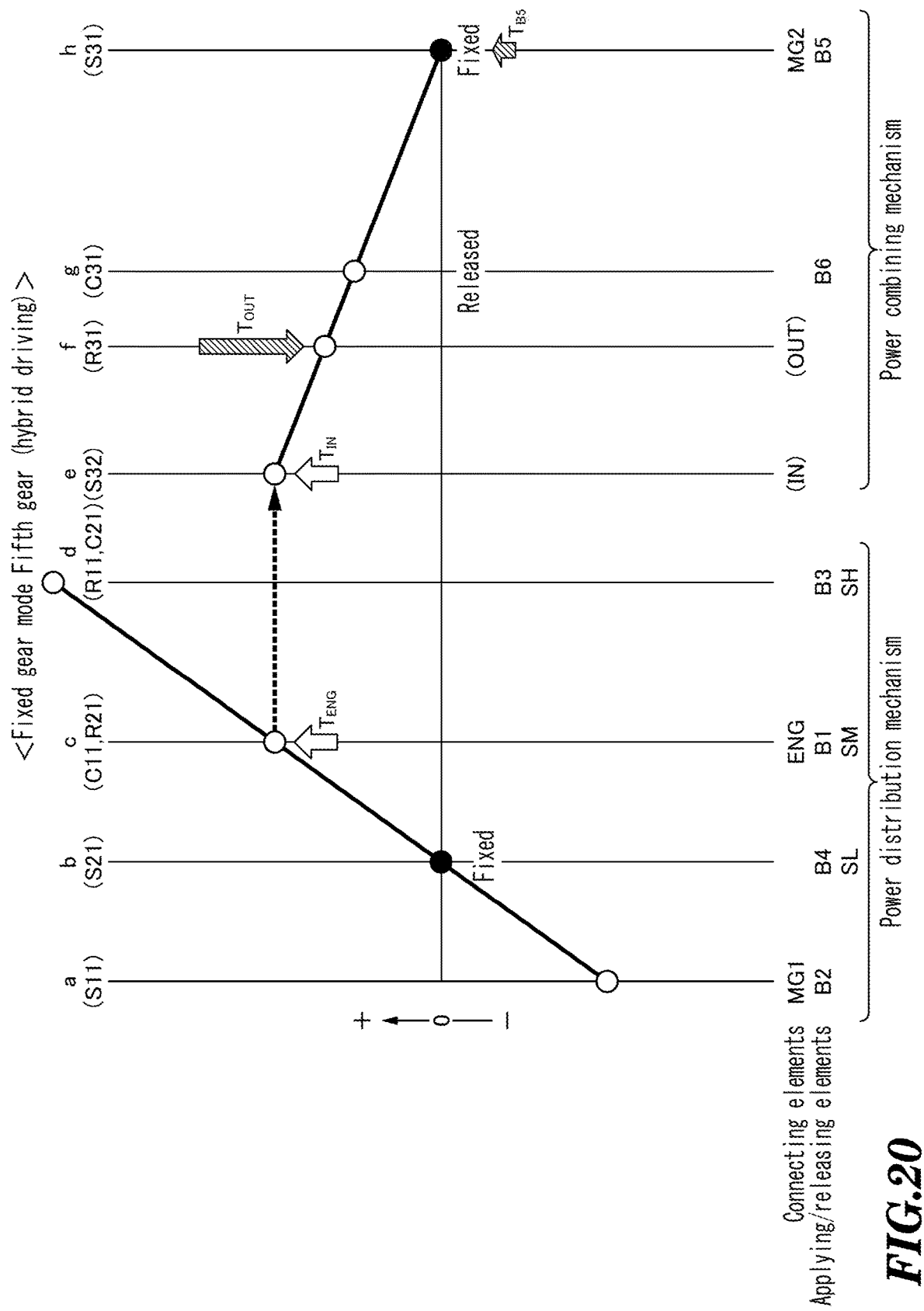
FIG. 20 is a nomographic chart of a fixed gear mode fifth gear (hybrid driving).

As shown in FIGS. 2 and 20, in a fixed gear mode—fifth gear (hybrid driving), the fourth brake mechanism B4 and the fifth brake mechanism B5 are applied, whereby the rotation element b of the power distribution mechanism 1 and the rotation element h of the power combining mechanism 2 are fixed so as not to rotate. In addition, the selection mechanism 3 connects the rotation element c of the power distribution mechanism 1 and the rotation element e of the power combining mechanism 2 together via the selection element SM.

As shown in FIG. 20, in the fixed gear mode—fifth gear (hybrid driving), the engine ENG is driven. A collinearity on the power distribution mechanism 1 side takes the rotation element b which is a fixed point as a fulcrum. However, the rotation of the rotation element c is inputted directly into the rotation element e of the power combining mechanism 2. As this occurs, an action torque TENG of the engine ENG is generated in the rotation element c of the power distribution mechanism 1, and this action torque TENG is transmitted to the rotation element e of the power combining mechanism 2 as an action torque TIN in the forward rotating direction.

On the other hand, the operation on the power combining mechanism 2 side is similar to the operation on the power combining mechanism 2 side in the fixed gear mode—fifth gear (engine driving). Consequently, also, by doing so, the fixed gear mode—fifth gear (hybrid driving) is realized in which the vehicle can travel forwards on the middle speed and middle torque driving force characteristic.

<Fixed Gear Mode—Sixth Gear (Hybrid Driving)>

Figure 21:
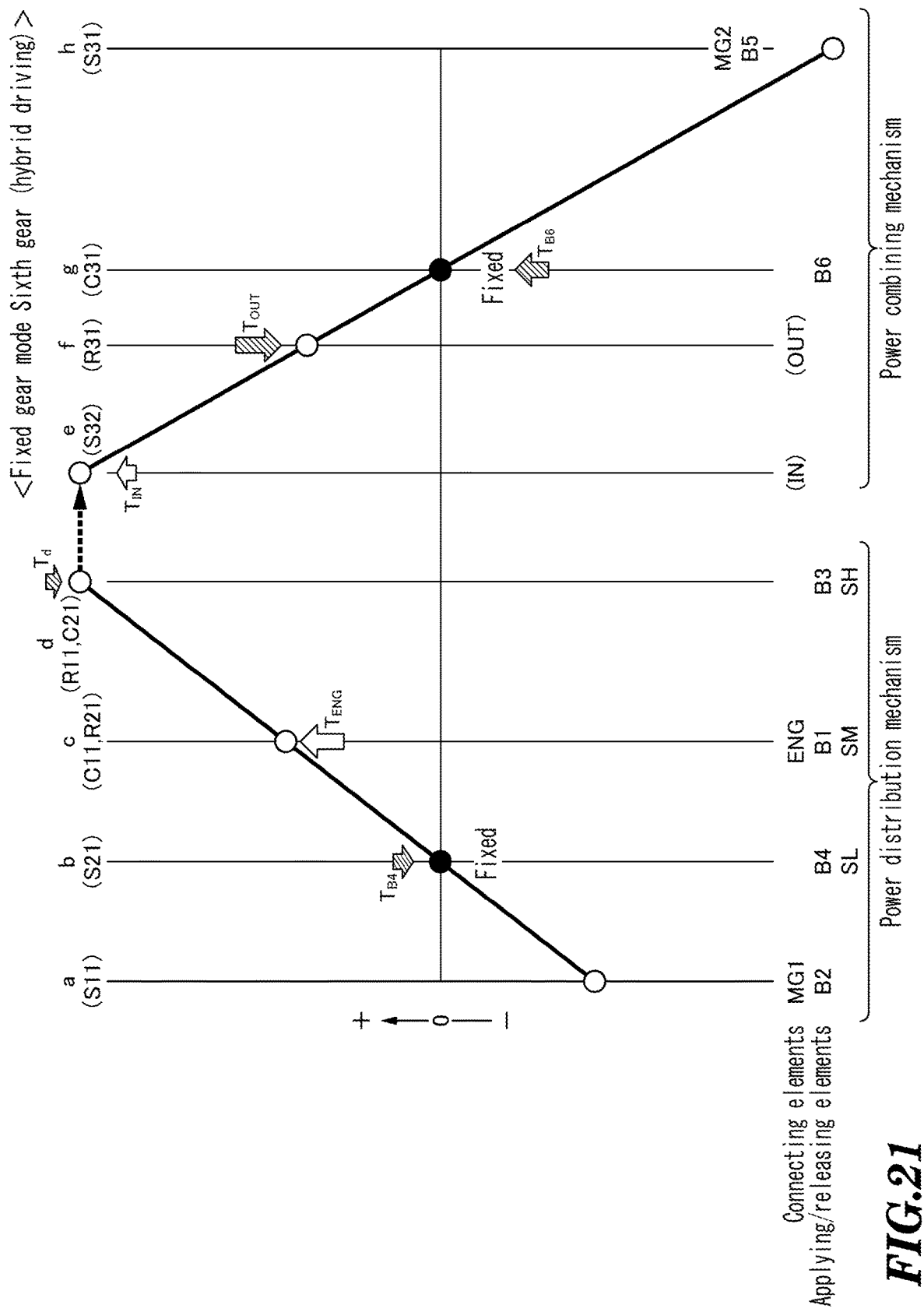
FIG. 21 is a nomographic chart of a fixed gear mode sixth gear (hybrid driving).

As shown in FIGS. 2 and 21, in a fixed gear mode—sixth gear (hybrid driving), the fourth brake mechanism B4 and the sixth brake mechanism B6 are applied, whereby the rotation element b of the power distribution mechanism 1 and the rotation element g of the power combining mechanism 2 are fixed so as not to rotate. In addition, the selection mechanism 3 connects the rotation element d of the power distribution mechanism 1 and the rotation element e of the power combining mechanism 2 together via the selection element SH.

As shown in FIG. 21, in the fixed gear mode—sixth gear (hybrid driving), the engine ENG is driven. The gradient of a collinearity on the power distribution mechanism 1 side changes at the rotation element b, which is a fixed point, as a fulcrum. By doing so, the rotation element d rotates in high speeds in the forward rotating direction, and the rotation of the rotation element d is inputted into the rotation element e of the power combining mechanism 2. As this occurs, an action torque TENG of the engine ENG is generated in the rotation element c of the power distribution mechanism 1, and this action torque TENG is transmitted to the rotation element d in a lever ratio of bc/bd based on the rotation element b, which is the fixed point, as a fulcrum. Namely, a reaction torque Td acting in the reverse rotating direction which is obtained by multiplying the action torque TENG by the lever ratio of bc/bd is generated in the rotation element d, and this reaction torque Td is transmitted to the rotation element e of the power combining mechanism 2 as an action torque TIN acting in the forward rotating direction. A reaction torque TB4 acting in the reverse rotating direction is generated in the rotation element b, which is the fixed point, and the total sum of torque on the power distribution mechanism 1 side is caused to become 0 by the reaction torque TB4.

On the other hand, the gradient of a collinearity on the power combining mechanism 2 side changes at the rotation element g, which is a fixed point, as a fulcrum. Consequently, when a high speed rotation in the forward rotating direction is inputted into the rotation element e from the power distribution mechanism 1 side, a high speed rotation in the forward rotating direction whose rotation speed is decreased according to the gradient (a forward traveling in sixth gear) is transmitted to the rotation element f of the power combining mechanism 2, which is the output portion thereof. In addition, a reaction torque attributed to an action torque TIN which is inputted from the power distribution mechanism 1 is generated in the rotation element f. However, in this mode, since the rotation element g of the power combining mechanism 2 is fixed, the action torque TIN is transmitted to the rotation element f in a lever ratio of eg/fg based on the rotation element g, which is a fixed point, as a fulcrum. Namely, a reaction torque TOUT in the reverse rotating direction which is obtained by multiplying the action torque TIN by the lever ratio of eg/fg is generated in the rotation element f. By doing so, the fixed gear mode—sixth gear (hybrid driving) is realized in which the vehicle can travel forwards on a high speed and low torque driving force characteristic. A reaction torque TB6 in the forward rotating direction is generated in the rotation element g, which is the fixed point, and the total sum of torque on the power combining mechanism 2 side is caused to become 0 by this reaction torque TB6.

<Fixed Gear Mode—Seventh Gear (Engine Driving)>

Figure 22:
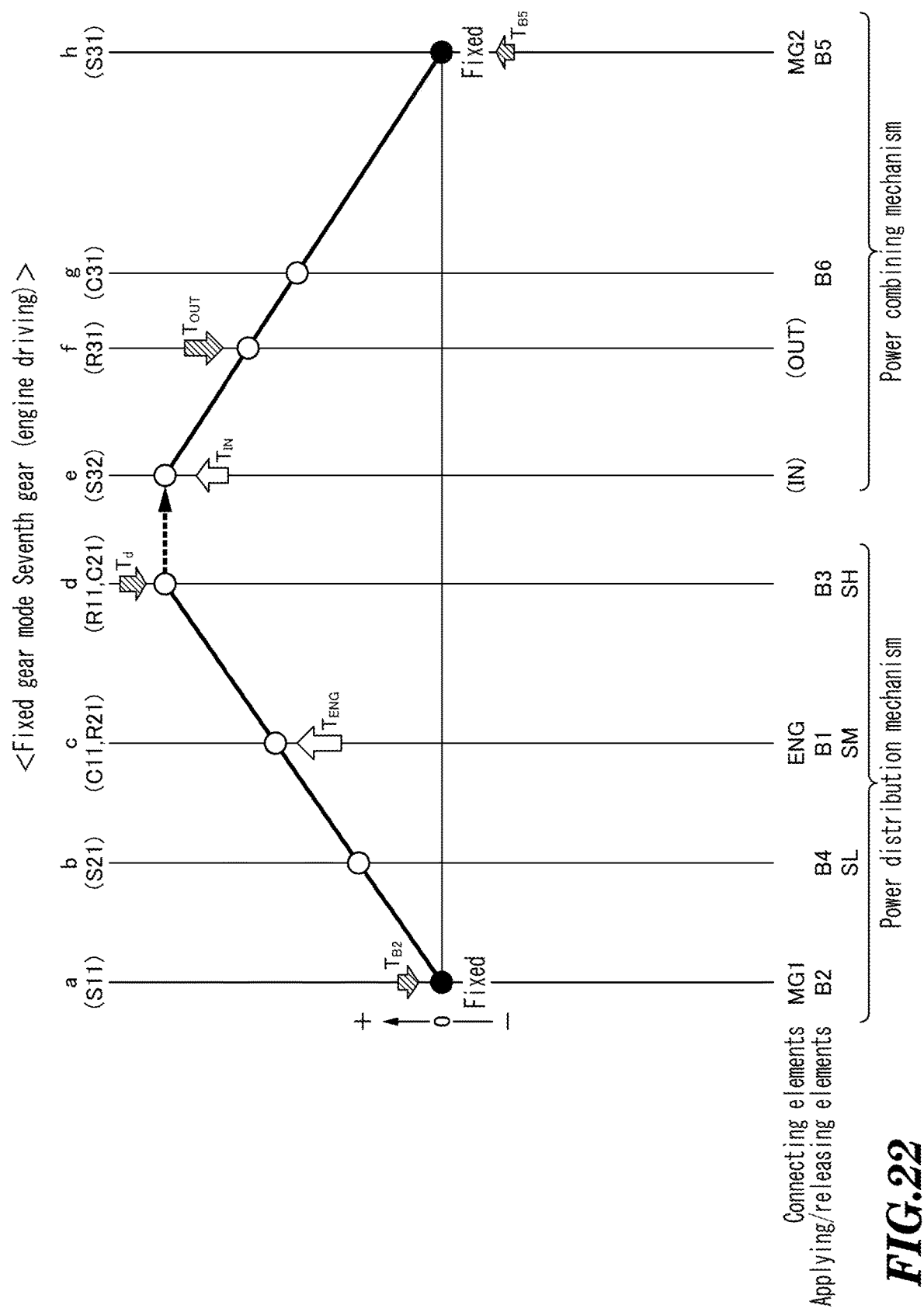
FIG. 22 is a nomographic chart of a fixed gear mode seventh gear (engine driving).

As shown in FIGS. 2 and 22, in a fixed gear mode—seventh gear (engine driving), the second brake mechanism B2 and the fifth brake mechanism B5 are applied, whereby the rotation element a of the power distribution mechanism 1 and the rotation element h of the power combining mechanism 2 are fixed so as not to rotate. In addition, the selection mechanism 3 connects the rotation element d of the power distribution mechanism 1 and the rotation element e of the power combining mechanism 2 together via the selection element SH. In the fixed gear mode—seventh gear (engine driving), since the rotation element a of the power distribution mechanism 1 and the rotation element h of the power combining mechanism 2 are fixed so as not to rotate, both the first motor-generator MG1 which is connected to the rotation element a and the second motor-generator MG2 which is connected to the rotation element h are unable to rotate, whereby a mechanical pass is realized 100%.

As shown in FIG. 22, in the fixed gear mode—seventh gear (engine driving), the engine ENG is driven, and the first motor-generator MG1 is stopped. The gradient of a collinearity on the power distribution mechanism 1 side changes at the rotation element a, which is a fixed point, as a fulcrum. By doing so, the rotation element d rotates in high speeds in the forward rotating direction, and the rotation of the rotation element d is inputted into the rotation element e of the power combining mechanism 2. As this occurs, an action torque TENG of the engine ENG is generated in the rotation element c of the power distribution mechanism 1, and this action torque TENG is transmitted to the rotation element d in a lever ratio of ac/ad based on the rotation element a, which is the fixed point, as a fulcrum. Namely, a reaction torque Td acting in the reverse rotating direction which is obtained by multiplying the action torque TENG by the lever ratio of ac/ad is generated in the rotation element d, and this reaction torque Td is transmitted to the rotation element e of the power combining mechanism 2 as an action torque TIN acting in the forward rotating direction. A reaction torque TB2 acting in the reverse rotating direction is generated in the rotation element a, which is the fixed point, and the total sum of torque on the power distribution mechanism 1 side is caused to become 0 by the reaction torque TB2.

On the other hand, the gradient of a collinearity on the power combining mechanism 2 side changes at the rotation element h, which is a fixed point, as a fulcrum. Consequently, when a high speed rotation in the forward rotating direction is inputted into the rotation element e from the power distribution mechanism 1 side, a high speed rotation in the forward rotating direction whose rotation speed is decreased according to the gradient (a forward traveling in seventh gear) is transmitted to the rotation element f of the power combining mechanism 2, which is the output portion thereof. In addition, a reaction torque attributed to the action torque TIN which is inputted from the power distribution mechanism 1 is generated in the rotation element f. However, in this mode, since the rotation element h of the power combining mechanism 2 is fixed, the action torque TIN is transmitted to the rotation element f in a lever ratio of eh/fh based on the rotation element h, which is a fixed point, as a fulcrum. Namely, a reaction torque TOUT in the reverse rotating direction which is obtained by multiplying the action torque TIN by a lever ratio of eh/fh is generated in the rotation element f. By doing so, the fixed gear mode—seventh gear (engine driving) is realized in which the vehicle can travel forwards on the high speed and low torque driving force characteristic. A reaction torque TB5 in the forward rotating direction is generated in the rotation element h, which is the fixed point, and the total sum of torque on the power combining mechanism 2 side is caused to become 0 by this reaction torque TB5.

<Fixed Gear Mode—Eighth Gear (Hybrid Driving)>

Figure 23:
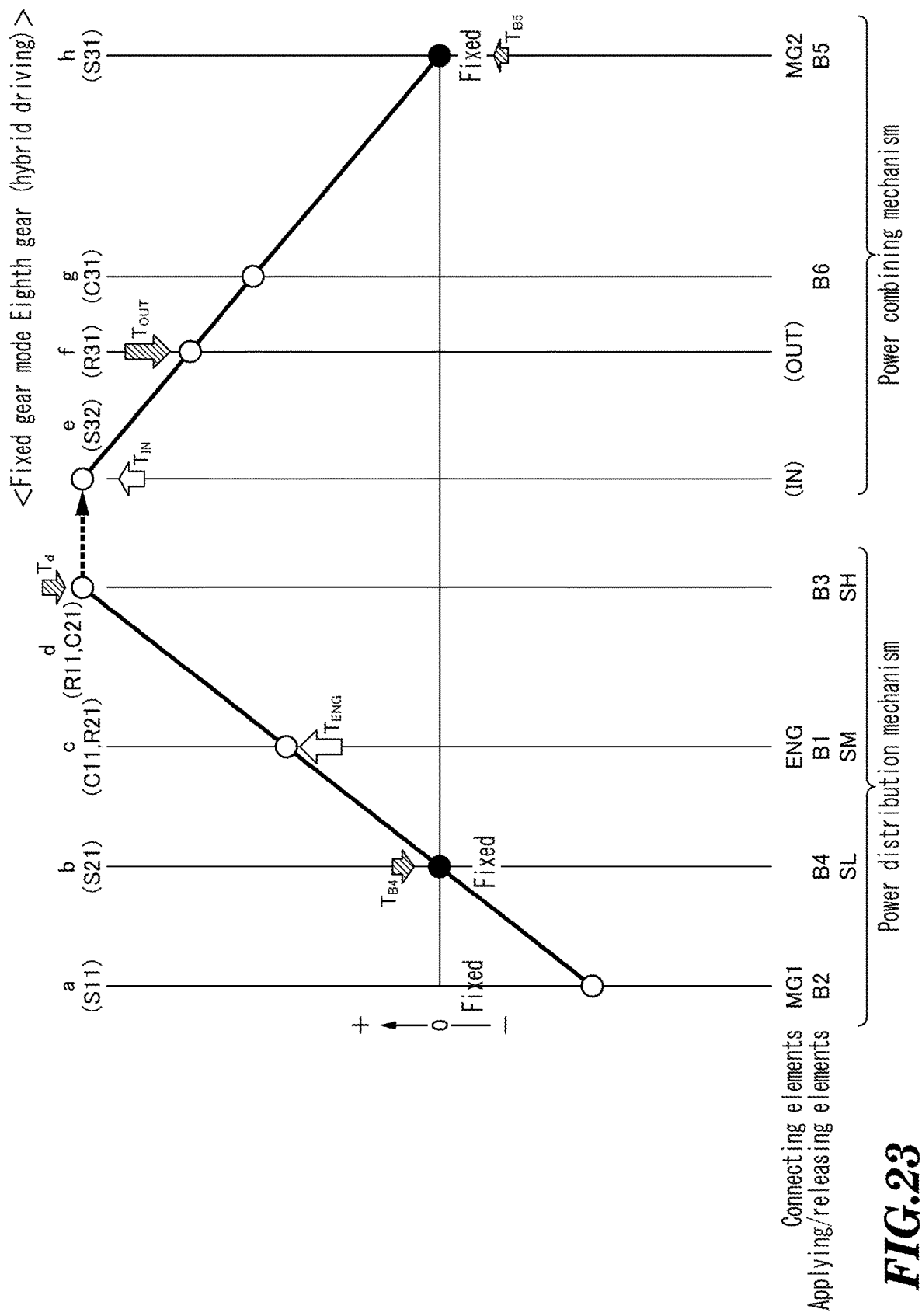
FIG. 23 is a nomographic chart of a fixed gear mode eighth gear (hybrid driving).

As shown in FIGS. 2 and 23, in a fixed gear mode—eighth gear (hybrid driving), the fourth brake mechanism B4 and the fifth brake mechanism B5 are applied, whereby the rotation element b of the power distribution mechanism 1 and the rotation element h of the power combining mechanism 2 are fixed so as not to rotate. In addition, the selection mechanism 3 connects the rotation element d of the power distribution mechanism 1 and the rotation element e of the power combining mechanism 2 together via the selection element SH.

As shown in FIG. 23, in the fixed gear mode—eighth gear (hybrid driving), the engine ENG is driven. The gradient of a collinearity on the power distribution mechanism 1 side changes at the rotation element b, which is a fixed point, as a fulcrum. By doing so, the rotation element d rotates in high speeds (faster than in the seventh gear) in the forward rotating direction, and the rotation of the rotation element d is inputted into the rotation element e of the power combining mechanism 2. As this occurs, an action torque TENG of the engine ENG is generated in the rotation element c of the power distribution mechanism 1, and this action torque TENG is transmitted to the rotation element d in a lever ratio of bc/bd based on the rotation element b, which is the fixed point, as a fulcrum. Namely, a reaction torque Td acting in the reverse rotating direction which is obtained by multiplying the action torque TENG by the lever ratio of bc/bd is generated in the rotation element d, and this reaction torque Td is transmitted to the rotation element e of the power combining mechanism 2 as an action torque TIN acting in the forward rotating direction. A reaction torque TB4 acting in the reverse rotating direction is generated in the rotation element b, which is the fixed point, and the total sum of torque on the power distribution mechanism 1 side is caused to become 0 by the reaction torque TB4.

On the other hand, the gradient of a collinearity on the power combining mechanism 2 side changes at the rotation element h, which is a fixed point, as a fulcrum. Consequently, when a high speed rotation in the forward rotating direction is inputted into the rotation element e from the power distribution mechanism 1 side, a high speed rotation in the forward rotating direction whose rotation speed is decreased according to the gradient (a forward traveling in eighth gear) is transmitted to the rotation element f of the power combining mechanism 2, which is the output portion thereof. In addition, a reaction torque attributed to the action torque TIN which is inputted from the power distribution mechanism 1 is generated in the rotation element f. However, in this mode, since the rotation element h of the power combining mechanism 2 is fixed, the action torque TIN is transmitted to the rotation element f in a lever ratio of eh/fh based on the rotation element h, which is a fixed point, as a fulcrum. Namely, a reaction torque TOUT in the reverse rotating direction which is obtained by multiplying the action torque TIN by a lever ratio of eh/fh is generated in the rotation element f. By doing so, the fixed gear mode—eighth gear (hybrid driving) is realized in which the vehicle can travel forwards on the high speed and low torque driving force characteristic. A reaction torque TB5 in the forward rotating direction is generated in the rotation element h, which is the fixed point, and the total sum of torque on the power combining mechanism 2 side is caused to become 0 by this reaction torque TB5.

Operation Examples

Next, referring to FIGS. 24 to 38, operation examples of the power transmission apparatus 100 will be described.

<Halt>

Figure 24:
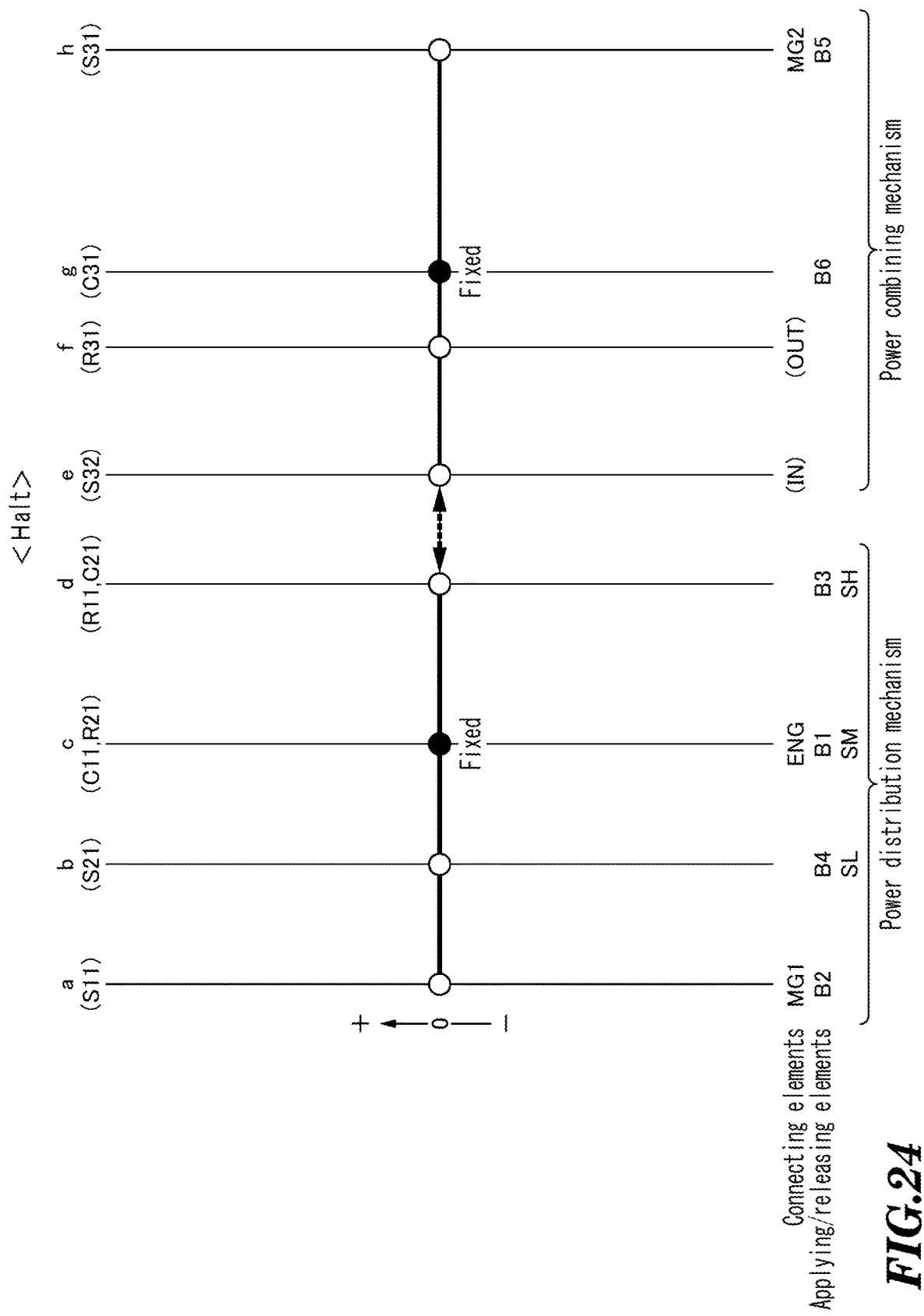
FIG. 24 is a chart showing an operation example, which is a nomographic chart showing a halt state.

As shown in FIG. 24, with the vehicle staying at a halt, assuming that the vehicle starts in the 2MOT_EV_Lo mode, the first brake mechanism B1 and the sixth brake mechanism B6 are applied, whereby the rotation element c of the power distribution mechanism 1 and the rotation element g of the power combining mechanism 2 are fixed so as not to rotate. In addition, the selection mechanism 3 connects the rotation element d of the power distribution mechanism 1 and the rotation element e of the power combining mechanism 2 together via the selection element SH. In this state, since the engine ENG, the first motor-generator MG1 and the second motor-generator MG2 are stopped, and therefore, all the rotation elements a to h are also stopped.

<2MOT_EV_Lo Mode Start>

Figure 25:
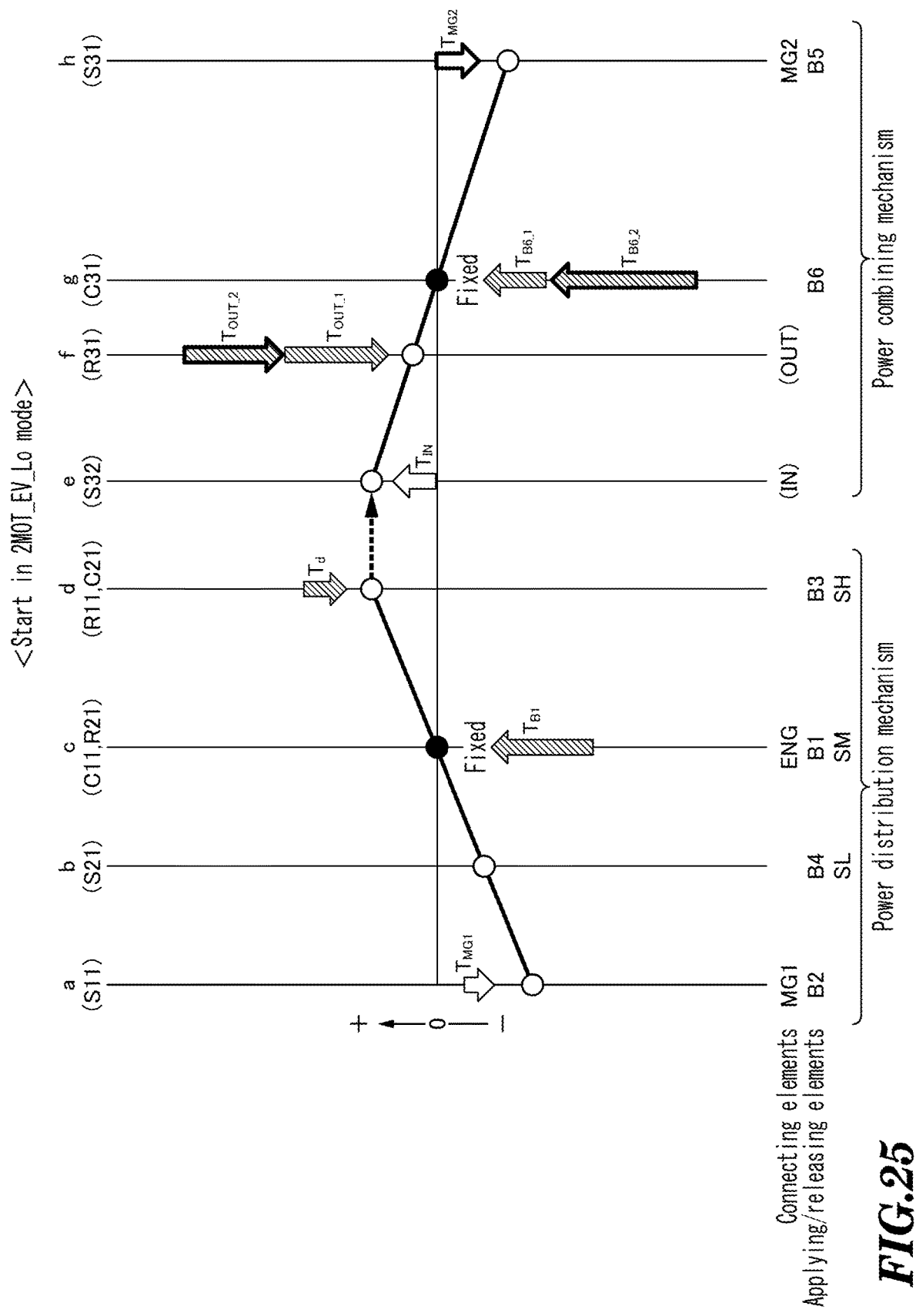
FIG. 25 is a chart showing an operation example, which is a nomographic chart showing a start in 2MOT_EV_Lo mode.

As shown in FIG. 25, when a starting operation is performed, the first motor-generator MG1 and the second motor-generator MG2 are driven in the reverse rotating direction for power running, and the vehicle is started in the 2MOT_EV_Lo mode. As this occurs, the output shaft OUT rotates at low speeds and a high torque is outputted to the output shaft OUT (refer to FIG. 4 and the description made by reference thereto).

<Start Preparation 1 after 2MOT_EV_Lo Mode Start>

Figure 26:
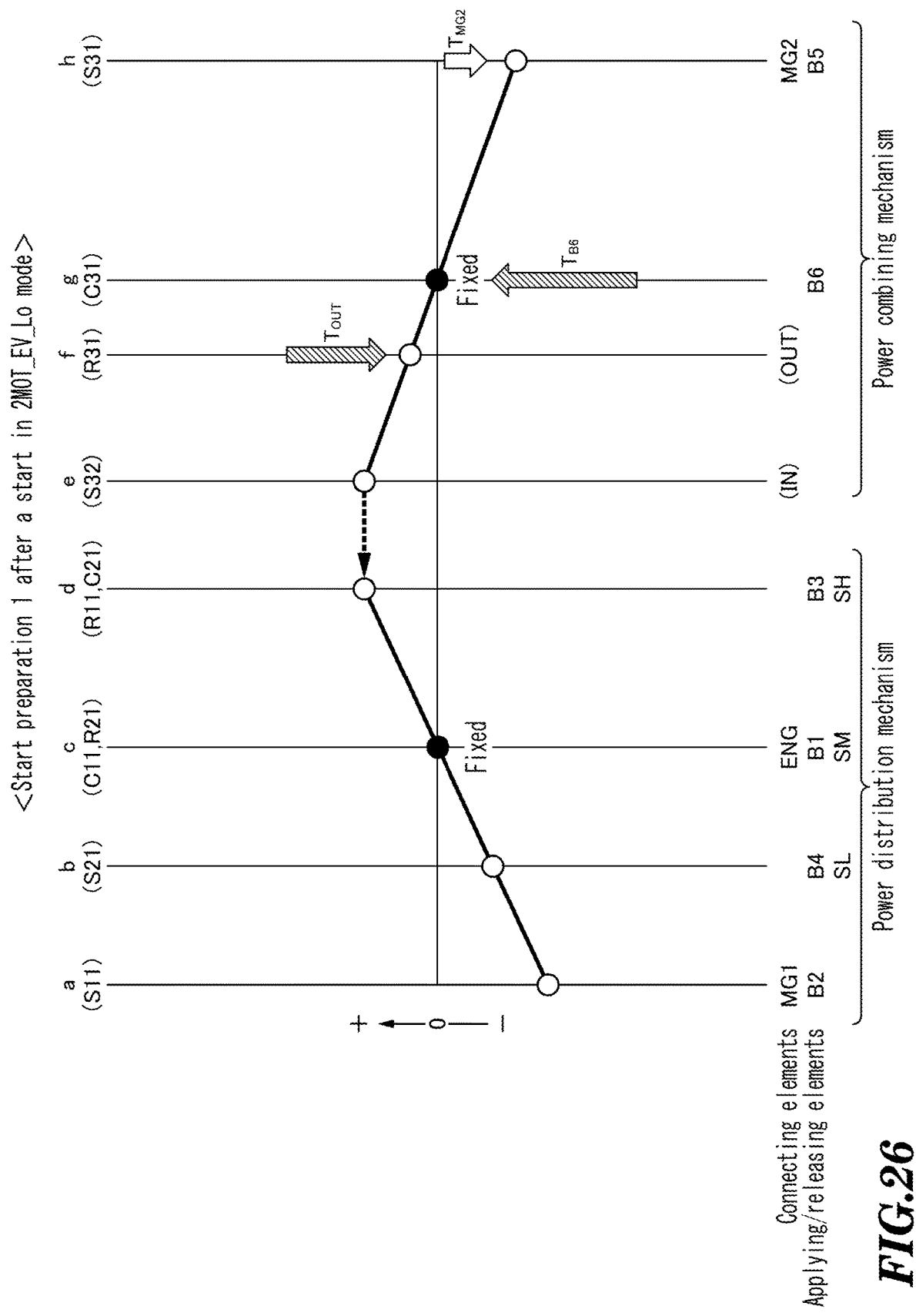
FIG. 26 is a chart showing an operation example, which is a nomographic chart showing a start preparation 1 after a start in 2MOT_EV_Lo mode.

As shown in FIG. 26, after the vehicle has started in the 2MOT_EV_Lo mode, assuming a shift to the 2MOT_electric CVT_Lo mode, a preparation for starting the engine ENG is started. Firstly, in an initial stage, the first motor-generator MG1 is operated idly, and the reaction torque TB1 in the rotation element c, which is a fixed point, is brought down towards 0.

<Start Preparation 2 after 2MOT_EV_Lo Mode Start>

Figure 27:
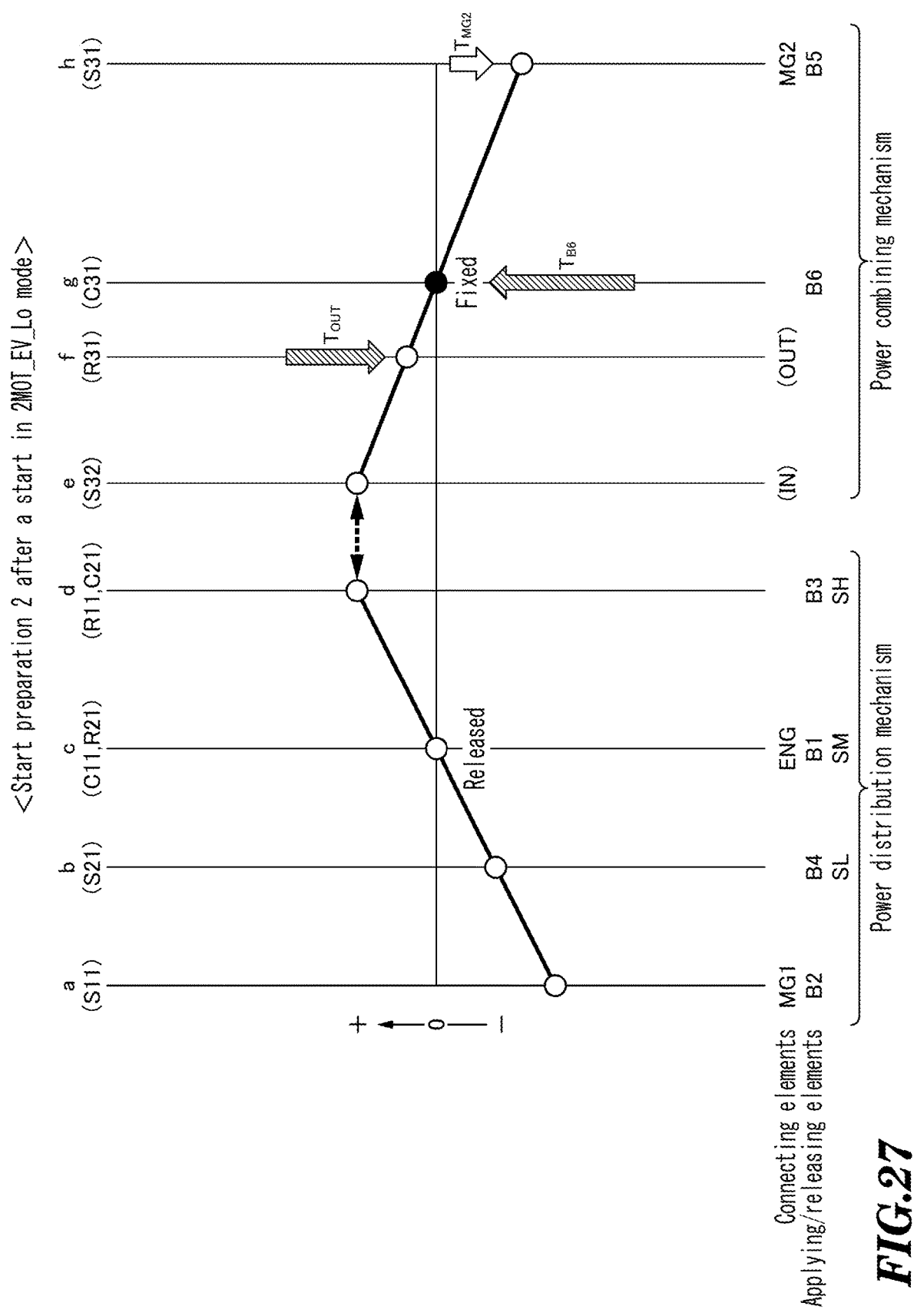
FIG. 27 is a chart showing an operation example, which is a nomographic chart showing a start preparation 2 after a start in 2MOT_EV_Lo mode.

As shown in FIG. 27, the first brake mechanism B1 is released when the reaction torque TB1 in the rotation element c becomes 0. As this occurs, although the rotation element c shifts from the fixed state to a rotation permitting state, since the reaction torque Tc in the rotation element c is almost 0, the rotation element c holds its non-load running state.

<Engine Start after 2MOT_EV_Lo Mode Start>

Figure 28:
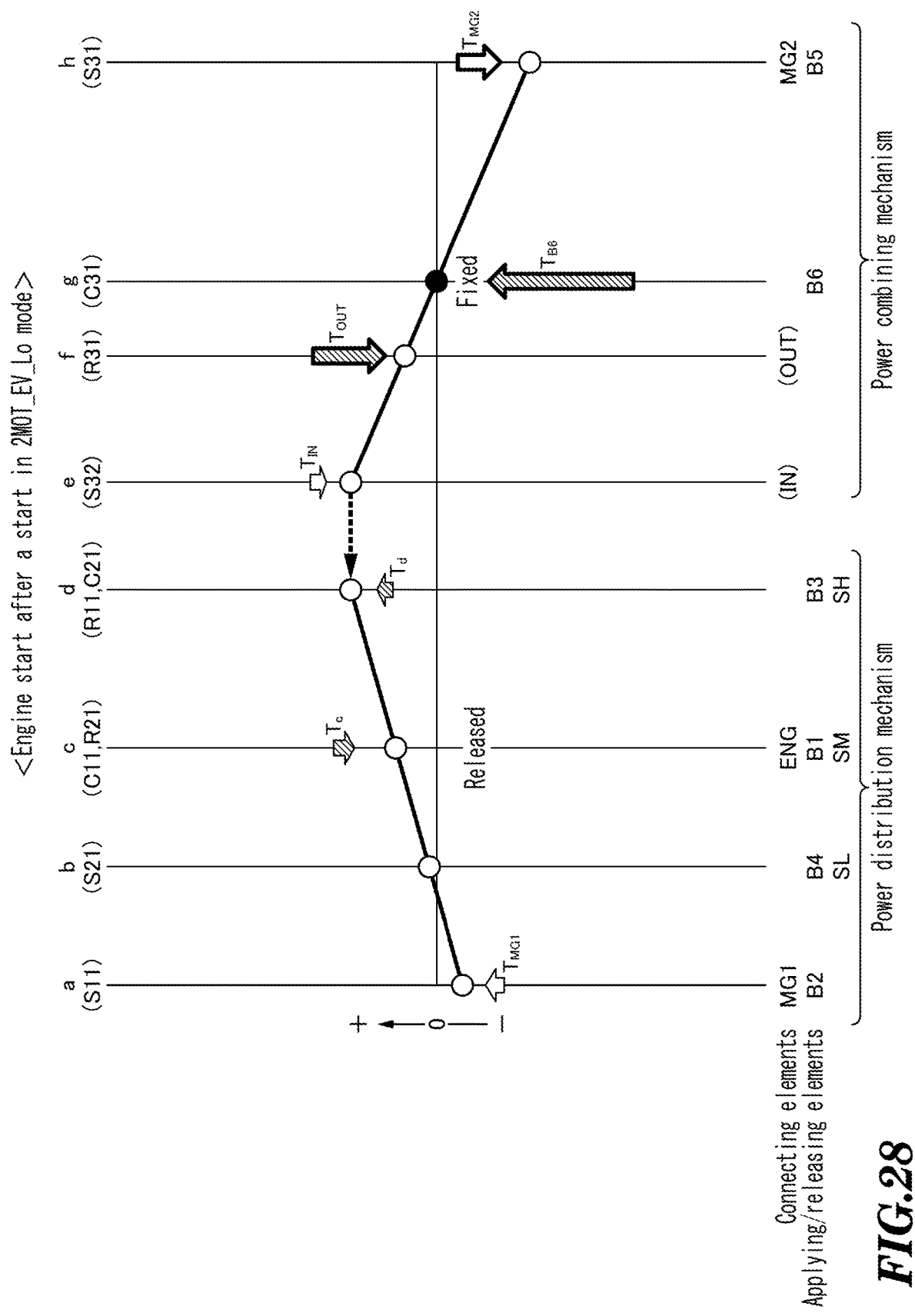
FIG. 28 is a chart showing an operation example, which is a nomographic chart showing an engine start after a start in 2MOT_EV_Lo mode.

As shown in FIG. 28, after the first brake mechanism B1 has been released, an action torque TMG1 acting in the forward rotating direction is generated in the rotation element a by driving the first motor-generator MG1 for regeneration. As this occurs, since a reaction torque Td acting in the forward rotating direction is transmitted to the rotation element d from the power combining mechanism 2 side, a reaction torque Tc acting in the reverse rotating direction which is balanced against a combined torque of the action torque TMG1 and the reaction torque Td is generated in the rotation element c. The application of the torque acting in the revere rotating direction to the rotation element c which is connected to the engine ENG means that a torque acting in the forward rotating direction (a forward traveling direction) is applied to the engine ENG with the rotation of a crankshaft in a rotating direction of the crankshaft. Then, the engine ENG is started by starting an engine operation control at a point in time when the revolution speed of the crankshaft exceeds a predetermined revolution speed. After the engine ENG is started, the driving mode is shifted to the electric CVT_Lo mode.

<High Speed Driving in 2MOT_electric CVT_Lo Mode>

Figure 29:
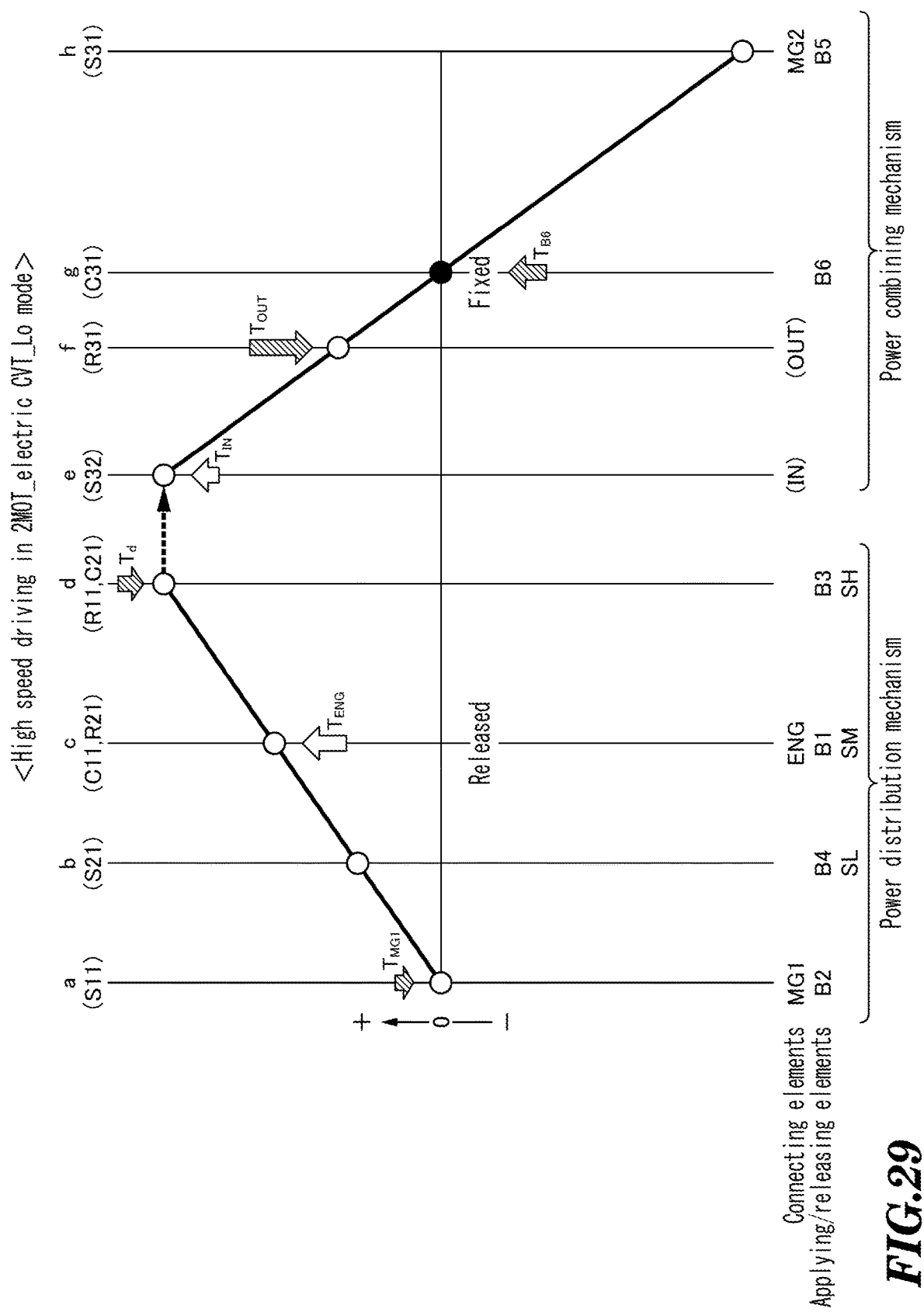
FIG. 29 is a chart showing an operation example, which is a nomographic chart showing a high speed driving in 2MOT_electric CVT_Lo mode.

As shown in FIG. 29, after the driving mode has been shifted to the 2MOT_electric CVT_Lo mode, the vehicle speed is changed in a continuously variable fashion based on the revolution speed control of the first motor-generator MG1 and the second motor-generator MG2 while driving the engine at a predetermined revolution speed. Then, when the vehicle speed reaches a predetermined speed in the 2MOT_electric CVT_Lo mode, a preparation for transfer to the 2MOT_electric CVT_Hi mode is started.

<Transfer Preparation from 2MOT_electric CVT_Lo Mode to Hi Mode>

Figure 30:
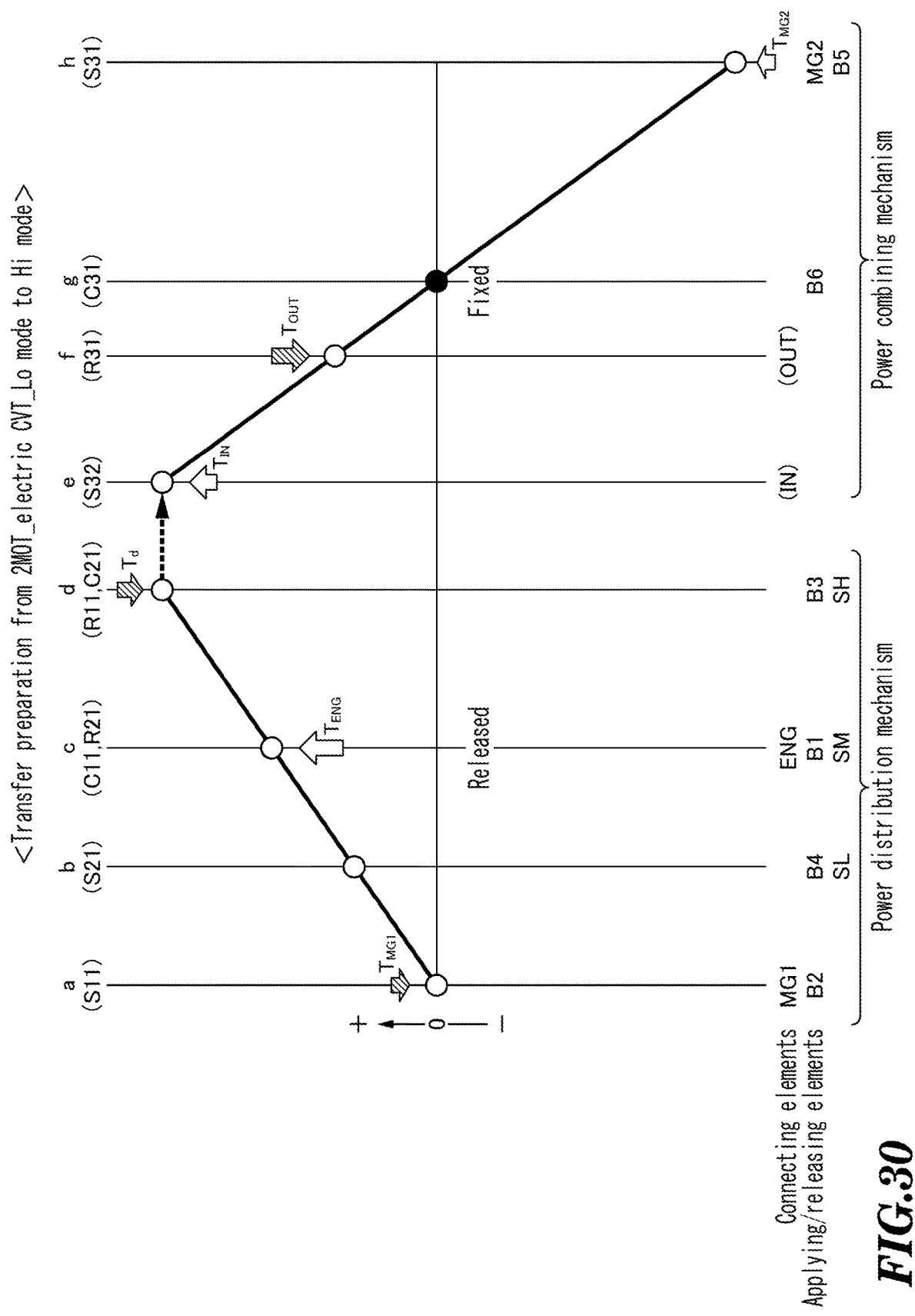
FIG. 30 is a chart showing an operation example, which is a nomographic chart showing a transfer preparation from 2MOT_electric CVT_Lo mode to Hi mode.

As shown in FIG. 30, in a preparation for transfer to the 2MOT_electric CVT_Hi mode, an action torque TMG2 acting in the forward rotating direction is generated in the rotation element h by driving the second motor-generator MG2 for regeneration, the reaction torque TB6 of the rotation element g, which is the fixed point, is brought down towards 0.

<Transfer from 2MOT_electric CVT_Lo Mode to Hi Mode>

Figure 31:
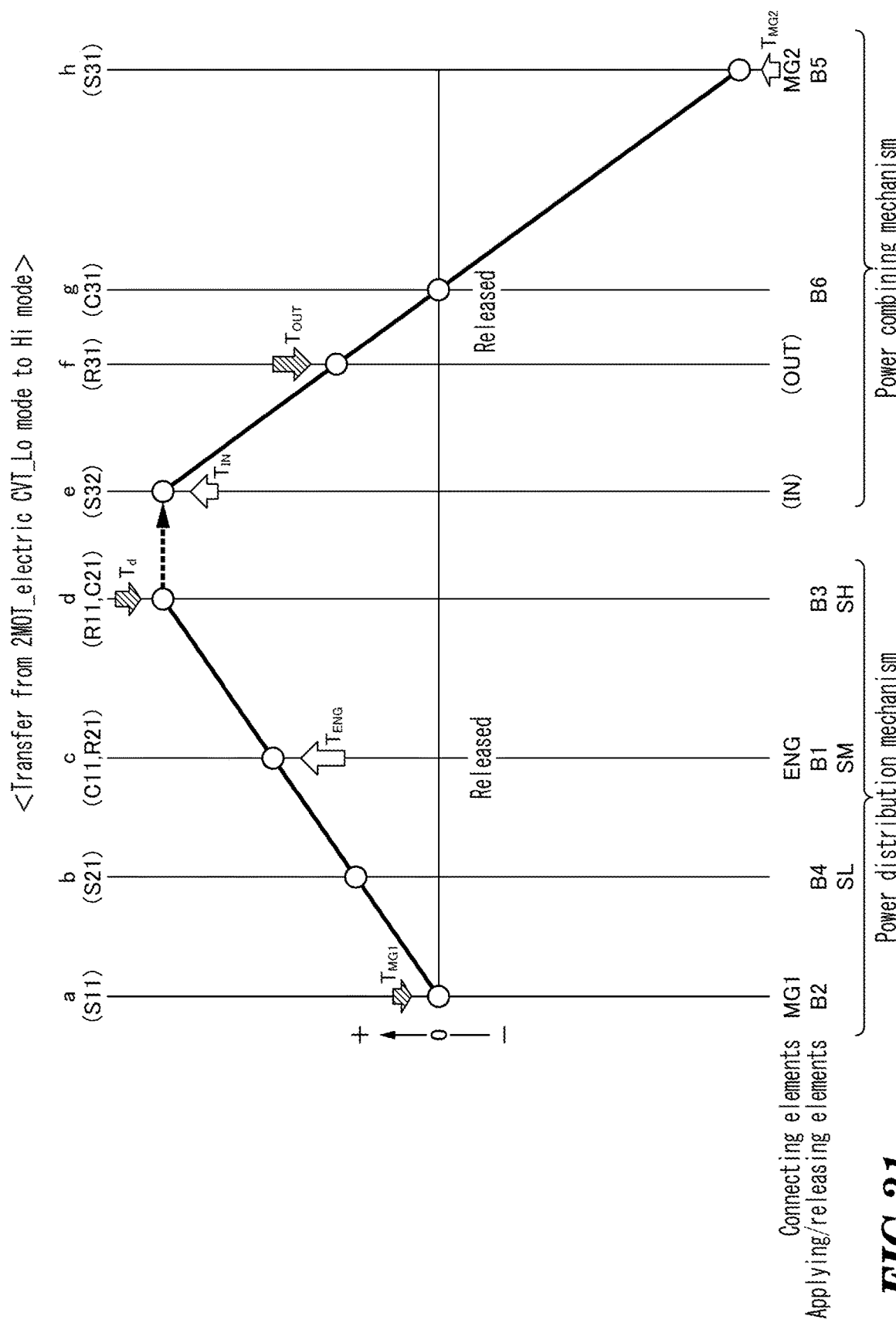
FIG. 31 is a chart showing an operation example, which is a nomographic chart showing a transfer from 2MOT_electric CVT_Lo mode to Hi mode.

As shown in FIG. 31, the sixth brake mechanism B6 is released when the reaction torque TB6 in the rotation element g becomes 0. As this occurs, although the rotation element g shifts from the fixed state to a rotation permitting state, since the reaction torque TB in the rotation element g is almost 0, the rotation element g holds its non-load running state.

<Acceleration 1 after Transfer to 2MOT_electric CVT_Hi Mode>

Figure 32:
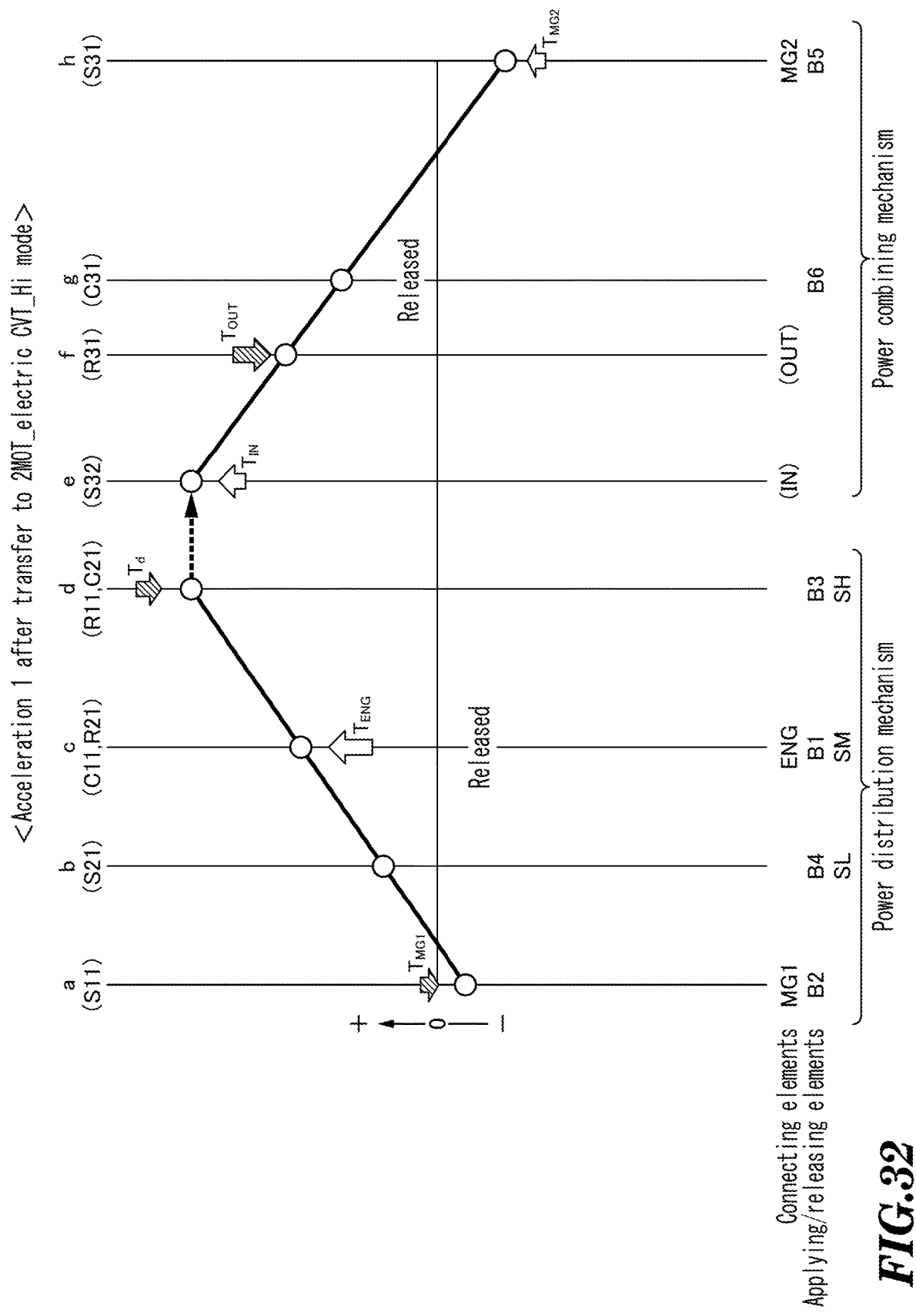
FIG. 32 is a chart showing an operation example, which is a nomographic chart showing an acceleration 1 after a transfer to 2MOT_electric CVT_Hi mode.

As shown in FIG. 32, when the driving mode shifts to the 2MOT_electric CVT_Hi mode, as the rotation speed of the output shaft OUT changes from low speeds to high speeds, torque outputted to the output shaft OUT changes sequentially from a high torque to a low torque characteristic in accordance with a constant output characteristic (refer to FIG. 11 and the description made by reference thereto).

<Acceleration 2 after Transfer to 2MOT_electric CVT_Hi Mode>

Figure 33:
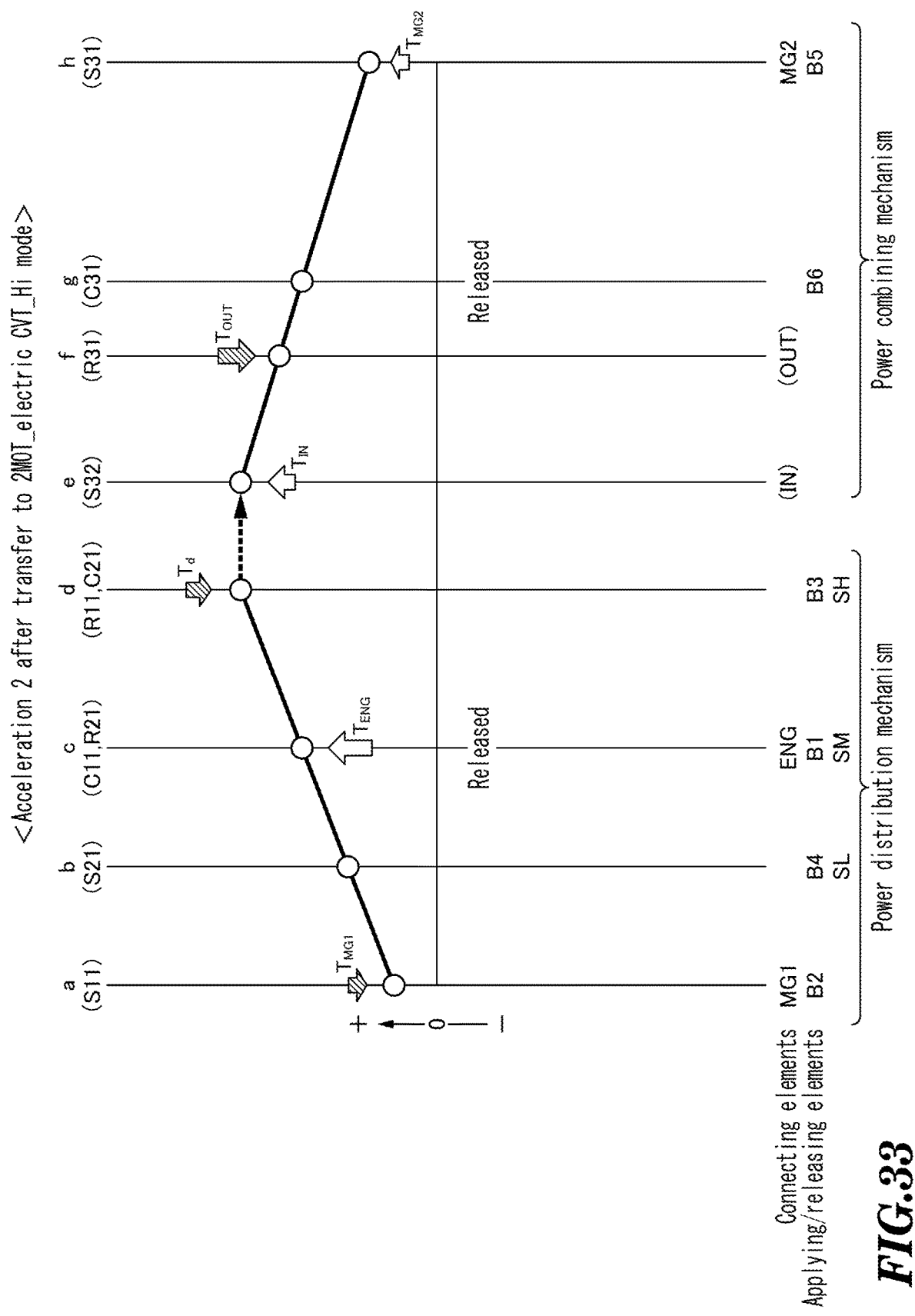
FIG. 33 is a chart showing an operation example, which is a nomographic chart showing an acceleration 2 after a transfer to 2MOT_electric CVT_Hi mode.

As shown in FIG. 33, in the 2MOT_electric CVT_Hi mode, the vehicle speed is changed in a continuously variable fashion in a high speed area based on the rotation speed control of the first motor-generator MG1 and the second motor-generator MG2 while holding the revolution speed of the engine ENG.

<High Speed Driving in 2MOT_electric CVT_Hi Mode>

Figure 34:
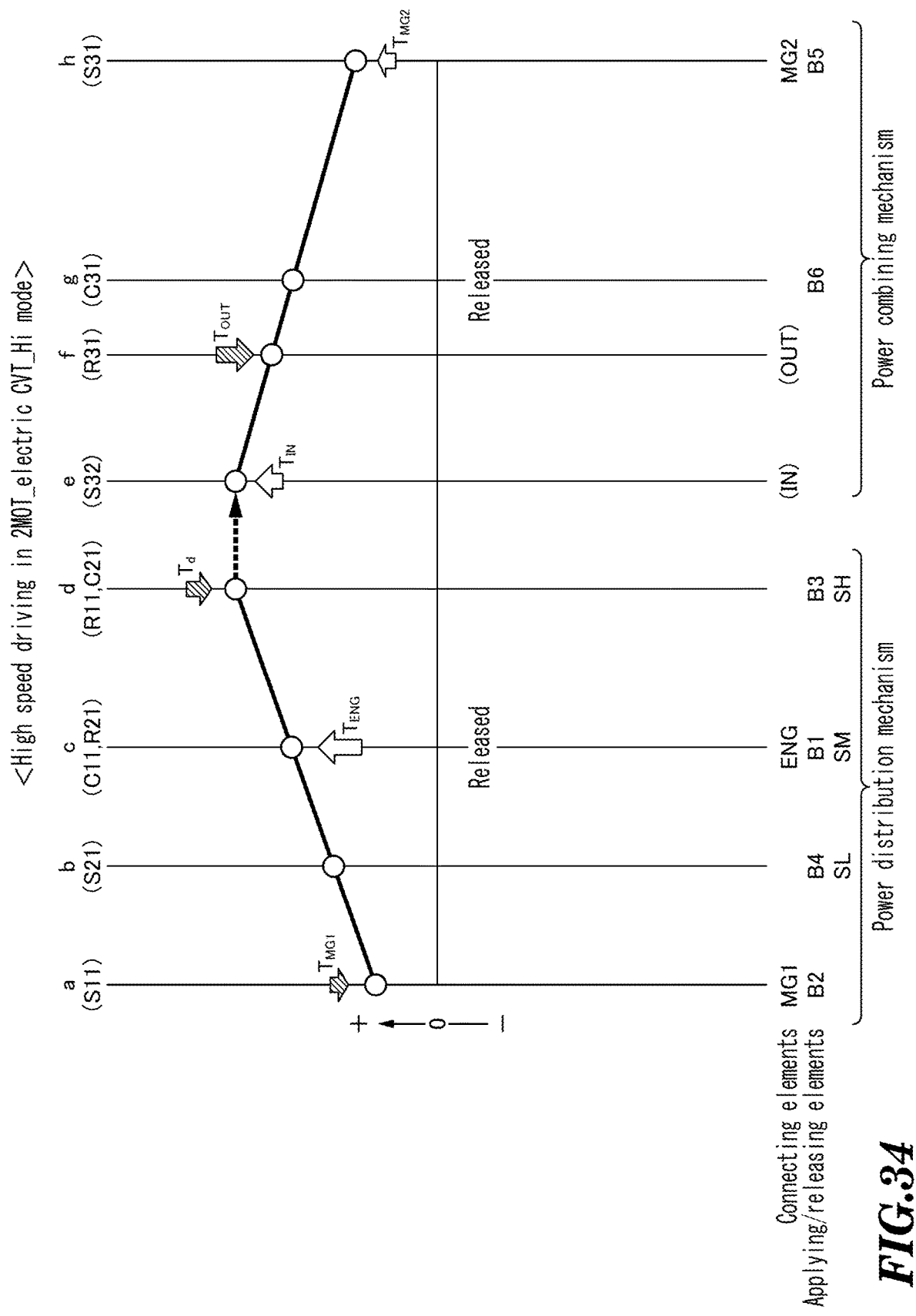
FIG. 34 is a chart showing an operation example, which is a nomographic chart showing a high speed driving in 2MOT_electric CVT_Hi mode.

As shown in FIG. 34, in the 2MOT_electric CVT_Hi mode, the vehicle speed can be changed to a predetermined high speed in a continuously variable fashion in the high speed area. Then, after the vehicle speed has reached the predetermined speed, when the speed is reduced, the driving mode is shifted from the 2MOT_electric CVT_Hi mode to a regeneration state.

<High Speed Regeneration Shift 1 in 2MOT_electric CVT_Hi Mode>

Figure 35:
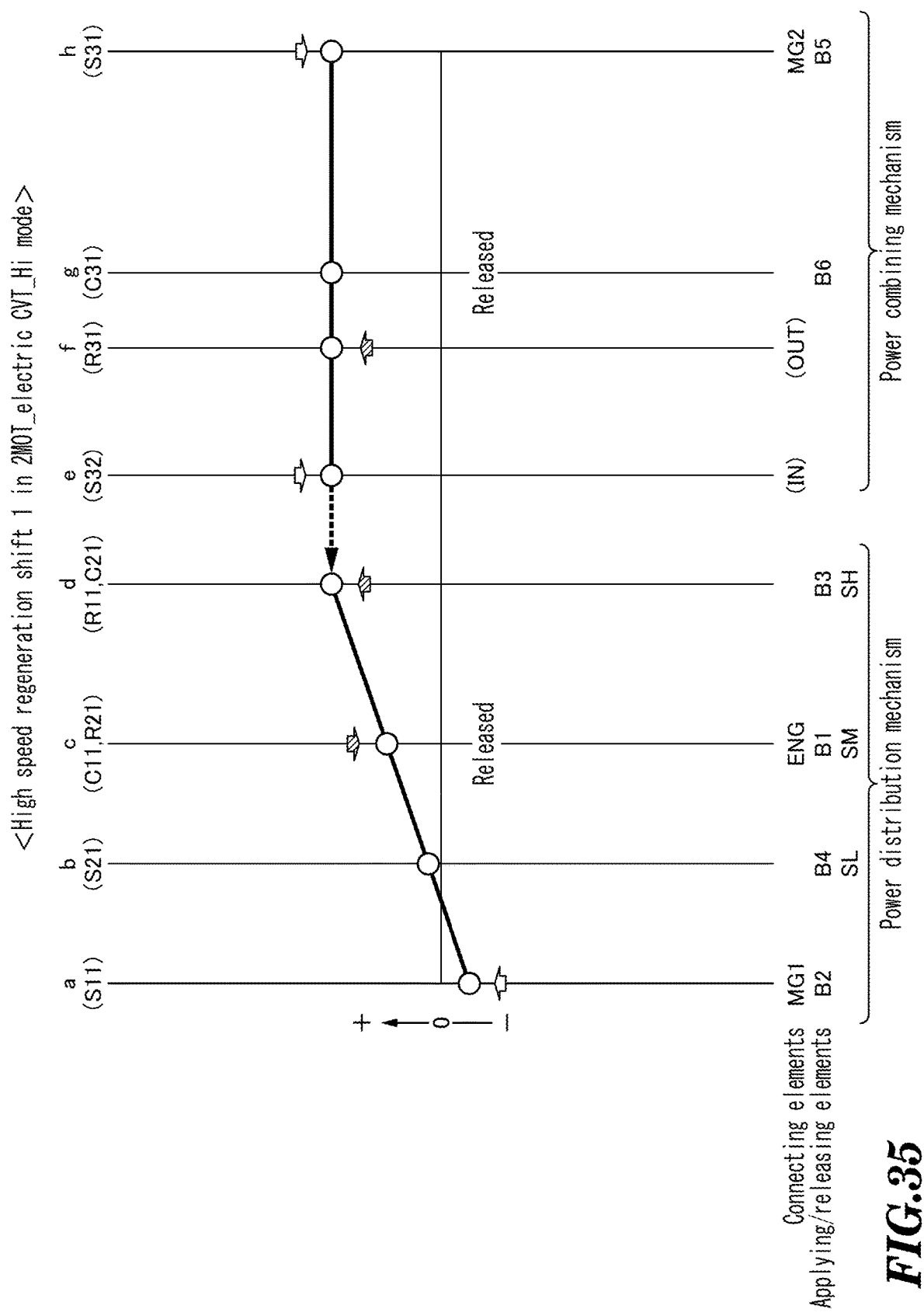
FIG. 35 is a chart showing an operation example, which is a nomographic chart showing a high speed regeneration shift 1 in 2MOT_electric CVT_Hi mode.

As shown in FIG. 35, in the event that the driving mode is shifted from the high speed area in the 2MOT_electric CVT_Hi mode to the regeneration state, as preparations for the shift, the engine ENG is stopped, and the first motor-generator MG1 and the second motor-generator MG2 are operated idly to such an extent that their revolution speeds match.

<High Speed Regeneration Shift 2 in 2MOT_electric CVT_Hi Mode>

Figure 36:
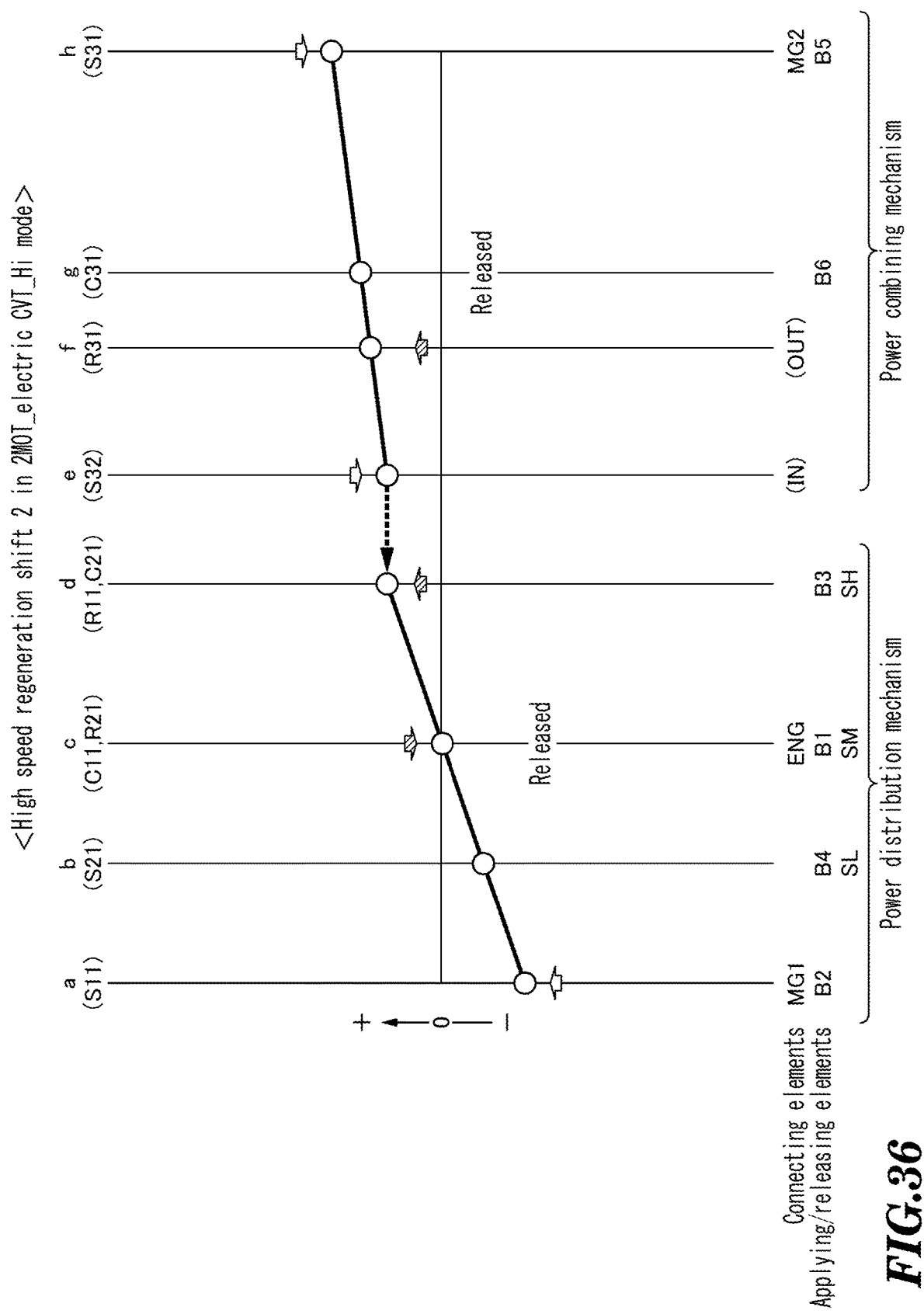
FIG. 36 is a chart showing an operation example, which is a nomographic chart showing a high speed regeneration shift 2 in 2MOT_electric CVT_Hi mode.

As shown in FIG. 36, the non-load operation of the first motor-generator MG1 and the second motor-generator MG2 is continued until the rotation speed of the rotation element c is brought down towards 0 and the crankshaft of the engine ENG stops rotating.

<Regeneration in 2MOT_electric CVT_Hi Mode>

Figure 37:
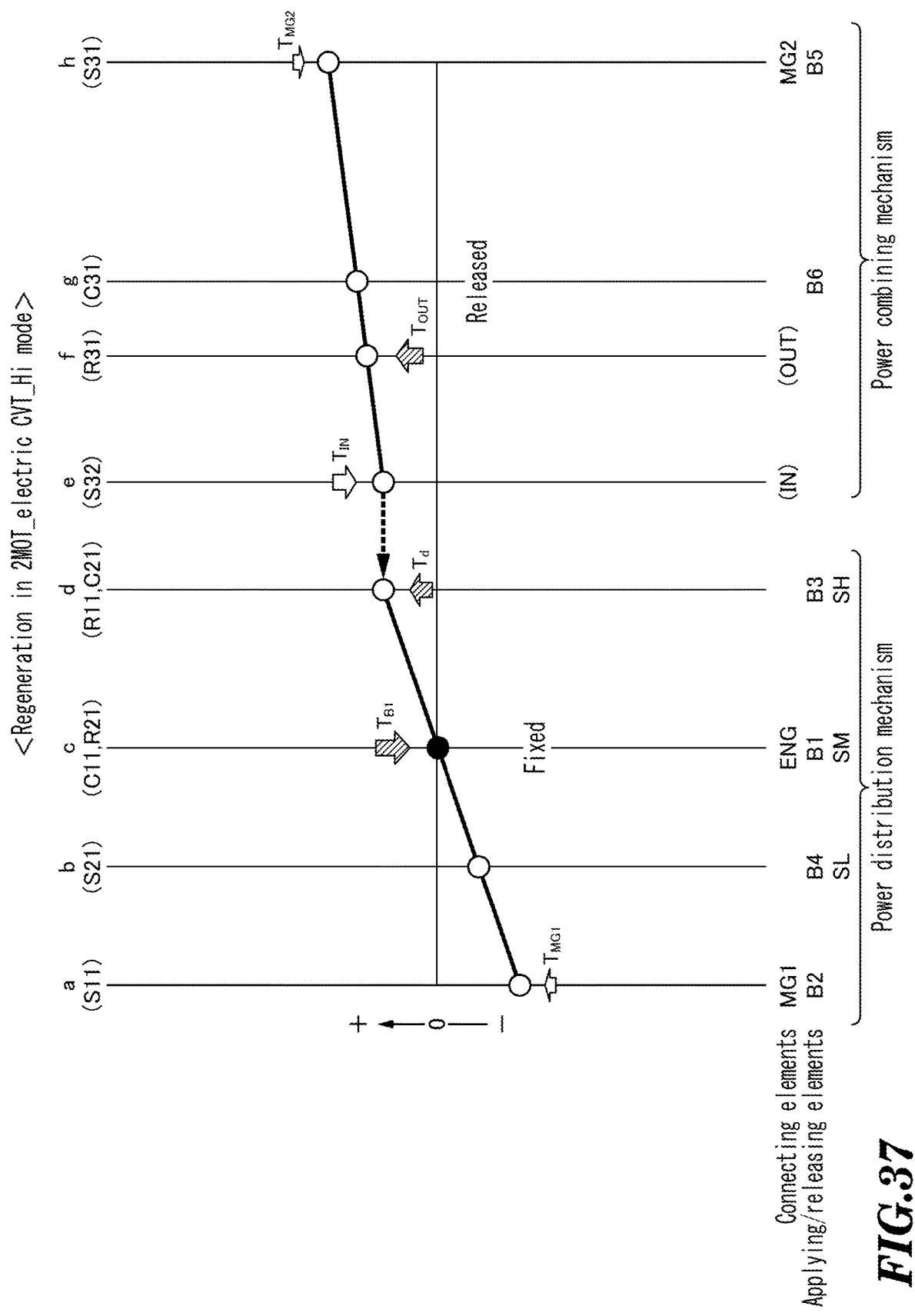
FIG. 37 is a chart showing an operation example, which is a nomographic chart showing regeneration in 2MOT_electric CVT_Hi mode.

As shown in FIG. 37, after the first brake mechanism B1 is applied whereby the rotation element c is fixed so as not to rotate, the first motor-generator MG1 and the second motor-generator MG2 are driven for regeneration, whereby a reaction torque TOUT acting in the forward rotating direction is generated in the rotational element f which is connected to the output shaft OUT. The application of the torque in the forward rotating direction to the rotation element f to which the output shaft OUT is connected means the application of the torque in the reverse rotating direction (a rearward traveling direction) to the output shaft OUT and that a braking force is applied to the vehicle which is traveling forwards. By driving the first motor-generator MG1 and the second motor-generator MG2 for regeneration, the first motor-generator MG1 and the second motor-generator MG2 generate electricity, so that a battery, not shown, can be charged with the electricity so generated.

<Regeneration in 2MOT_electric CVT_Lo Mode>

Figure 38:
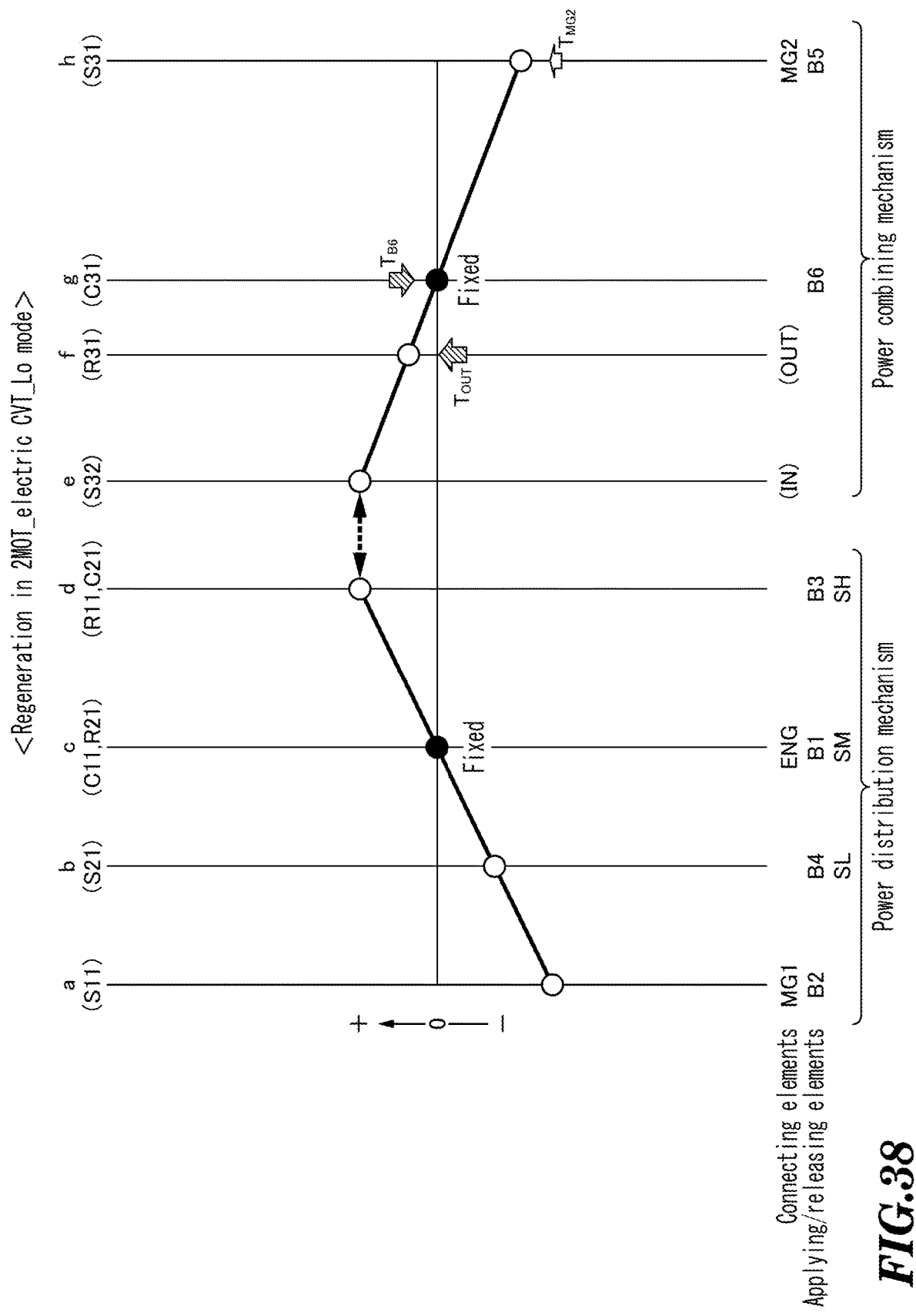
FIG. 38 is a chart showing an operation example, which is a nomographic chart showing regeneration in 2MOT_electric CVT_Lo mode.

Next, as shown in FIG. 38, when the rotation speed of the rotation element c becomes 0 in association with a reduction in vehicle speed, that is, a reduction in revolution speed of the output shaft OUT, by applying the sixth brake mechanism B6, the driving mode can be shifted to the 2MOT_electric CVT_Lo mode, and by keeping the first motor-generator MG1 and the second motor-generator MG2 driven for regeneration, a braking force is applied to the vehicle, while electricity is generated by the first motor-generator MG1 and the second motor-generator MG2, whereby the battery, not shown, can be charged.

—Selection Switching Process—

Next, a switching process of switching the selection mechanism 3 will be described by reference to FIGS. 2, 10 and 39 to 46. A switching operation of the selection mechanism 3 is performed when shifting the driving within the fixed gear mode, from the fixed gear mode to the other modes, and from the other modes to the fixed gear mode. FIGS. 39 to 46 shows examples of processing steps of switching the selection mechanism 3 when the driving mode is shifted from the 2MOT_electric CVT_Lo mode to the fixed gear mode—first gear (hybrid driving).

<2MOT_electric CVT_Selection Switching Process 1>

As shown in FIGS. 2 and 10, in the 2MOT_electric CVT_Lo mode, the sixth brake mechanism B6 is applied, whereby the rotation element g of the power combining mechanism 2 is fixed so as not to rotate, and the selection mechanism 3 connects the rotation element d of the power distribution mechanism 1 and the rotation element e of the power combining mechanism 2 via the selection element SH.

Figure 39:
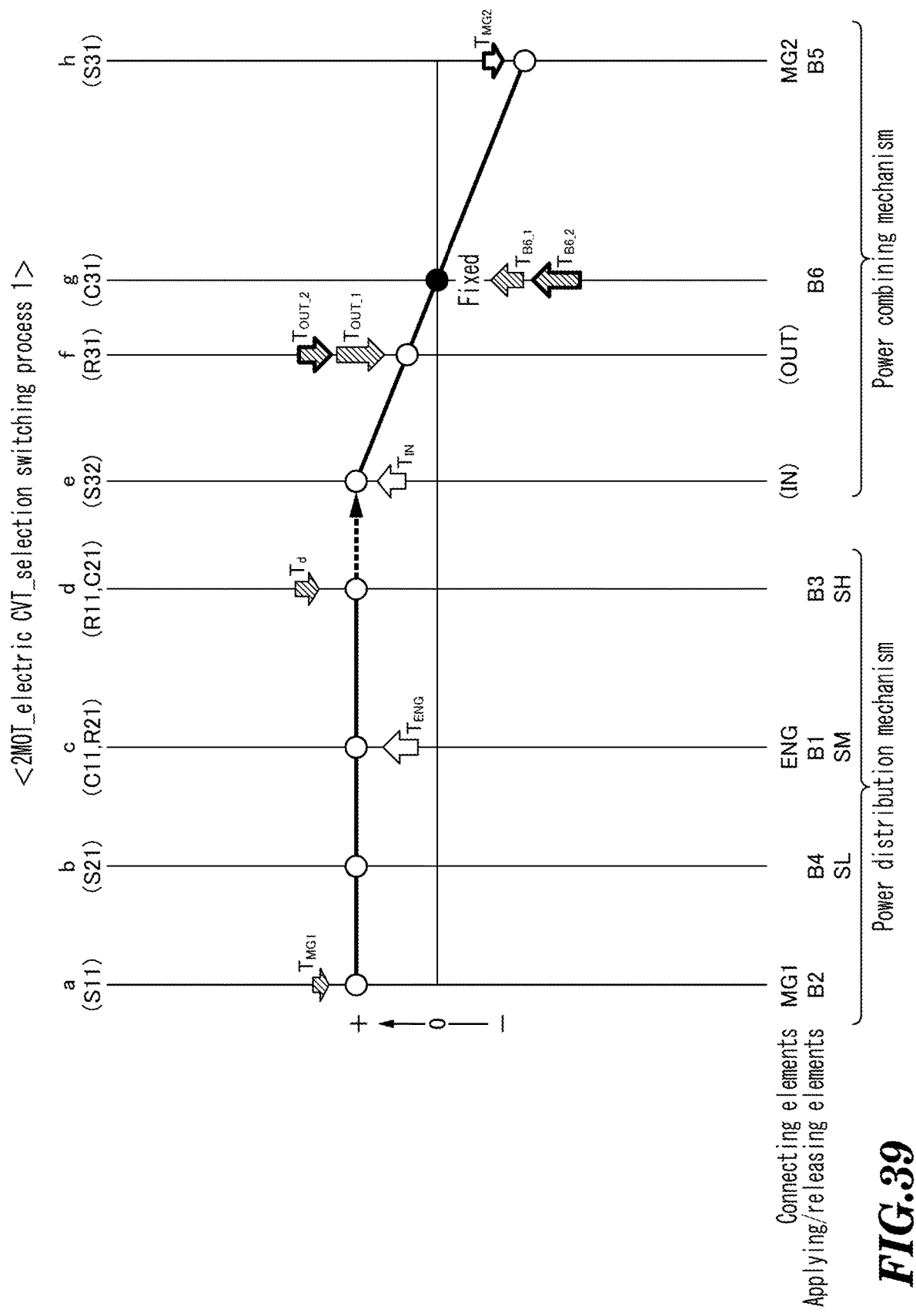
FIG. 39 is a nomographic chart showing a 2MOT_electric CVT_selection switching process 1.
Figure 40:
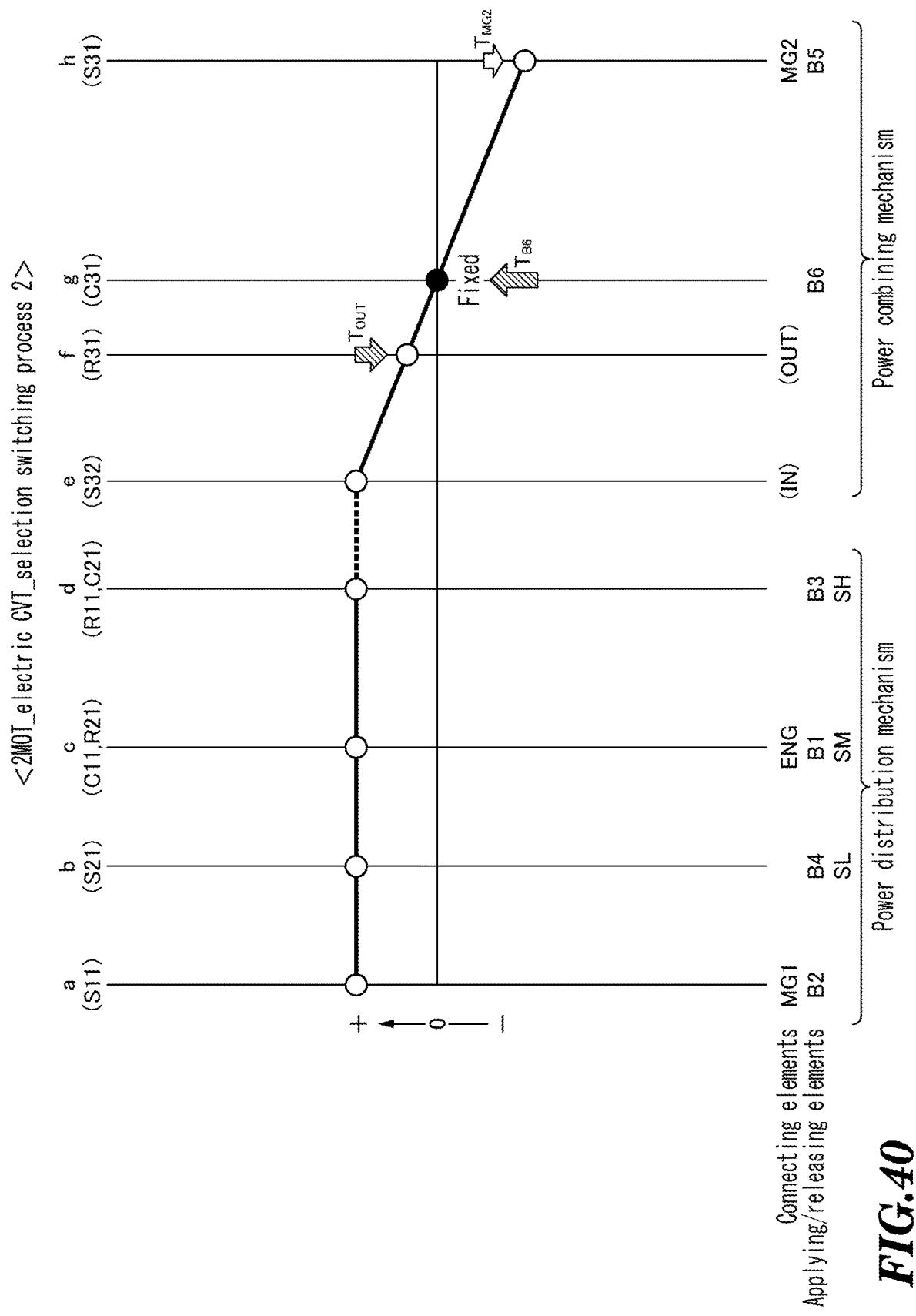
FIG. 40 is a nomographic chart showing a 2MOT_electric CVT_selection switching process 2.

In the event that the driving mode is shifted from the 2MOT_electric CVT_Lo mode to the fixed gear mode—first gear (hybrid driving), to cause the selection mechanism 3 to perform a switching operation, firstly, the revolution speed of the first motor-generator MG1 is synchronized with the revolution speed of the engine ENG, and as shown in FIG. 39, the rotation speeds of the rotation elements a to d of the power distribution mechanism 1 side are synchronized with one another, so that the rotation elements a to d are aligned horizontally on a nomographic chart show therein.

<2MOT_electric CVT_Selection Switching Process 2>

Following what has been described above, as shown in FIG. 40, when the rotation speeds of the rotation elements a to d of the power distribution mechanism 1 side are synchronized with one another, the torque of the engine ENG is reduced, and the first motor-generator MG1 is operated idly to such an extent that the rotation speeds of the rotation elements b to d are synchronized with one another. Then, the torques of the rotation elements a to d on the power distribution mechanism side are brought down towards 0 while holding the synchronization in rotation speed among the rotation elements a to d on the power distribution mechanism 1 side.

<2MOT_electric CVT_Selection Switching Process 3>

Figure 41:
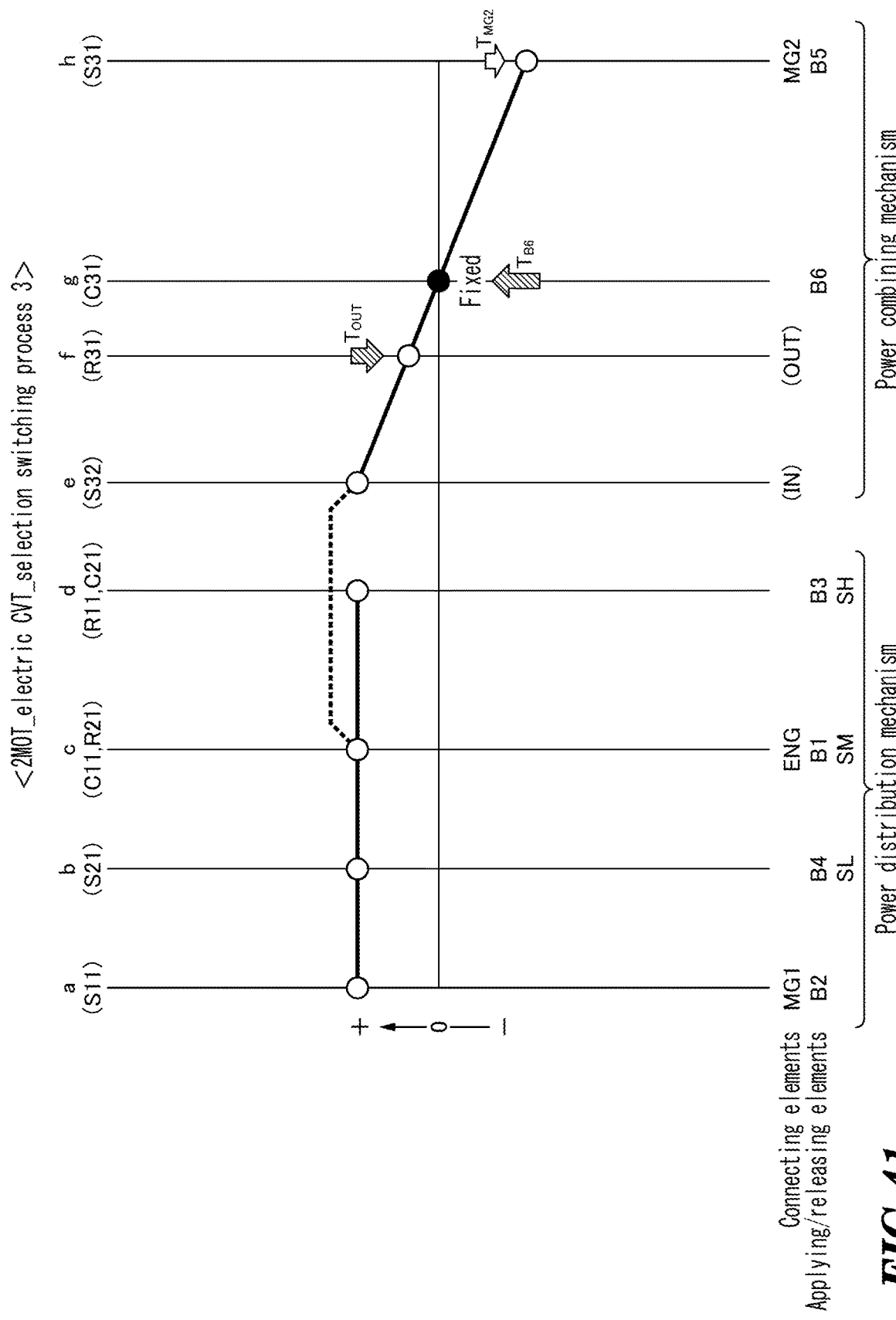
FIG. 41 is a nomographic chart showing a 2MOT_electric CVT_selection switching process 3.

As shown in FIG. 41, when the rotation speeds of the rotation elements a to d of the power distribution mechanism 1 are synchronized with one another and the torques of the rotation elements a to d become substantially 0, a switching operation of the selection mechanism 3 is executed. Firstly, a switching operation from the selection element SH to the selection element SM is executed, and the mating rotation element on the power distribution mechanism 1 side which is connected to the rotation element e on the power combining mechanism 2 side is changed from the rotation element d to the rotation element c.

<2MOT_electric CVT_Selection Switching Process 4>

Figure 42:
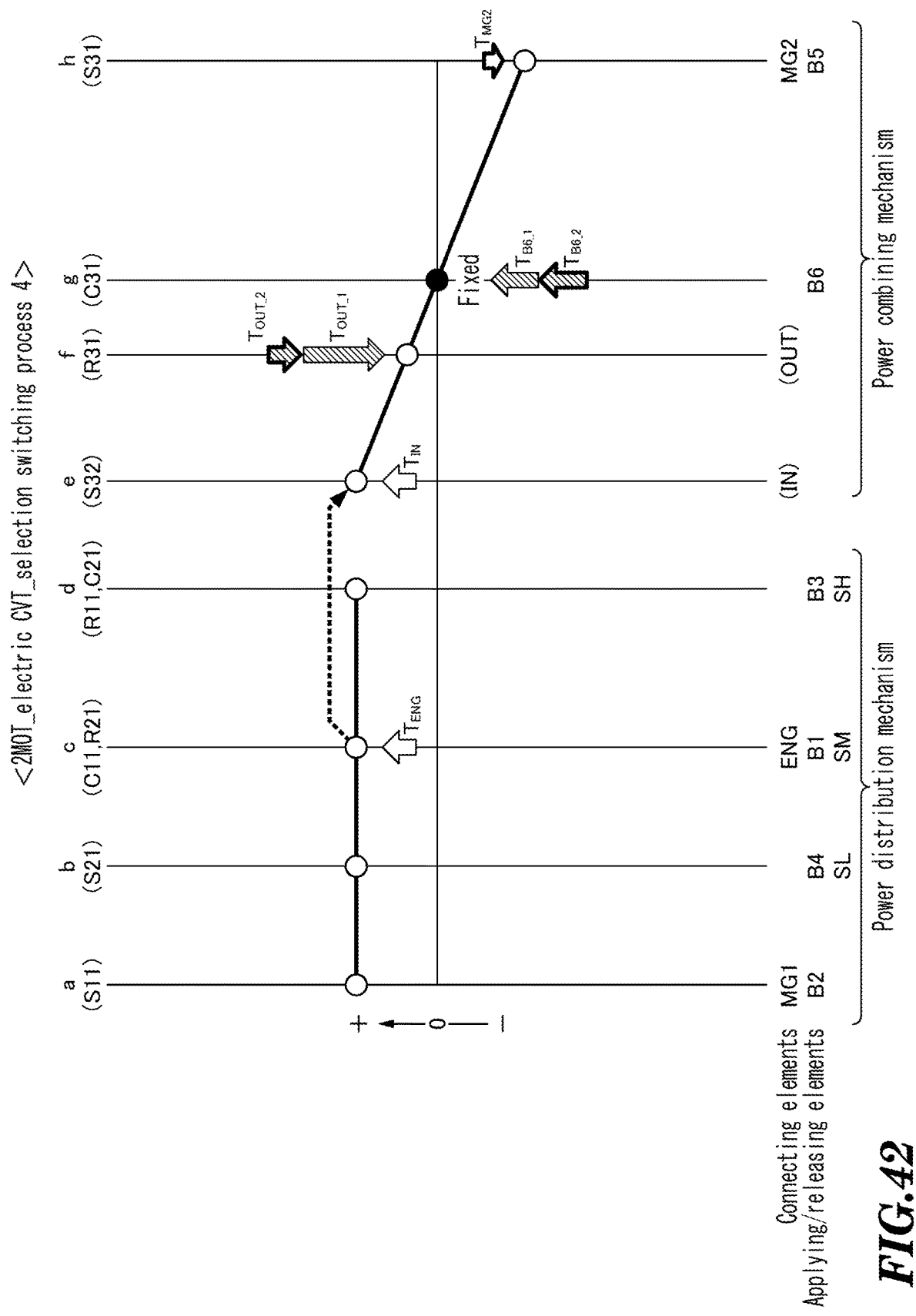
FIG. 42 is a nomographic chart showing a 2MOT_electric CVT_selection switching process 4.

As shown in FIG. 42, after the switching operation from the selection element SH to the selection element SM has been executed, the engine ENG and/or the first motor-generator MG1 is controlled to produce an appropriate desired torque and revolution speed, and the synchronized state in relation to rotation speed of the rotation elements a to d of the power distribution mechanism 1 is maintained.

<2MOT_electric CVT_Selection Switching Process 5>

Figure 43:
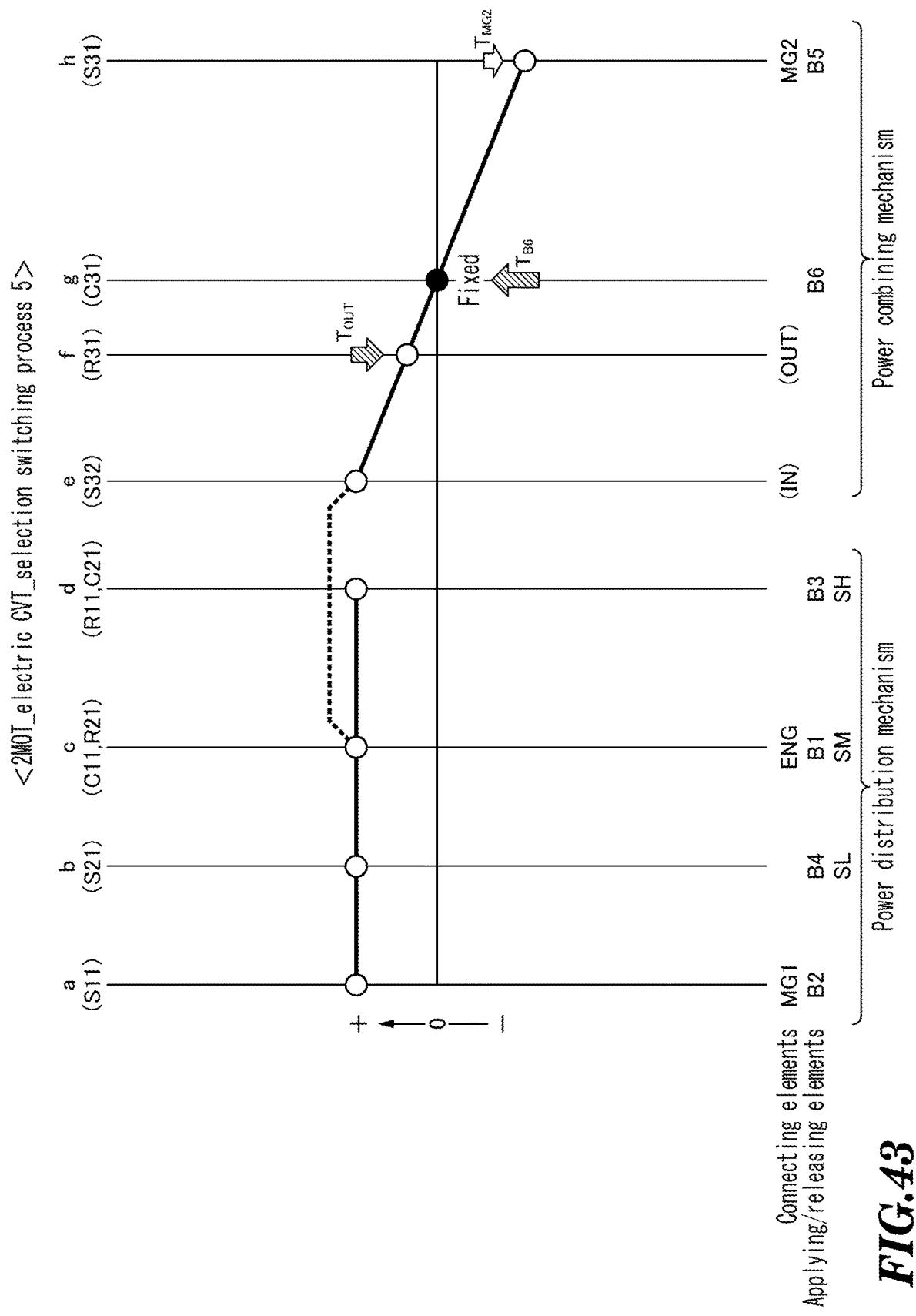
FIG. 43 is a nomographic chart showing a 2MOT_electric CVT_selection switching process 5.

As shown in FIG. 43, the torques of the rotation elements a to d on the power distribution mechanism 1 side are brought down towards 0.

<2MOT_electric CVT_Selection Switching Process 6>

Figure 44:
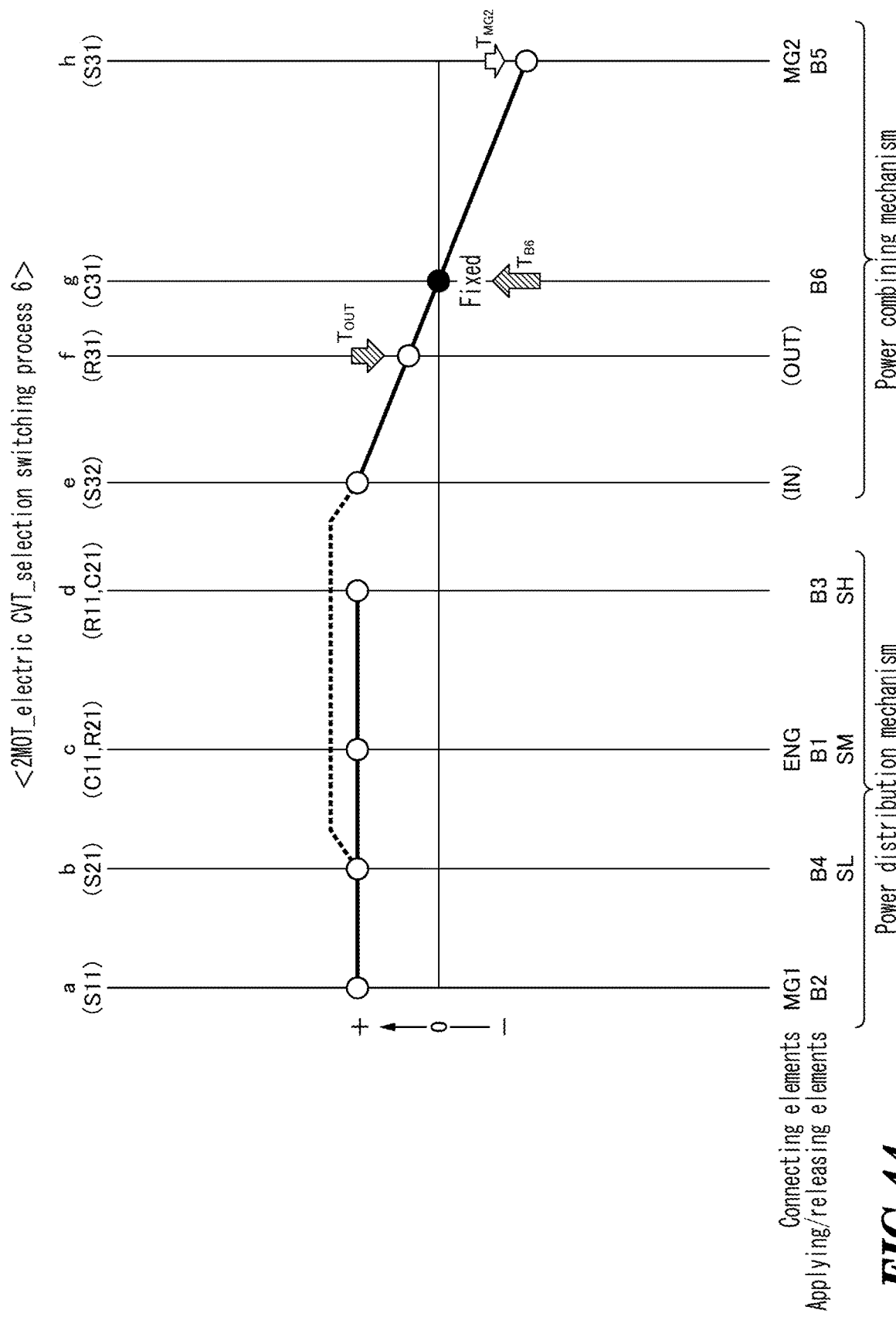
FIG. 44 is a nomographic chart showing a 2MOT_electric CVT_selection switching process 6.

As shown in FIG. 44, when the rotation speeds of the rotation elements a to d of the power distribution mechanism 1 are synchronized with one another and the torques of the rotation elements a to d become substantially 0, a switching operation of the selection mechanism 3 is executed. Namely, a switching operation from the selection element SM to the selection element SL is executed, and the mating rotation element on the power distribution mechanism 1 side which is connected to the rotation element e on the power combining mechanism 2 side is changed from the rotation element c to the rotation element b.

<2MOT_electric CVT_Selection Switching Process 7>

Figure 45:
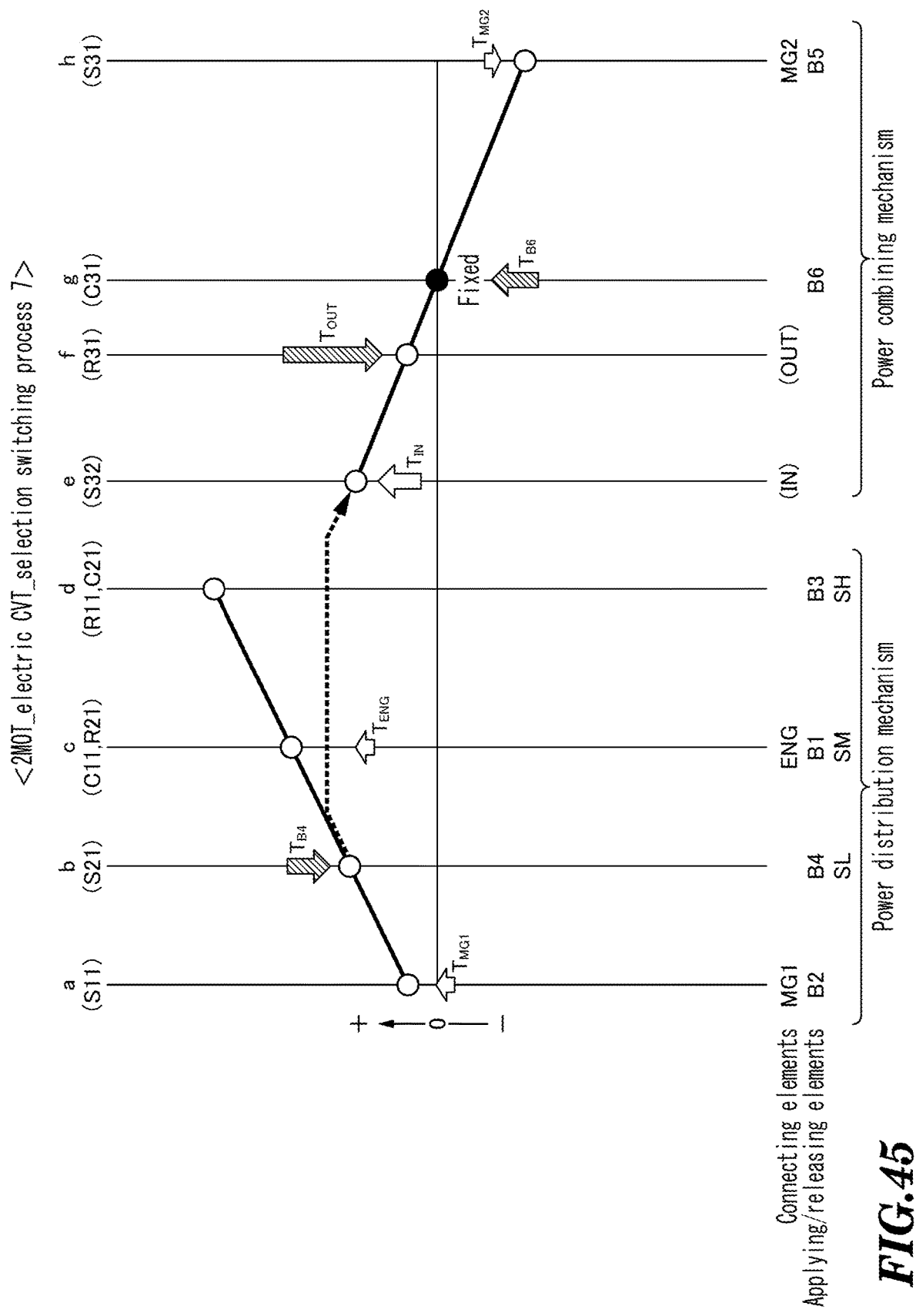
FIG. 45 is a nomographic chart showing a 2MOT_electric CVT_selection switching process 7.

As shown in FIG. 45, after the switching operation from the selection element SM to the selection element SL has been executed, the engine ENG and/or the first motor-generator MG1 is controlled to produce an appropriate desired torque and revolution speed, and the rotation speed of the rotation element c is increased. As this occurs, the revolution speed of the first motor-generator MG1 is controlled so that the rotation speed of the rotation element b which is connected to the rotation element e of the power combining mechanism 2 side does not change, and the rotation speed of the rotation element a is brought down towards 0.

<2MOT_electric CVT_Selection Switching Process 8>

Figure 46:
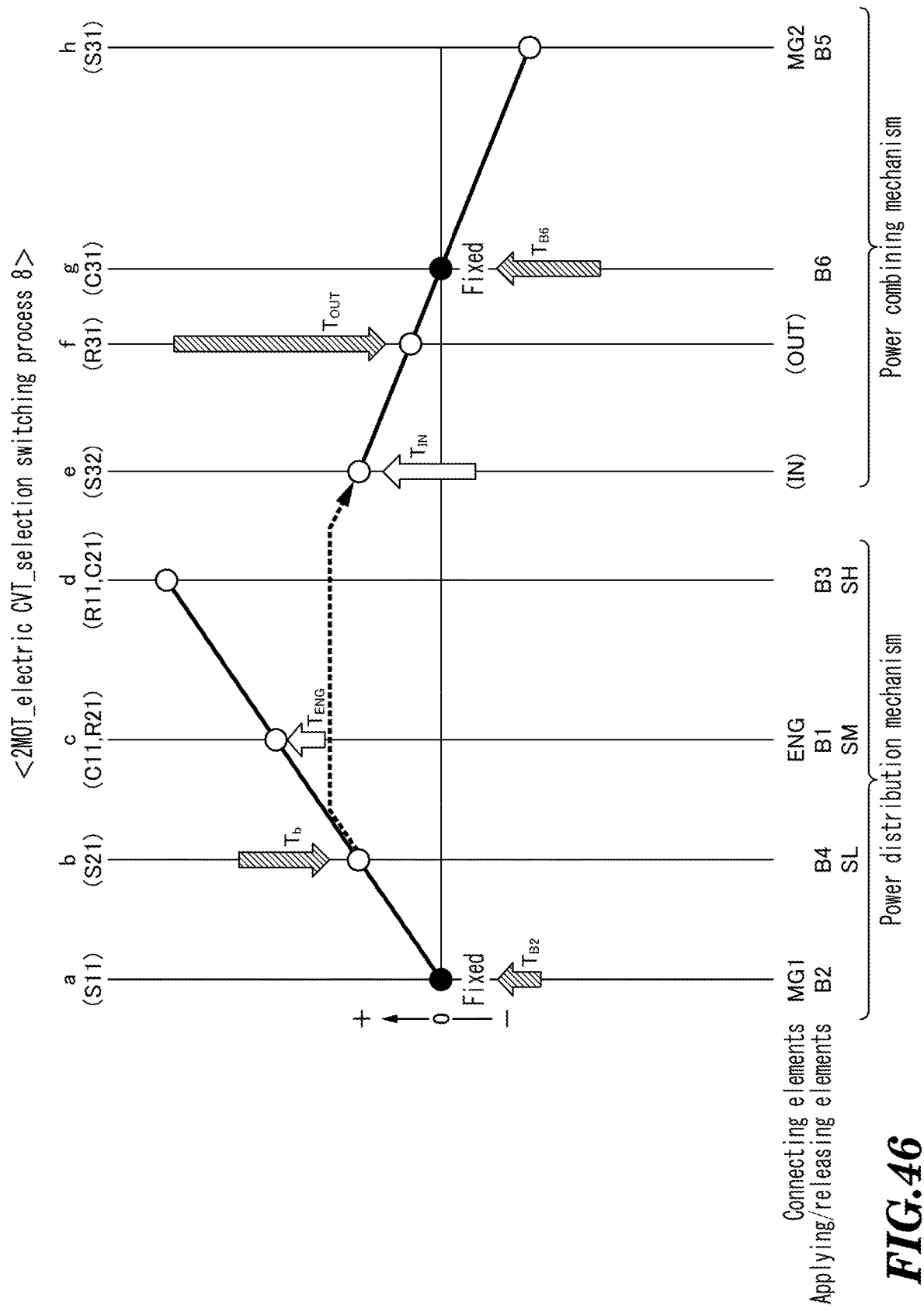
FIG. 46 is a nomographic chart showing a 2MOT_electric CVT_selection switching process 8.

As shown in FIG. 46, when the rotation speed of the rotation element a becomes substantially 0, the second brake mechanism B2 is applied so that the rotation element a is fixed so as not to rotate while stopping the first motor-generator MG1. By doing so, the shift to the fixed gear mode—first gear (hybrid driving) is completed.

—Driving Mode Shift Control—
<Driving Mode Shift Control (2MOT_electric CVT_Lo mode to 2MOT_electric CVT_Hi mode)>

Figure 47:
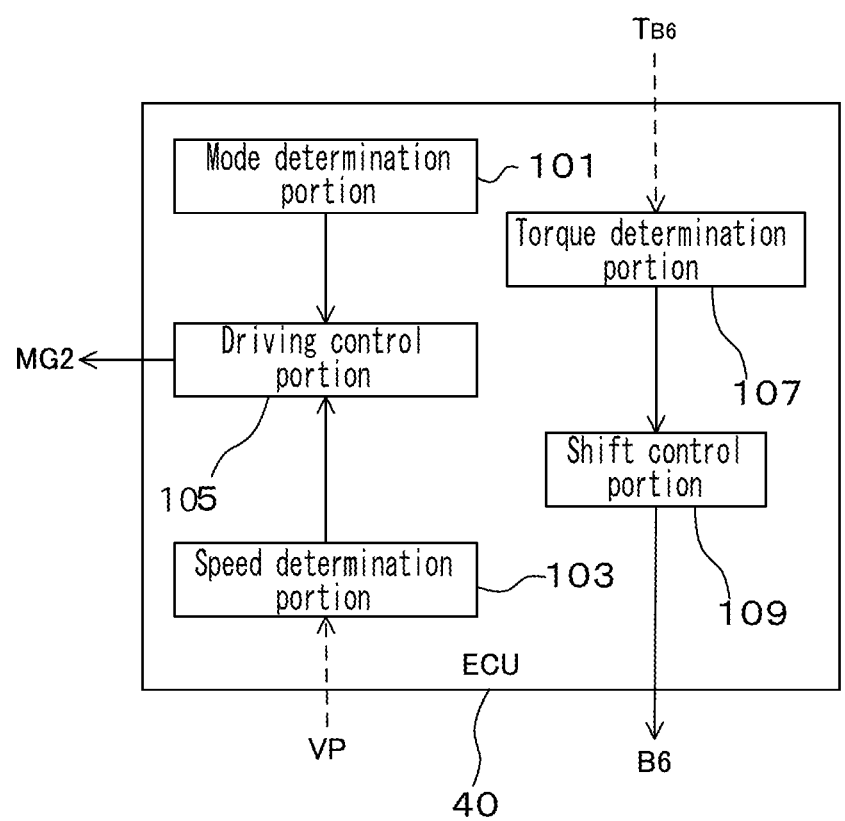
FIG. 47 is a block diagram showing an interior configuration of an ECU provided on a hybrid electric vehicle according to the first embodiment of the invention.

Next, a driving mode shift control (2MOT_electric CVT_Lo mode to 2MOT_electric CVT_Hi mode) of the power transmission apparatus 100 will be described. The driving mode shift control in the power transmission apparatus 100 is performed by the power transmission apparatus 100 and an ECU 40 which is installed on the hybrid electric vehicle. The ECU 40 controls the operation of the engine ENG, the driving of the first motor-generator MG1 and the second motor-generator MG2, the switching of the selection mechanism 3 and the application and release of the first brake mechanism B1 to the sixth brake mechanism B6. FIG. 47 is a block diagram showing an interior configuration of the ECU 40. In FIG. 47, arrows shown by a dotted line indicate value data, and arrows shown by a solid line indicate control signals that signal instructions.

As shown in FIG. 47, the ECU 40 has a mode determination portion 101, a speed determination portion 103, a driving control portion 105, a torque determination portion 107 and a shift control portion 109. The mode determination portion 101 determines whether or not the present driving mode is the 2MOT_electric CVT_Lo mode based on whether the first brake mechanism B1 to the sixth brake mechanism B6 are applied or released individually, which rotation elements are connected together via the selection mechanism 3, and the operating states of the engine ENG, the first motor-generator MG1 and the second motor-generator MG2. The speed determination portion 103 determines whether or not a speed deviation ΔV of the present vehicle speed VP which is measured by a vehicle speed sensor, not shown, from a predetermined speed V11 (=V11−VP) in the 2MOT_electric CVT_Lo mode is equal to or smaller than a threshold ΔVth (ΔV≤ΔVth).

The driving control portion 105 controls to drive the second motor-generator MG2 as a generator in the event that the mode determination portion 101 determines that the present driving mode is the 2MOT_electric CVT_Lo mode and the speed determination portion 103 determines that the speed deviation ΔV is equal to or smaller than the threshold ΔVth. The torque determination portion 107 determines whether or not an absolute value of a reaction torque TB6 in the rotation element g which is measured by a torque sensor, not shown, is equal to or smaller than a threshold Tth (|TB6|≤Tth). The shift control portion 109 shifts the driving mode from the 2MOT_electric CVT_Lo mode to the 2MOT_electric CVT_Hi mode by releasing the rotation element g which is fixed by the sixth brake mechanism B6 in the event that the torque determination portion 107 determines that the absolute value of the reaction torque TB6 in the rotation element g is equal to or smaller than the threshold Tth.

Hereinafter, operation patterns which change when the driving mode is shifted from the 2MOT_electric CVT_Lo mode to the 2MOT_electric CVT_Hi mode through the driving mode shift control of this embodiment will be described by reference to FIG. 10, nomographic charts in FIGS. 48 to 50, and FIG. 51. However, the descriptions of the torques generated in the rotation elements a to h made in the above paragraphs presented under the headings <2MOT_electric CVT_Hi Mode> and <2MOT_electric CVT_Rev Mode> will be used for descriptions of torques generated in the rotation elements a to h in nomographic charts in FIGS. 48 to 50. FIG. 51 is a flow chart showing a procedure of executing the driving mode shift control according to the first embodiment by the ECU 40.

<High Speed Driving in 2MOT_electric CVT_Lo Mode>

Figure 48:
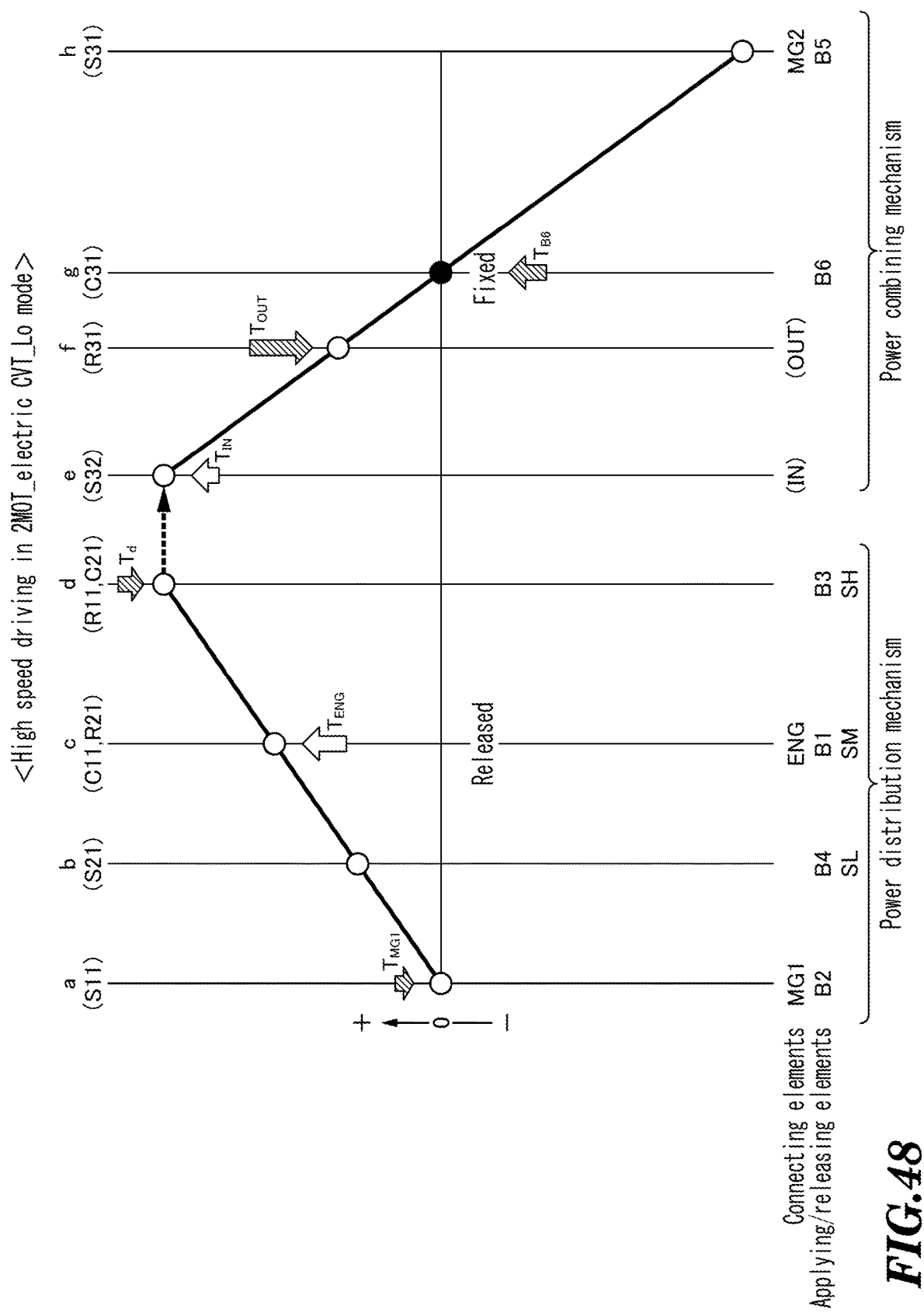
FIG. 48 is a nomographic chart showing a high speed driving in 2MOT_electric CVT_Lo mode during a driving mode shifting control according to the first embodiment.

As shown in FIG. 10, in the 2MOT_electric CVT_Lo mode, the vehicle speed is changed in a continuously variable fashion in a low speed area based on the driving control of the first motor-generator MG1 and the second motor-generator MG2 while applying the sixth brake mechanism B6 to thereby fix the rotation element g of the power combining mechanism 2 so as not to rotate and driving the engine ENG at a predetermined revolution speed. Then, when the vehicle speed comes nearer to the predetermined speed V11 in the 2MOT_electric CVT_Lo mode as shown in FIG. 48, a preparation for transfer to the 2MOT_electric CVT_Hi mode is started as shown in FIG. 49.

As this occurs, the mode determination portion 101 of the ECU 40 executes a step ST11 where it is determined whether or not the present driving mode is the 2MOT_electric CVT_Lo mode as shown in FIG. 51, and if the result of the determination is affirmative, the driving mode shift control proceeds to a step ST12. In the step ST12, the speed determination portion 103 determines whether or not the speed deviation ΔV (=V11−VP) which is the difference between the predetermined speed V11 in the 2MOT_electric CVT_Lo mode and the present vehicle speed VP is equal to or smaller than the threshold ΔVth. If the result of the determination in the step ST12 is affirmative (ΔV≤ΔVth), the driving mode shift control proceeds to a step ST13 where a preparation for transfer from the 2MOT_electric CVT_Lo mode to the 2MOT_electric CVT_Hi mode is started. If the result of the determination in the step ST12 is negative (ΔV>ΔVth), the driving mode shift control returns to the step ST12.

<Transfer Preparation from 2MOT_electric CVT_Lo Mode to 2MOT_electric CVT_Hi Mode>

Figure 49:
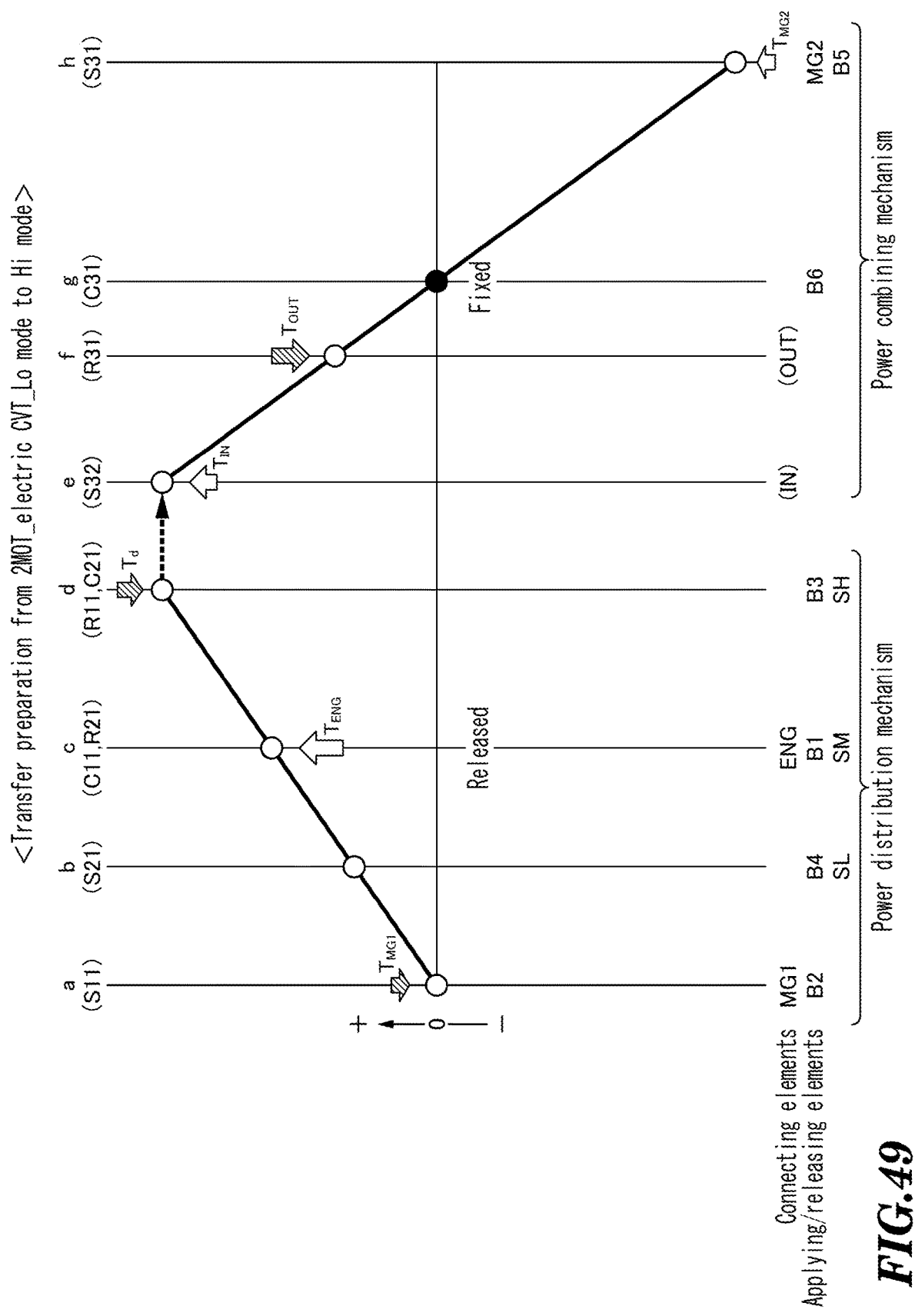
FIG. 49 is a nomographic chart showing a transfer preparation from 2MOT_electric CVT_Lo mode to 2MOT_electric CVT_Hi mode during the driving mode shifting control according to the first embodiment.

At a preparation stage for transfer from the 2MOT_electric CVT_Lo mode to the 2MOT_electric CVT_Hi mode shown in FIG. 49, the driving control portion 105 executes a step ST13 shown in FIG. 51. In the step ST13, the drive control portion 105 controls to drive the second motor-generator MG2 as a generator so as to bring down the reaction torque TB6 of the rotation element g, which is the fixed point, towards 0 while holding the revolution speed of the output shaft OUT. In the example shown in FIG. 49, an action torque TMG2 in the forward rotating direction is generated in the rotation element h by causing the second motor-generator MG2, which is then revolving idly, to operate as the generator while holding the revolution speed thereof, and the reaction torque TB6 in the rotation element g, which is the fixed point, is brought down towards 0.

When the driving control portion 105 controls to drive the second motor-generator MG2, a step ST14 in FIG. 51 is executed. In the step ST14, the torque determination portion 107 determines whether or not the absolute value of the reaction torque TB6 in the rotation element g is equal to or smaller than the threshold Tth (|TB6|≤Tth). The threshold Tth is a value which is nearer to 0. If the result of the determination in the step ST14 is affirmative (|TB6|≤Tth), the driving mode shift control proceeds to a step ST15 where the 2MOT_electric CVT_Lo mode shifts to a stage of transfer to the 2MOT_electric CVT_Hi mode. If the result of the determination in the step ST14 is negative (|TB6|>Tth), the driving mode shift control returns to the step ST12.

<2MOT_electric CVT_Lo Mode to 2MOT_electric CVT_Hi Mode Transfer>

Figure 50:
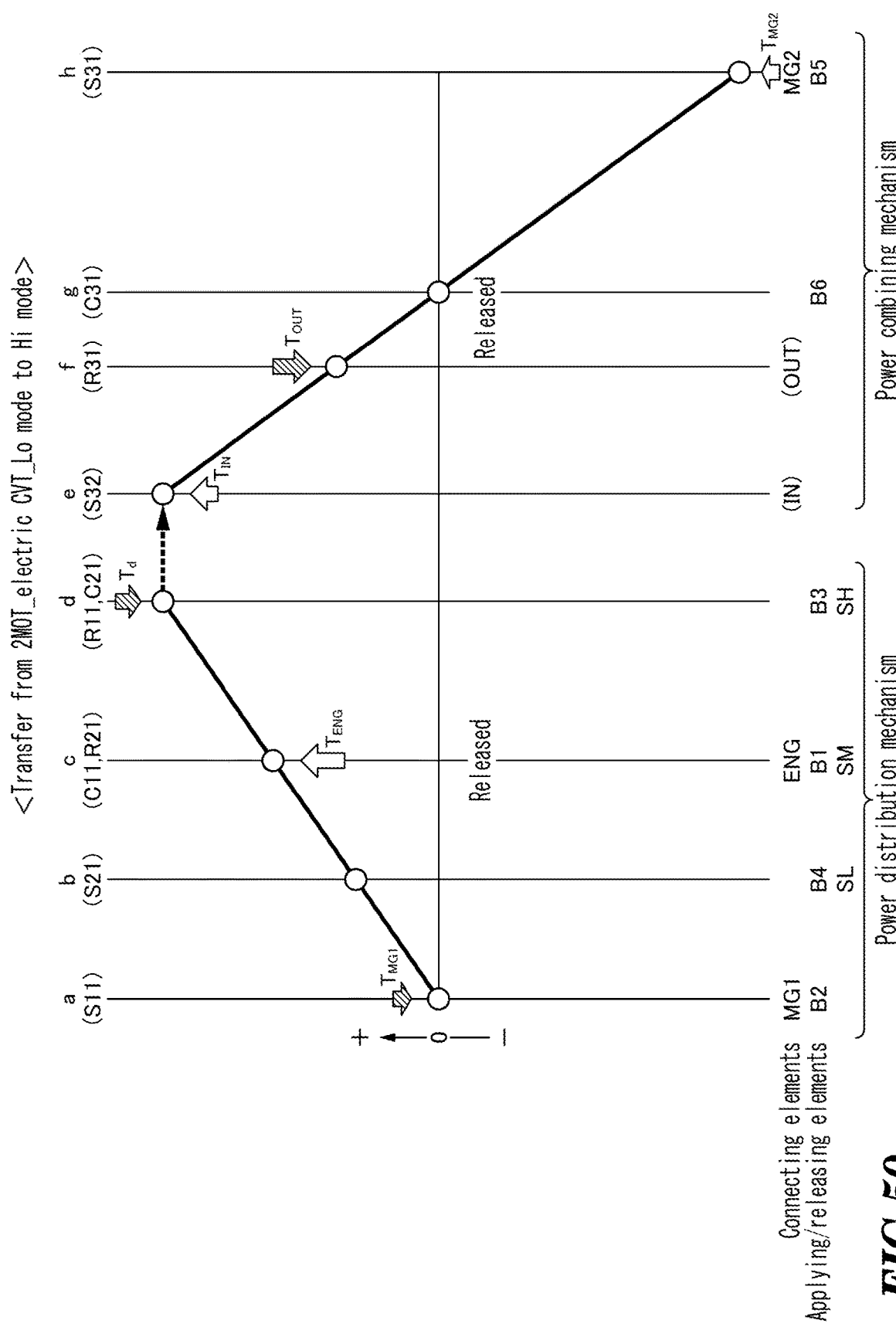
FIG. 50 is a nomographic chart showing a transfer from 2MOT_electric CVT_Lo mode to 2MOT_electric CVT_Hi mode during the driving mode shifting control according to the first embodiment.
Figure 51:
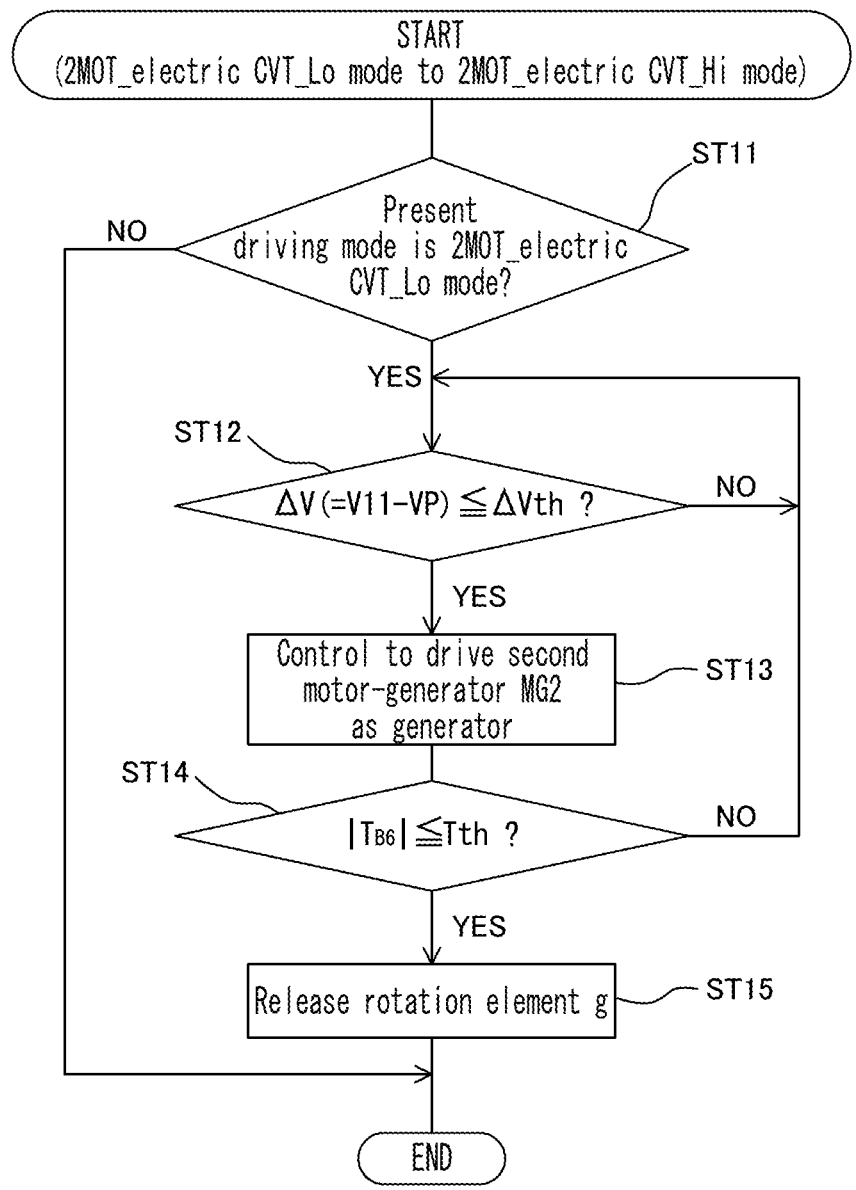
FIG. 51 is a flow chart showing a procedure of executing the driving mode shifting control by the ECU according to the first embodiment.

At a stage of transfer from the 2MOT_electric CVT_Lo mode to the 2MOT_electric CVT_Hi mode shown in FIG. 50, the shift control portion 109 executes a step ST15 shown in FIG. 51. In the step ST15, the shift control portion 109 releases the sixth brake mechanism B6 so as to enable the rotation element g to rotate, whereby the driving mode shifts from the 2MOT_electric CVT_Lo mode to the 2MOT_electrical CVT_Hi mode.

According to the embodiment of the invention which is configured as described heretofore, the power transmission apparatus 100 has the engine ENG, the first motor-generator MG1, the second motor-generator MG2, the power distribution mechanism 1 which is made up of the first differential transmission which is connected to the engine ENG and the first motor-generator MG1 and in which at least three rotation elements a to d can rotate in differential motions to one another, the power combining mechanism 2 which is made up of the second differential transmission which is connected to the power distribution mechanism 1, the second motor-generator MG2 and the output shaft OUT and in which the four rotation elements e to h can rotate in differential motions to one another, the sixth brake mechanism B6 which can selectively fix the rotation element g of the power combining mechanism 2 so as not to rotate, the first brake mechanism B1 which can selectively fix the rotation element c of the power distribution mechanism 1 so as not to rotate, and the fourth brake mechanism B4 which can selectively fix the rotation element b in the rotation elements of the power distribution mechanism 1 which is connected to neither the engine ENG nor the first motor-generator MG1 so as not to rotate. In addition, the power combining mechanism 2 is configured so that the rotation element e which is connected to the power distribution mechanism 1, the rotation element f which is connected to the output shaft OUT, the rotation element g which is connected to the sixth brake mechanism B6, and the rotation element h which is connected to the second motor-generator MG2 are aligned sequentially in that order on the nomographic chart, and the power distribution mechanism 1 is configured so that the rotation element a which is connected to the first motor-generator MG1, the rotation element b which is connected to the fourth brake mechanism B4, the rotation element c which is connected to the engine ENG, and the rotation element d which is connected to the power combining mechanism 2 are aligned sequentially in that order on the nomographic chart. Further, the power transmission apparatus 100 has the selection mechanism 3 which can selectively connect the rotation element e of the rotation elements of the power combining mechanism 2 which is connected to the power distribution mechanism 1 to, in the rotation elements of the power distribution mechanism 1, the rotation element d which is connected to none of the first motor-generator MG1, the fourth brake mechanism B4 and the engine ENG, the rotation element c to which the engine ENG is connected, and the rotation element b to which the fourth brake mechanism B4 is connected. In this way, since the power transmission apparatus 100 has the first brake mechanism B1 which can selectively fix the rotation element c of the power distribution mechanism 1 which is connected to the engine ENG so as not to rotate, the power of the first motor-generator MG1 which is connected to the power distribution mechanism 1 is transmitted to the power combining mechanism 2 by fixing the rotation element c which is connected to the engine ENG using the first brake mechanism B1 so as to be combined with the power of the second motor-generator MG2 in the two motor EV driving mode, whereby the two motor EV driving can be realized.

In addition, in the two motor EV driving mode, since the torque characteristics can be changed by switching the sixth brake mechanism B6, the plurality of EV driving modes (the 2MOT_EV_Lo mode and the 2MOT_EV_Hi mode) having the different driving force characteristics can be realized while avoiding the increase in size, cost and weight of the electric motors.

Additionally, since the power transmission apparatus 100 has the fourth brake mechanism B4 which can selectively fix the rotation element b of the rotation elements of the power distribution mechanism 1 which is connected to neither the engine ENG nor the first motor-generator so as not to rotate, the vehicle can be driven at different speeds while shifting the gears by switching the fourth brake mechanism B4.

Since the connecting positions between the power distribution mechanism 1 and the power combining mechanism 2 can be switched by the selection mechanism 3, the number of gears to be shifted to enable the vehicle to be driven at different speeds while shifting the gears can be increased.

Further, in the three gears (the second gear, the fifth gear, the seventh gear) of the eight gears which are used in the fixed gear mode, the so-called mechanical pass is realized 100% in which the vehicle runs only on the power of the engine ENG by fixing the rotation element a which is connected to the first motor-generator MG1 and the rotation element h which is connected to the second motor-generator MG2 by the second brake mechanism B2 and the fifth brake mechanism B5, respectively, and as a result, high power transmission rate is obtained.

In the driving mode shift control of the embodiment which has been described above, in shifting the driving mode from the 2MOT_electric CVT_Lo mode to the 2MOT_electric CVT_Hi mode, when the vehicle speed comes nearer to the predetermined vehicle speed V11 in the 2MOT_electric CVT_Lo mode, the reaction torque TB6 which is applied to the rotation element g which is fixed by the sixth brake mechanism B6 is brought down towards 0 by controlling to drive the second motor-generator MG2 as the generator while holding the revolution speed of the output shaft OUT, and the sixth brake mechanism B6 is released when the absolute value of the reaction torque TB6 is equal to or smaller than the predetermined threshold Tth. In this way, the revolution speed of the output shaft OUT does not change before and after the mode shifting and the reaction torque TB6 generated in the rotation element g when the rotation element g which is fixed by the sixth brake mechanism B6 is released stays nearer to 0. Therefore, noise or vibration which is generated in shifting from the 2MOT_electric CVT_Lo mode to the 2MOT_electric CVT_Hi mode can be reduced.

Second Embodiment

Next, a power transmission apparatus 100B according to a second embodiment of the invention will be described by reference to FIG. 52. However, like reference numerals to those of the first embodiment will be given to configurations common to the first embodiment, whereby the description of the first embodiment will be used.

Figure 52:
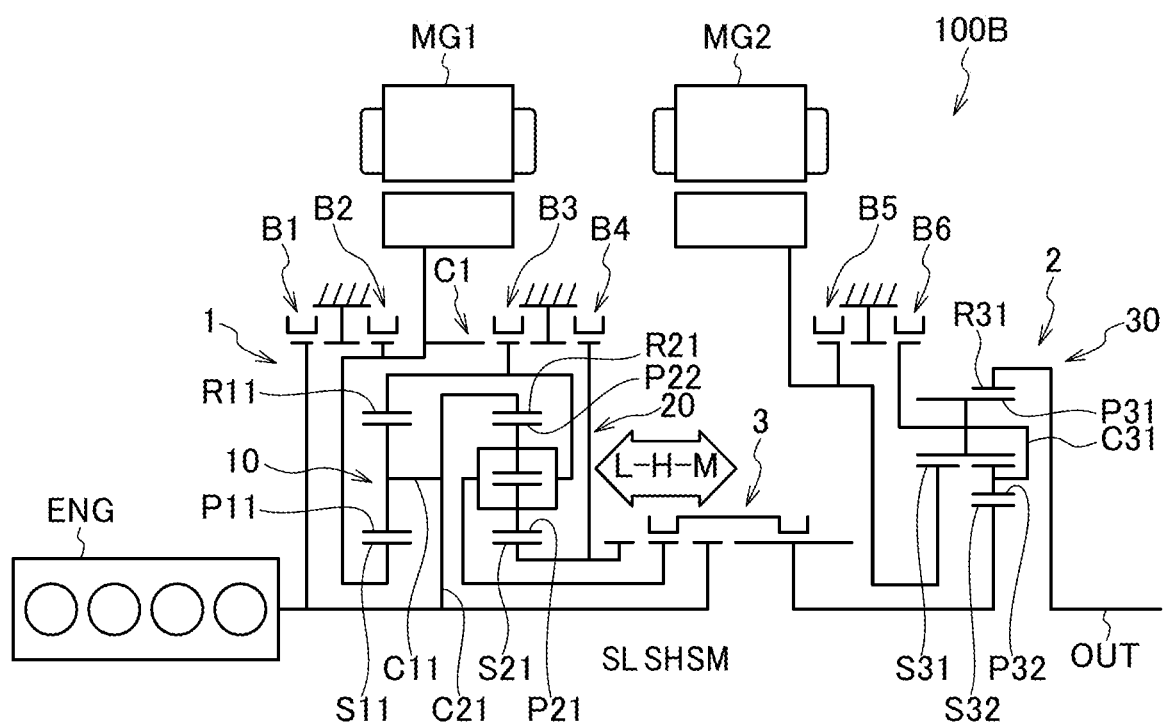
FIG. 52 is a skeleton diagram of a power transfer apparatus according to a second embodiment of the invention.
Figure 53:
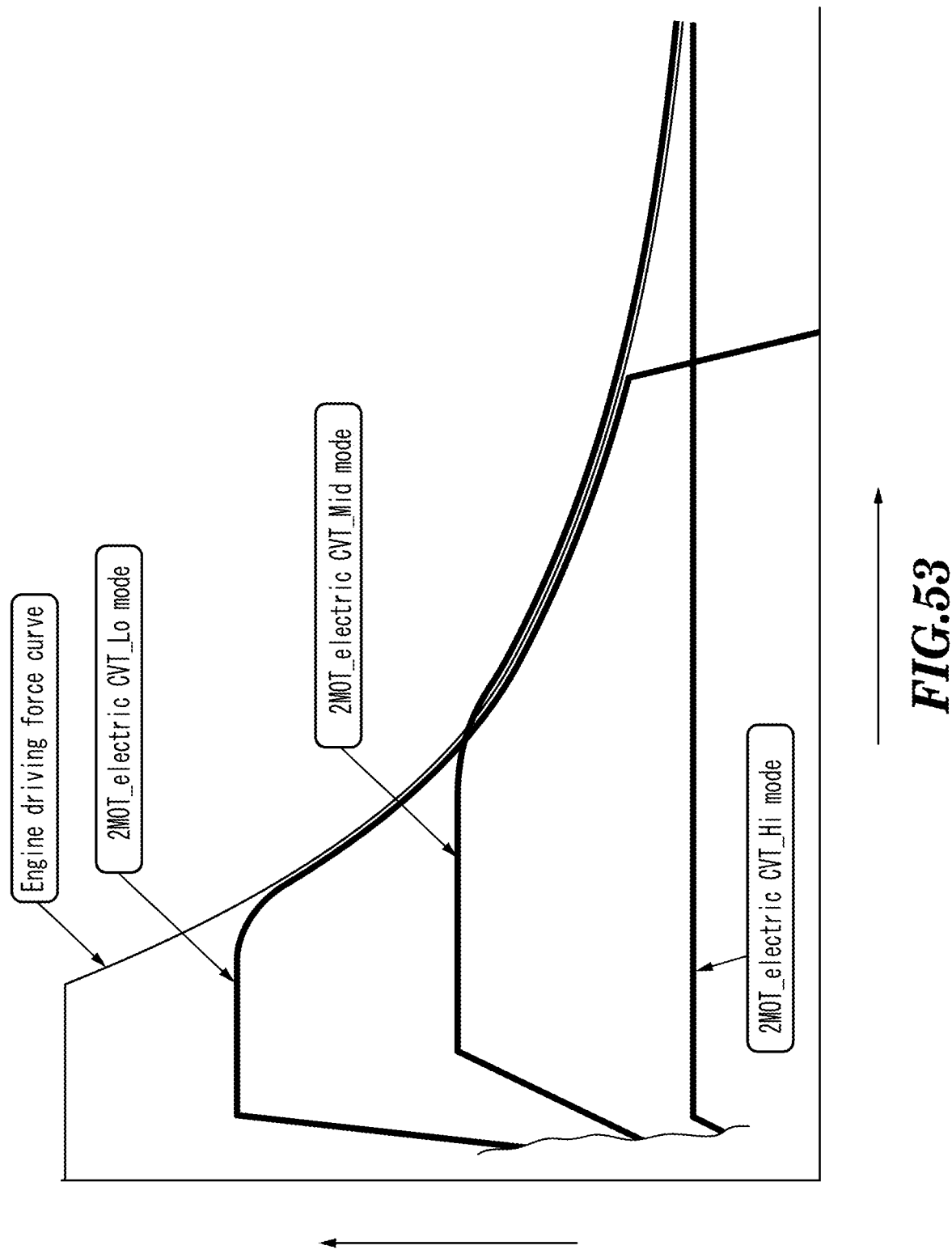
FIG. 53 is a driving force curve of a 2MOT_electric CVT mode in the power transfer apparatus according to the second embodiment.

As shown in FIG. 52, the power transmission apparatus 100B according to the second embodiment differs from the first embodiment in that the power transmission apparatus 100B has a clutch mechanism C1 which is a connection mechanism which can connect together at least two of rotation elements a to d of a power distribution mechanism 1. By adopting this configuration, as shown in FIG. 53, in a two motor electric CVT mode, in shifting from a 2MOT_electric CVT_Lo mode which exhibits a low speed and high torque driving force characteristic to a 2MOT_electric CVT_Hi mode which exhibits a high speed and low torque driving force characteristic, an electric CVT_Mid mode can be realized which has a middle driving force characteristic between the electric CVT_Lo mode and the electric CVT_Hi mode by switching the clutch mechanism C1, thereby making it possible to suppress the variation in torque and revolution speed during the mode shifting. For example, the clutch mechanism C1 according to the second embodiment can hold a state where rotation speeds of rotation elements a to d of a power distribution mechanism 1 are synchronized with one another by connecting the rotation element a and the rotation element d of the power distribution mechanism 1 together, and therefore, the variation in torque and revolution speed can be suppressed when a selection mechanism 3 performs a switching operation. Consequently, compared with the mode shifting shown in FIG. 9, the mode shifting using the clutch mechanism C1 becomes free from shock and smooth.

—Driving Mode Shift Control—

<Driving Mode Shift Control (2MOT_electric CVT_Lo Mode to 2MOT_electric CVT_Mid Mode)>

Figure 54:
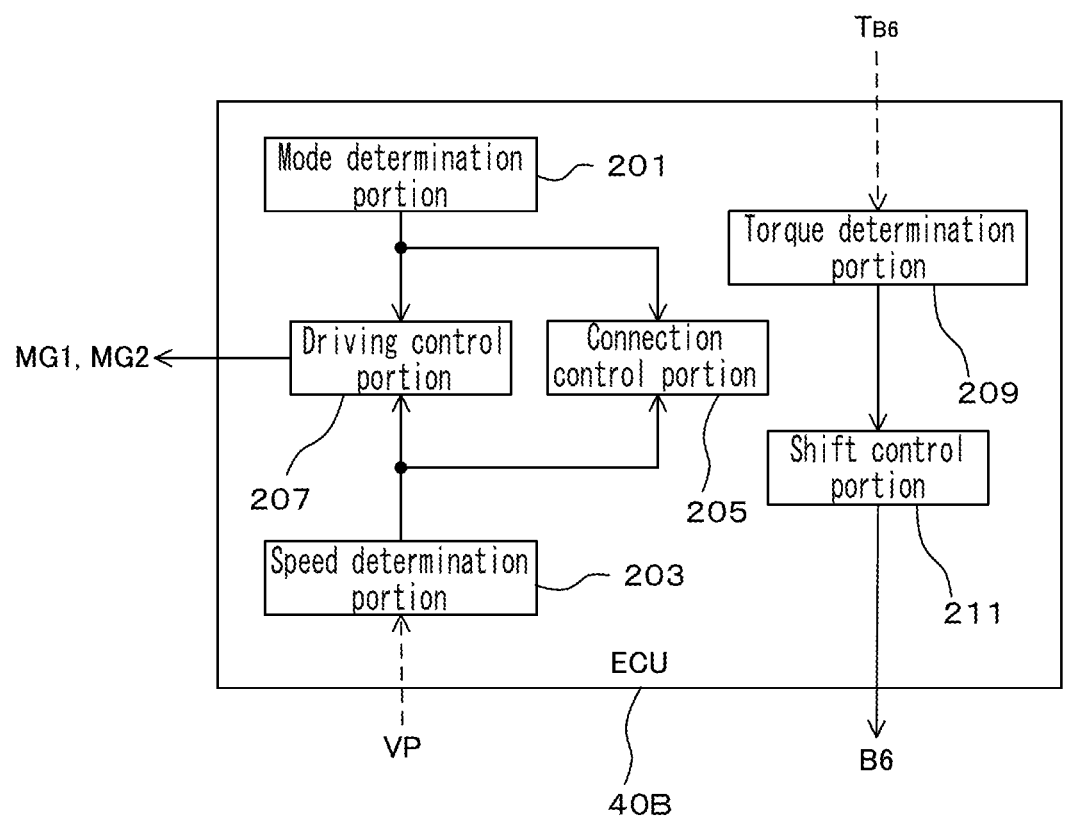
FIG. 54 is a block diagram showing an interior configuration of an ECU provided on a hybrid electric vehicle according to the second embodiment of the invention.

Hereinafter, a driving mode shift control (2MOT_electric CVT_Lo mode to 2MOT_electric CVT_Mid mode) of the power transmission apparatus 100B according to the second embodiment will be described. The driving mode shift control in the power transmission apparatus 100B is performed by the power transmission apparatus 100B and an ECU 40B which is installed on the hybrid electric vehicle. Similar to the ECU 40 of the first embodiment, the ECU 40B controls the operation of an engine ENG, the driving of a first motor-generator MG1 and a second motor-generator MG2, the switching of the selection mechanism 3, and the application and release of a first brake mechanism B1 to a sixth brake mechanism B6. Further, the ECU 40B also controls the engagement and disengagement of the clutch mechanism C1. FIG. 54 is a block diagram showing an interior configuration of the ECU 40B. In FIG. 54, arrows shown by a dotted line indicate value data, and arrows shown by a solid line indicate control signals that signal instructions.

As shown in FIG. 54, the ECU 40B has a mode determination portion 201, a speed determination portion 203, a connection control portion 205, a driving control portion 207, a torque determination portion 209 and a shift control portion 211. The mode determination portion 201 determines whether or not the present driving mode is the 2MOT_electric CVT_Lo mode based on whether the first brake mechanism B1 to the sixth brake mechanism B6 are applied or released individually, which rotation elements are connected together via the selection mechanism 3, and the operating states of the engine ENG, the first motor-generator MG1 and the second motor-generator MG2. The speed determination portion 203 determines whether or not a speed deviation $\Delta V(=V21-VP)$ which is a difference between a predetermined speed V21 in the 2MOT_electric CVT_Lo mode and the present vehicle speed VP which is measured by a vehicle speed sensor, not shown, is equal to or smaller than a threshold $\Delta Vth$ ($\Delta V \leq \Delta Vth$). The connection control portion 205 engages the clutch mechanism C1 so as to connect the rotation element a and the rotation element d of the power distribution mechanism 1 in the event that the mode determination portion 201 determines that the present driving mode is the 2MOT_electric CVT_Lo mode and that the speed determination portion 203 determines that the speed deviation $\Delta V$ is equal to or smaller than the threshold $\Delta Vth$.

The driving control portion 207 controls to drive the second motor-generator MG2 as a generator and controls to drive the first motor-generator MG1 as a generator in the event that the mode determination portion 201 determines that the present driving mode is the 2MOT_electric CVT_Lo mode and that the speed determination portion 203 determines that the speed deviation $\Delta V$ is equal to or smaller than the threshold $\Delta Vth$. The torque determination portion 209 determines whether or not an absolute value of a reaction torque TB6 in the rotation element g which is measured by a torque sensor, not shown, is equal to or smaller than a threshold Tth ($|TB6| \leq Tth$). The shift control portion 211 shifts the driving mode from the 2MOT_electric CVT_Lo mode to the 2MOT_electric CVT_Hi mode by releasing the rotation element g which is fixed by the sixth brake mechanism B6 in the event that the torque determination portion 209 determines that the absolute value of the reaction torque TB6 in the rotation element g is equal to or smaller than the threshold Tth.

Hereinafter, operation patterns which change when the driving mode is shifted from the 2MOT_electric CVT_Lo mode to the 2MOT_electric CVT_Mid mode through the driving mode shift control of this embodiment will be described by reference to nomographic charts in FIGS. 55 to 59, and FIG. 60. FIG. 60 is a flow chart showing a procedure of executing the driving mode shift control according to the second embodiment by the ECU 40B.

<High Speed Driving in 2MOT_electric CVT_Lo Mode>

Figure 55:
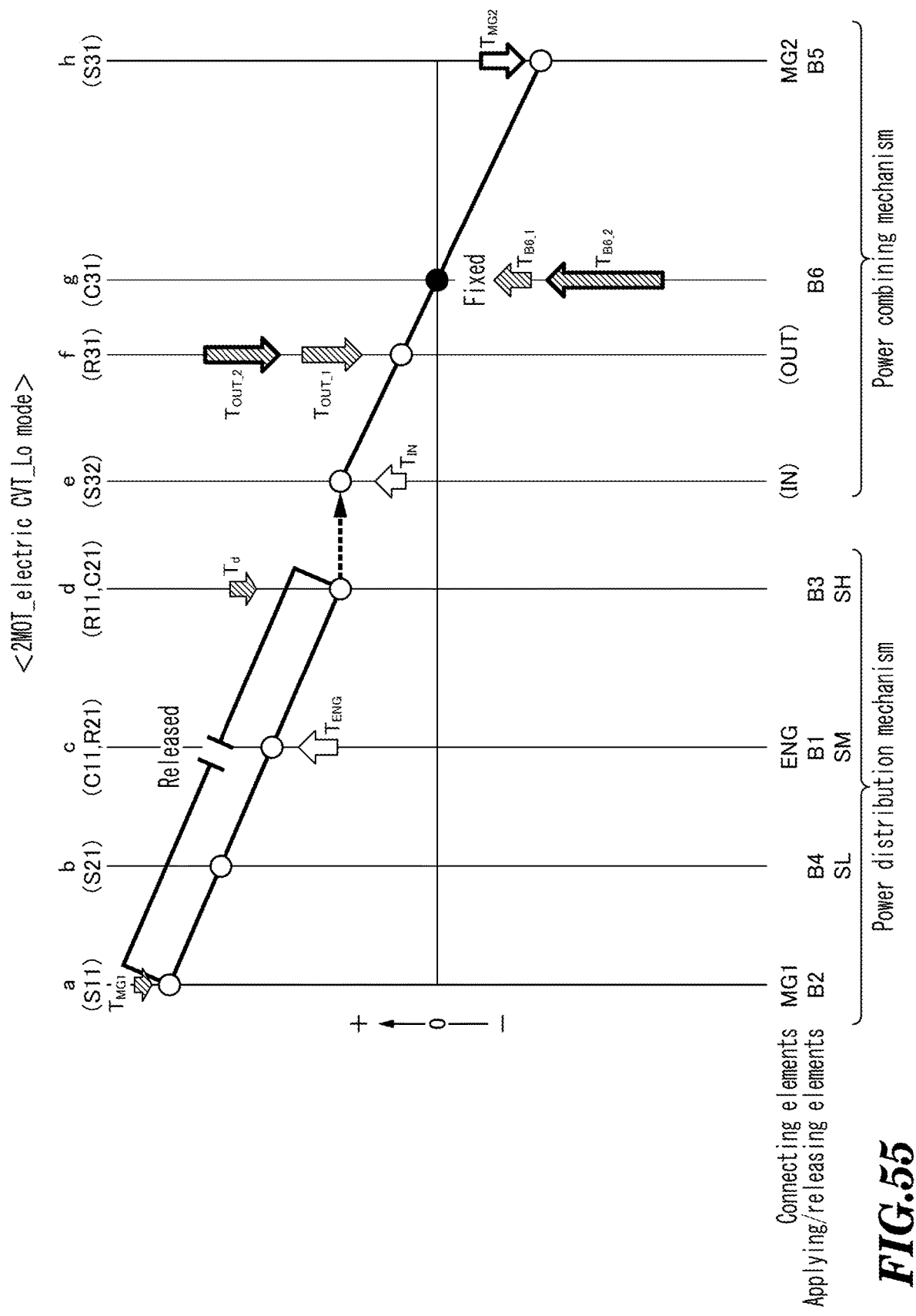
FIG. 55 is a nomographic chart of a 2MOT_electric CVT_Lo mode.
Figure 56:
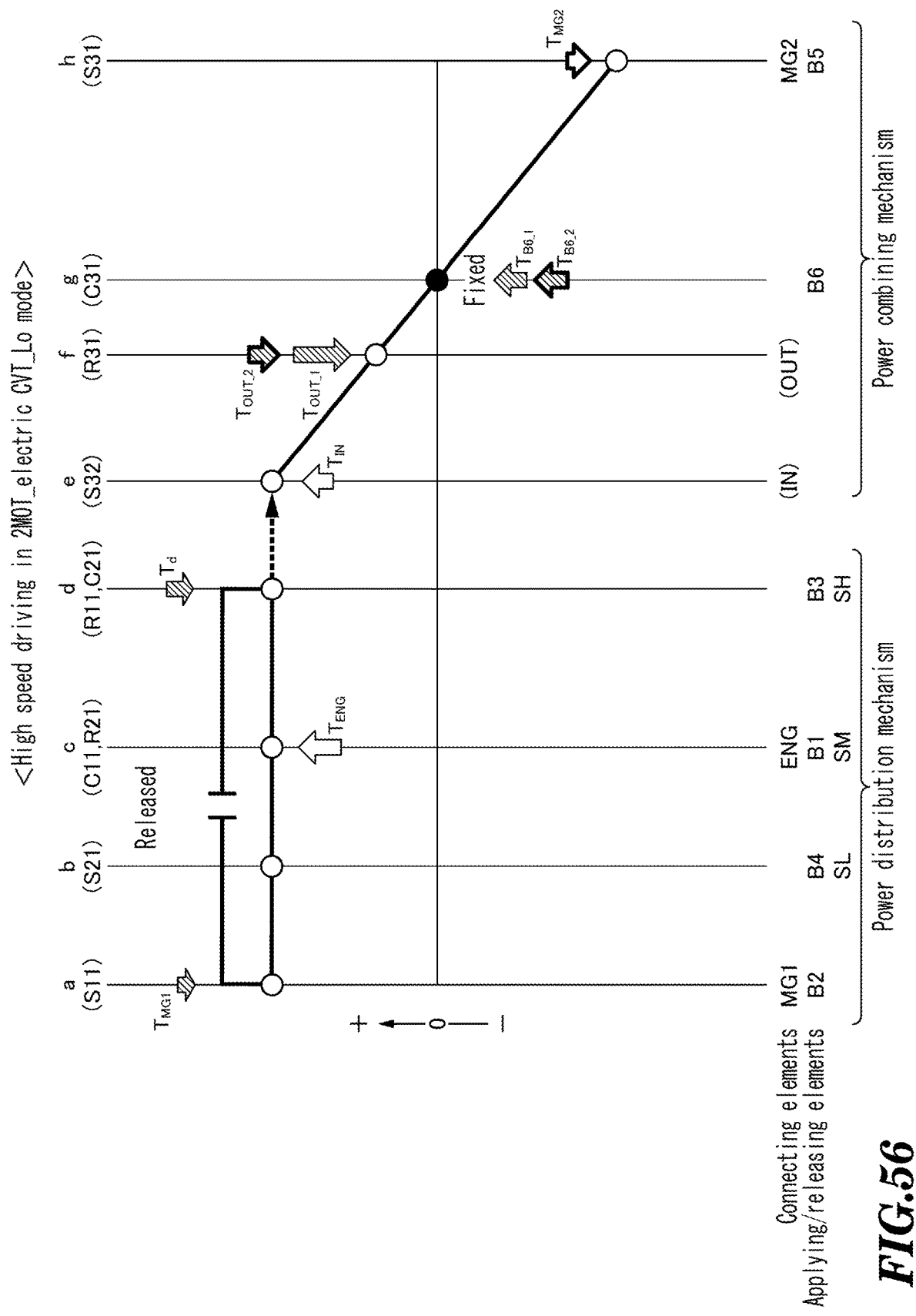
FIG. 56 is a nomographic chart showing a high speed driving in 2MOT_electric CVT_Lo mode during a driving mode shifting control according to the second embodiment.

As shown in FIG. 55, in the 2MOT_electric CVT_Lo mode, the vehicle speed is changed in a continuously variable fashion in a low speed area based on the driving control of the first motor-generator MG1 and the second motor-generator MG2 while applying the sixth brake mechanism B6 to thereby fix the rotation element g of the power combining mechanism 2 so as not to rotate and holding the revolution speed of the engine ENG constant. Then, when the vehicle speed comes nearer to the predetermined speed V21 in the 2MOT_electric CVT_Lo mode as shown in FIG. 56, a preparation for transfer to the 2MOT_electric CVT_Mid mode is started as shown in FIG. 57.

As this occurs, the mode determination portion 201 of the ECU 40B executes a step ST21 where it is determined whether or not the present driving mode is the 2MOT_electric CVT_Lo mode as shown in FIG. 60, and if the result of the determination is affirmative, the driving mode shift control proceeds to a step ST22. In the step ST22, the speed determination portion 203 determines whether or not the speed deviation $\Delta V$ ($=V21-VP$) which is the difference between the predetermined speed V21 in the 2MOT_electric CVT_Lo mode and the present vehicle speed VP is equal to or smaller than the threshold $\Delta Vth$. If the result of the determination in the step ST22 is affirmative ($\Delta V \leq \Delta Vth$), the driving mode shift control proceeds to a step ST23 where a preparation for transfer from the 2MOT_electric CVT_Lo mode to the 2MOT_electric CVT_Mid mode is started. If the result of the determination in the step ST22 is negative ($\Delta V > \Delta Vth$), the driving mode shift control returns to the step ST22.

<Transfer Preparation 1 from 2MOT_electric CVT_Lo Mode to 2MOT_electric CVT_Mid Mode>

Figure 57:
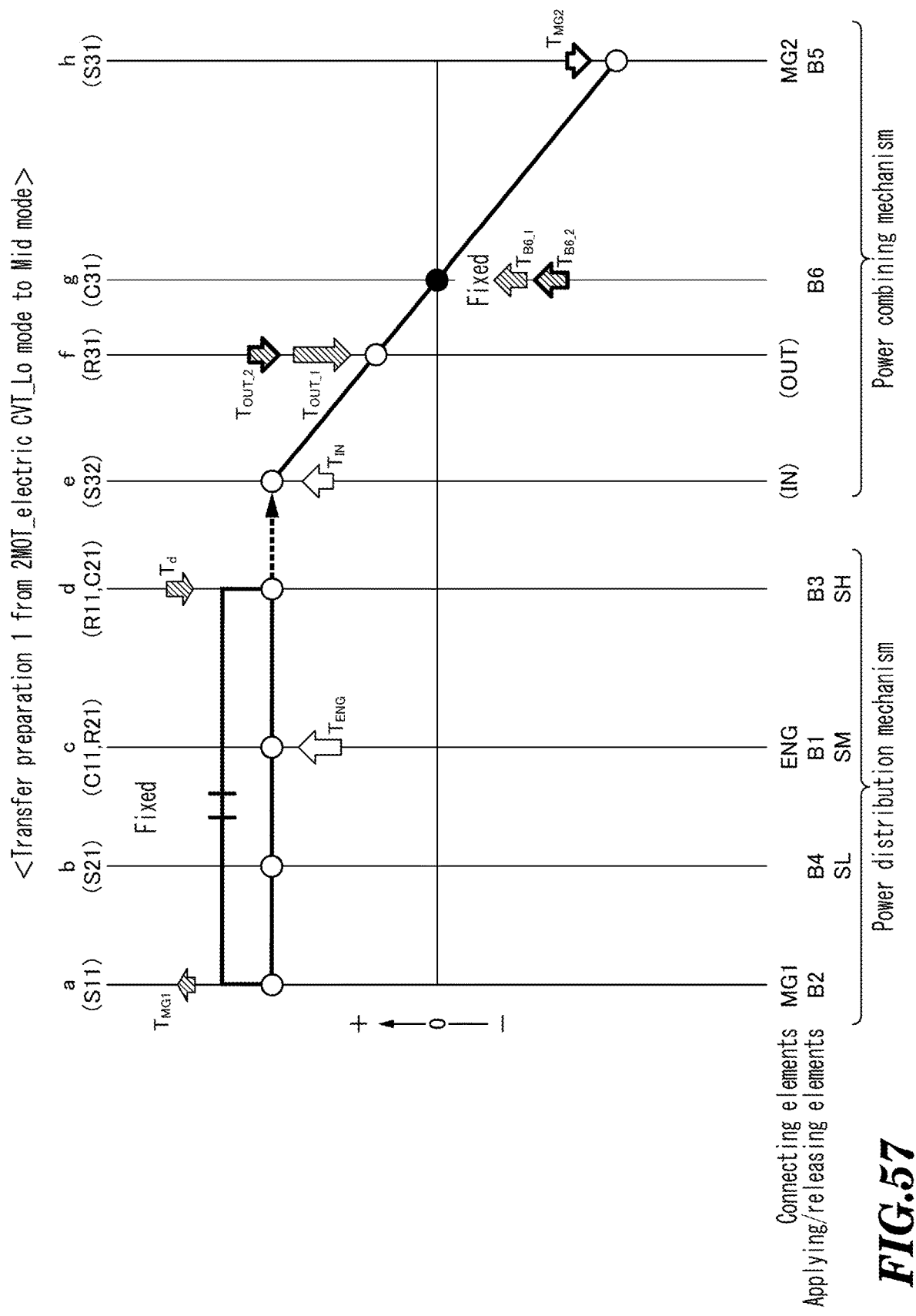
FIG. 57 is a nomographic chart showing a transfer preparation 1 from 2MOT_electric CVT_Lo mode to 2MOT_electric CVT_Mid mode during the driving mode shifting control according to the second embodiment.

At a preparation stage 1 for transfer from the 2MOT_electric CVT_Lo mode to the 2MOT_electric CVT_Mid mode shown in FIG. 57, the connection control portion 205 executes a step ST23 shown in FIG. 60. In the step ST23, the connection control portion 205 engages the clutch mechanism C1 so as to connect the rotation element a and the rotation element d of the power distribution mechanism 1. The rotation speeds of the rotation elements a to d of the power distribution mechanism 1 are synchronized by the engagement of the clutch mechanism C1 in the step ST23, and the rotation elements become horizontal on the nomographic chart, whereby the torque TIN which is transmitted to the power combining mechanism 2 can be increased or decreased based on the driving control of the first motor-generator MG1 while the rotation elements a to d are kept holding their rotation speeds based on the revolution speed of the engine ENG. In this embodiment, when the vehicle speed comes nearer to the predetermined speed V21 in the 2MOT_electric CVT_Lo mode, as shown in FIG. 56, the first motor-generator MG1 is controlled so that the rotation speeds of the rotation elements a to d of the power distribution mechanism 1 are synchronized. Due to this, even though the clutch mechanism C1 is controlled to be engaged, vibration or noise which would be generated when the rotation element a and the rotation element d are connected together can be suppressed.

<Transfer Preparation 2 from 2MOT_electric CVT_Lo Mode to 2MOT_electric CVT_Mid Mode>

Figure 58:
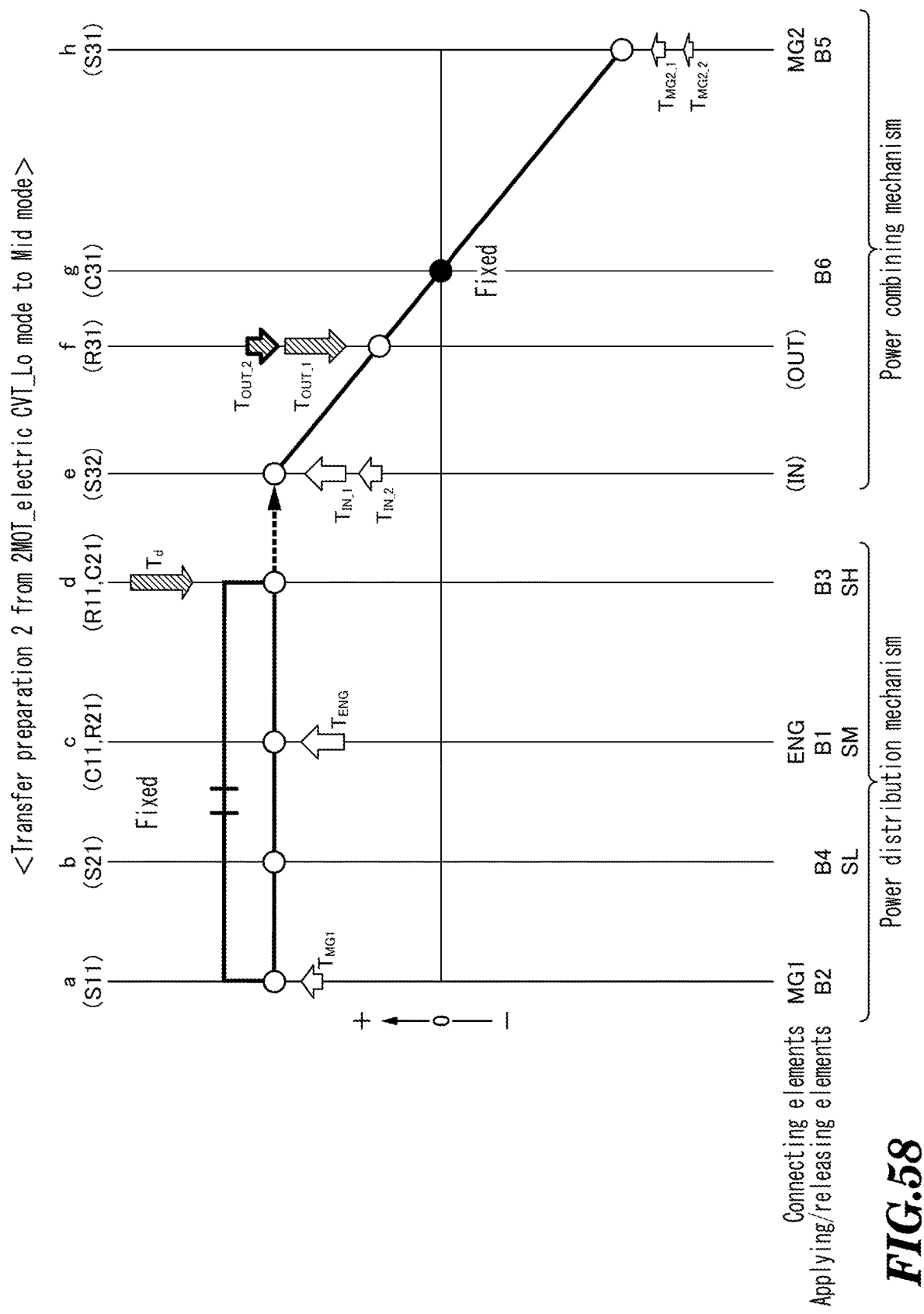
FIG. 58 is a nomographic chart showing a transfer preparation 2 from 2MOT_electric CVT_Lo mode to 2MOT_electric CVT_Mid mode during the driving mode shifting control according to the second embodiment.

At a preparation stage 2 of transfer from the 2MOT_electric CVT_Lo mode to the 2MOT_electric CVT_Mid mode shown in FIG. 58, the driving control portion 207 executes a step ST24 shown in FIG. 60. In the step ST24, the drive control portion 207 controls to drive the first motor-generator MG1 as the generator using generated electric power which is obtained by controlling to drive the second motor-generator MG2 as a generator so as to bring down the reaction torque TB6 of the rotation element g, which is the fixed point, towards 0 while holding the revolution speed and torque of the output shaft OUT. In the example shown in FIG. 58, an action torque TMG2 (TMG2_1+TMG2_2) in the forward rotating direction is generated in the rotation element h by causing the second motor-generator MG2, which is being driven for power running, to operate as the generator while holding the revolution speed thereof, and the reaction torque TB6 in the rotation element g, which is the fixed point, is brought down towards 0. In addition, the first motor-generator MG1, which is generating electricity, is switched to be driven for power running in order to suppress the variation in torque (reaction torque TOUT=TOUT_1+TOUT_2) of the rotation element f which is associated with causing the reaction torque TB6 to come nearer to 0, whereby the action torque TMG1 of the first motor-generator MG1 is transmitted to the power combining mechanism 2 side as a torque TIN_2.

When the driving control portion 207 controls to drive the first motor-generator MG1 and the second motor-generator MG2, a step ST25 in FIG. 60 is executed. In the step ST25, the torque determination portion 209 determines whether or not the absolute value of the reaction torque TB6 in the rotation element g is equal to or smaller than the threshold Tth (|TB6|≤Tth). The threshold Tth is a value which is nearer to 0. If the result of the determination in the step ST25 is affirmative (|TB6|≤Tth), the driving mode shift control proceeds to a step ST26 where the 2MOT_electric CVT_Lo mode shifts to a stage of transfer to the 2MOT_electric CVT_Mid mode.

If the result of the determination in the step ST25 is negative (|TB6|>Tth), the driving mode shift control returns to the step ST22.

<Transfer from 2MOT_electric CVT_Lo Mode to 2MOT_electric CVT_Mid Mode>

Figure 59:
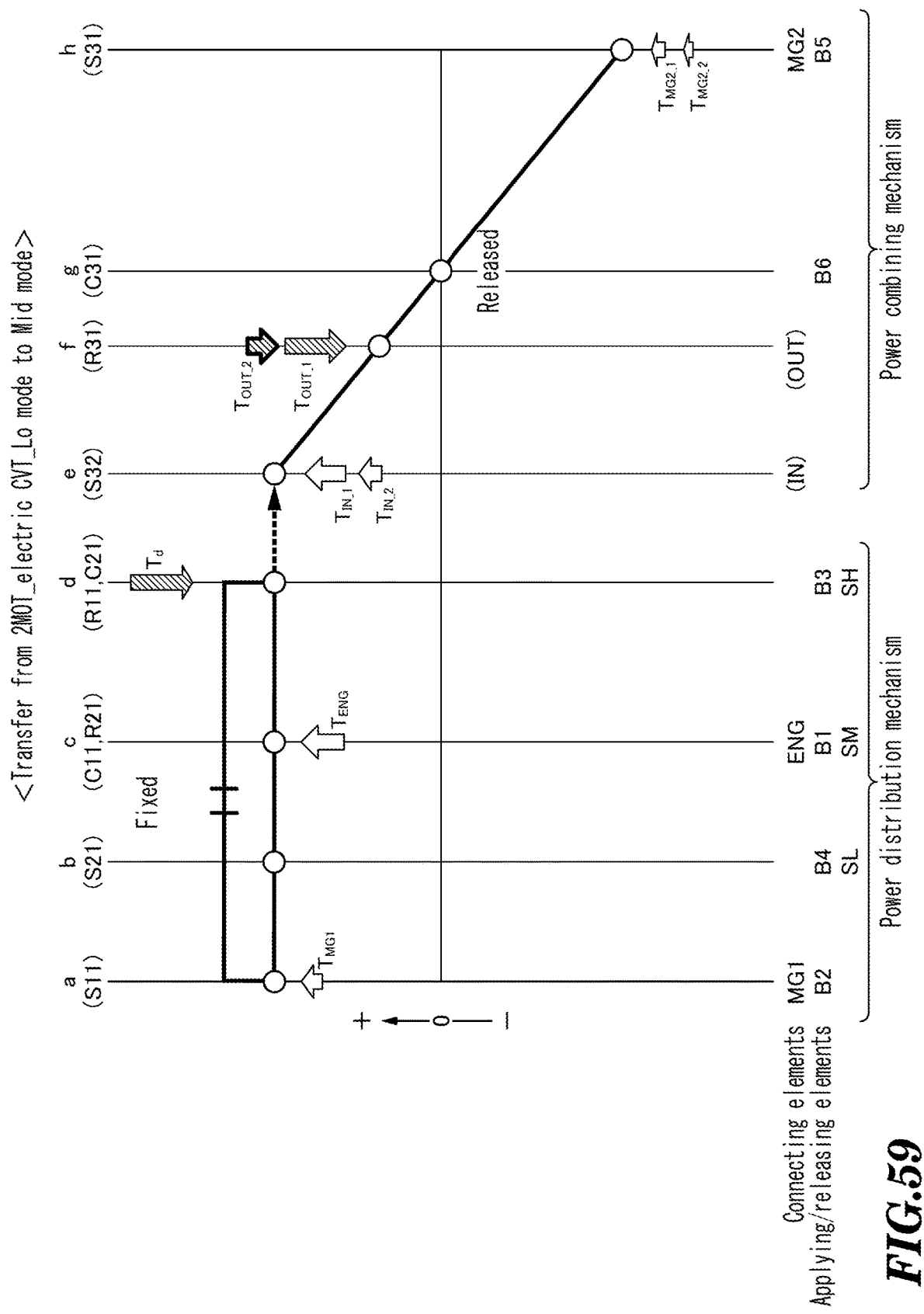
FIG. 59 is a nomographic chart showing a transfer from 2MOT_electric CVT_Lo mode to 2MOT_electric CVT_Mid mode during the driving mode shifting control according to the second embodiment.
Figure 60:
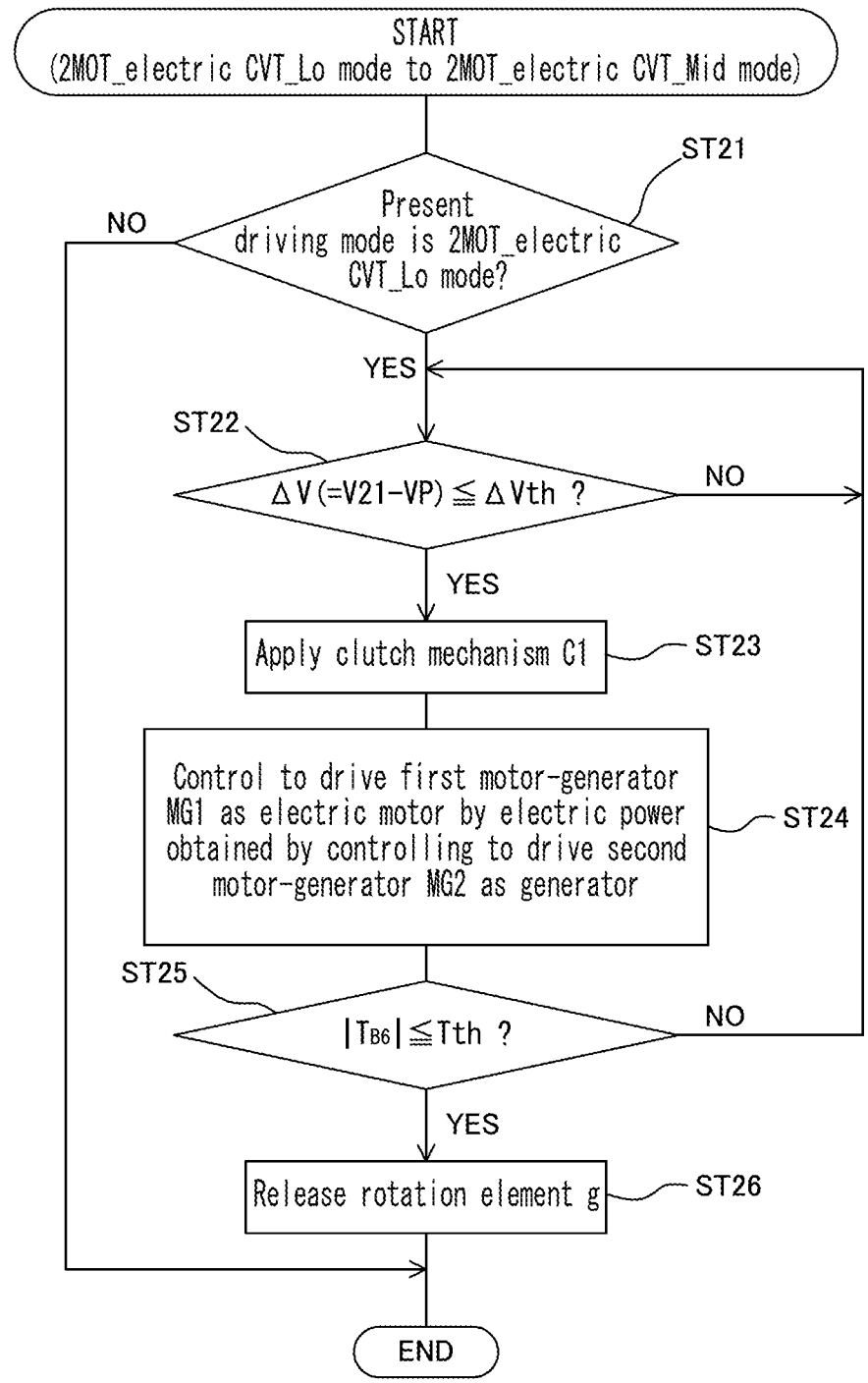
FIG. 60 is a flow chart showing a procedure of executing the driving mode shifting control by the ECU according to the second embodiment.

At a stage of transfer from the 2MOT_electric CVT_Lo mode to the 2MOT_electric CVT_Mid mode shown in FIG. 59, the shift control portion 211 executes the step ST26 shown in FIG. 60. In the step ST26, the shift control portion 211 releases the sixth brake mechanism B6 so as to enable the rotation element g to rotate, whereby the driving mode shifts from the 2MOT_electric CVT_Lo mode to the 2MOT_electrical CVT_Mid mode.

Hereinafter, operation patterns whose speeds are increased in the 2MOT_electric CVT_Mid mode through the driving mode shift control will be described by reference to nomographic charts in FIGS. 61 to 64.

Figure 61:
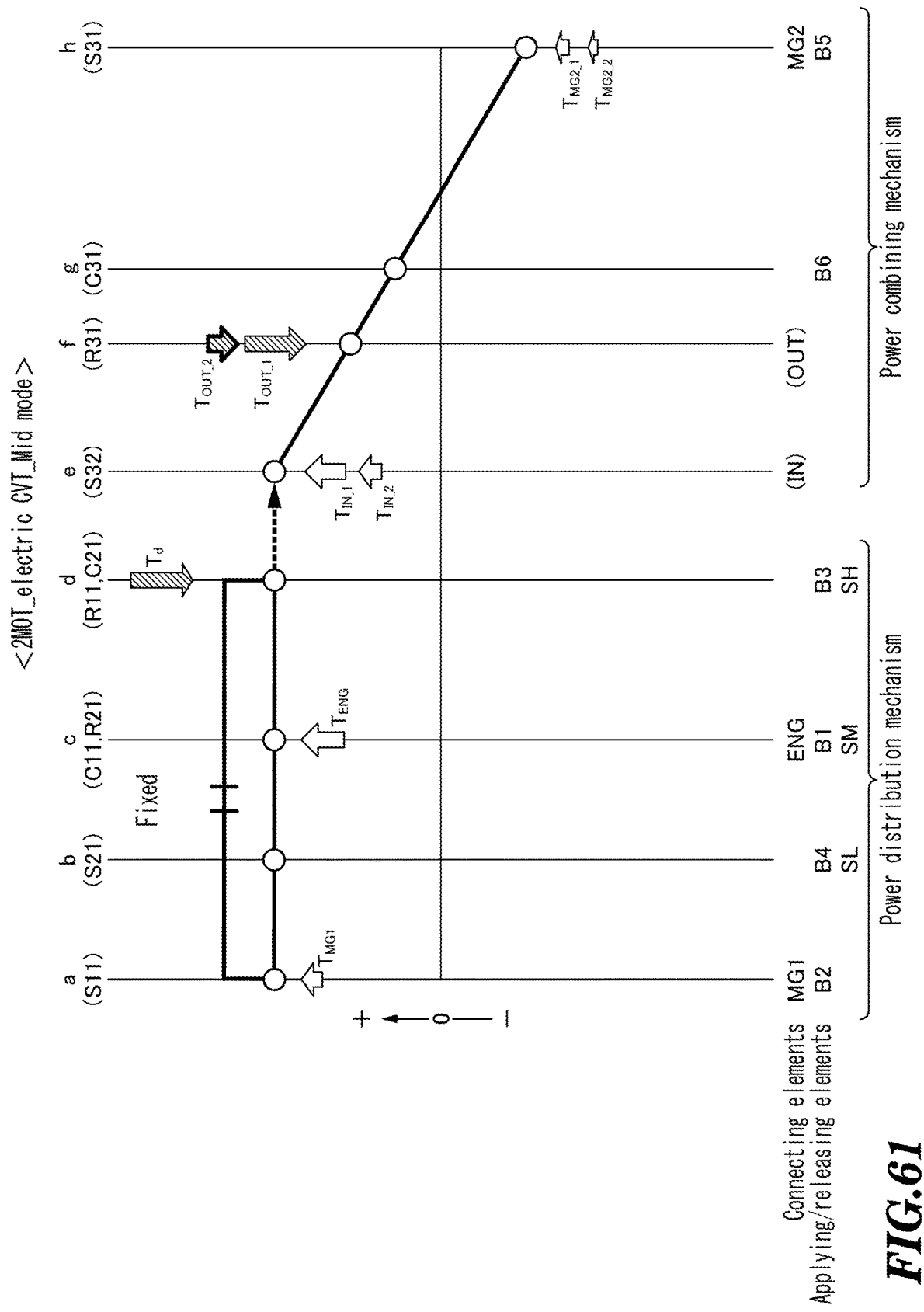
FIG. 61 is a nomographic chart of the 2MOT_electric CVT_Mid mode according to the second embodiment.
Figure 62:
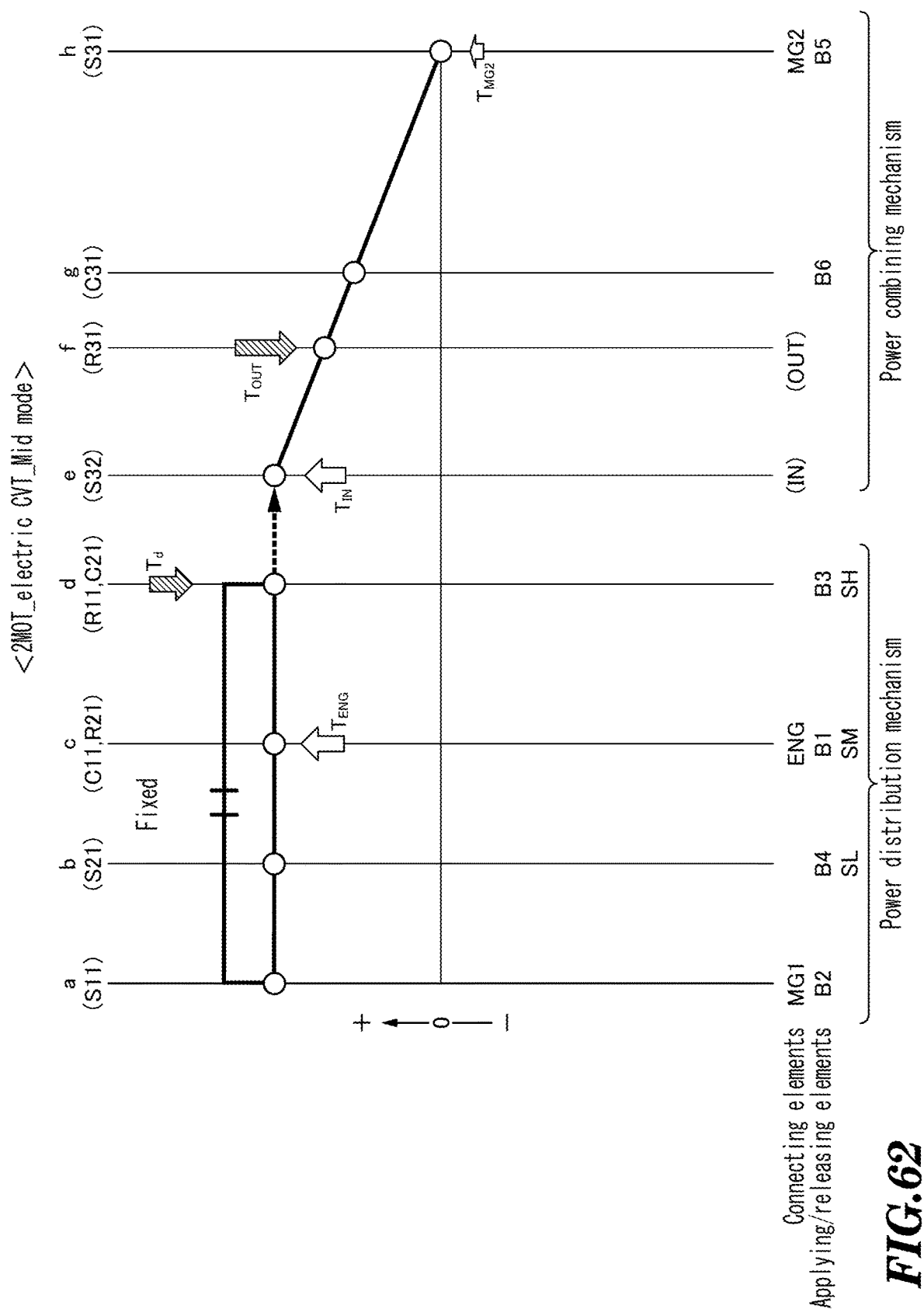
FIG. 62 is a nomographic chart of the 2MOT_electric CVT_Mid mode according to the second embodiment.

As shown in FIG. 61, in the 2MOT_electric CVT_Mid mode, since the rotation element g can rotate, the revolution speed of the output shaft OUT can be increased by increasing the torque TMG1 of the first motor-generator MG1 which is controlled to be driven as the electric motor based on electric power which is generated while reducing the speed of the second motor-generator MG2 which is controlled to be driven as the generator. FIG. 62 shows a state where the speed of the second motor-generator MG2 becomes 0 and the torque TMG1 of the first motor-generate MG1 becomes 0.

Figure 63:
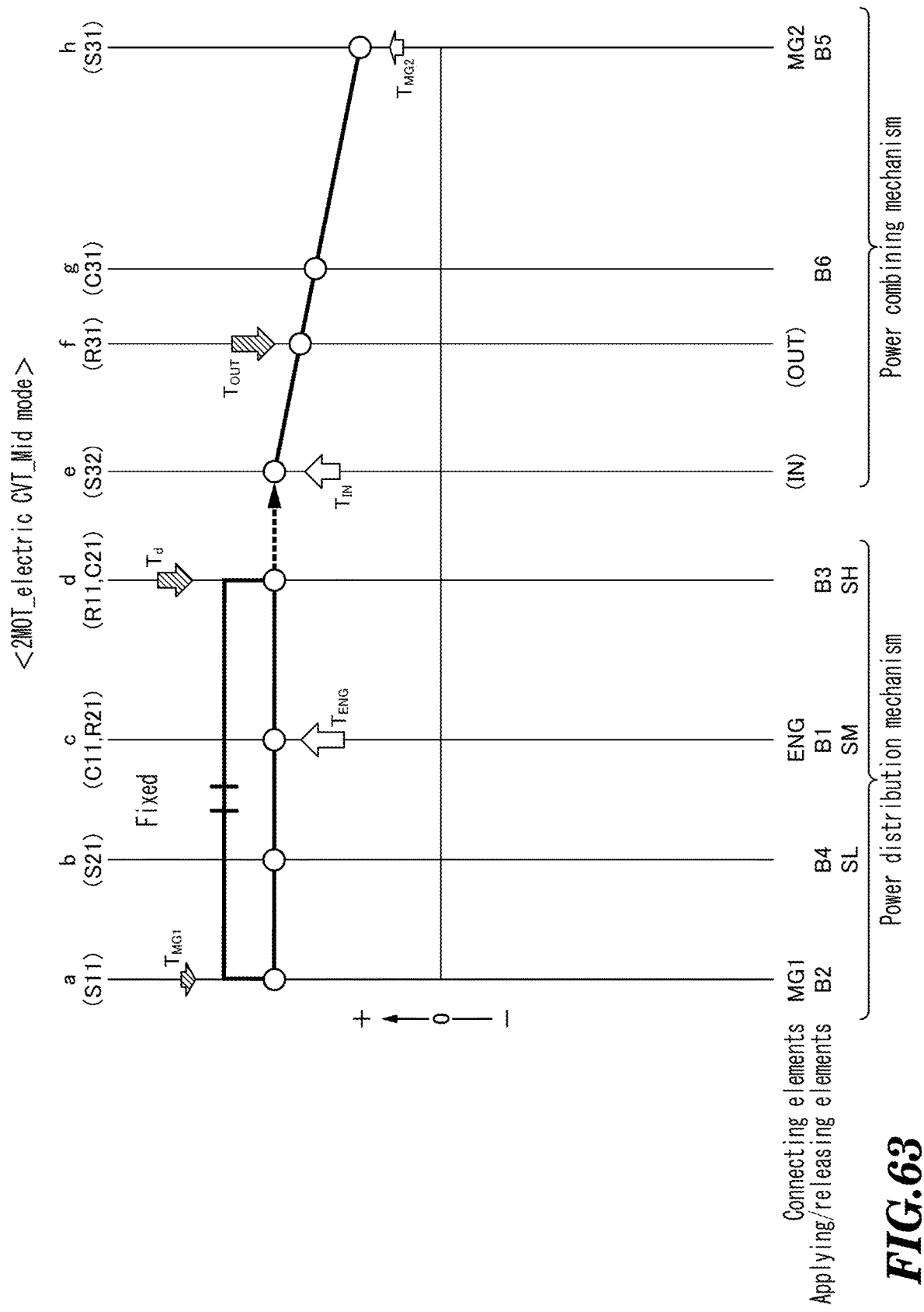
FIG. 63 is a nomographic chart of the 2MOT_electric CVT_Mid mode according to the second embodiment.
Figure 64:
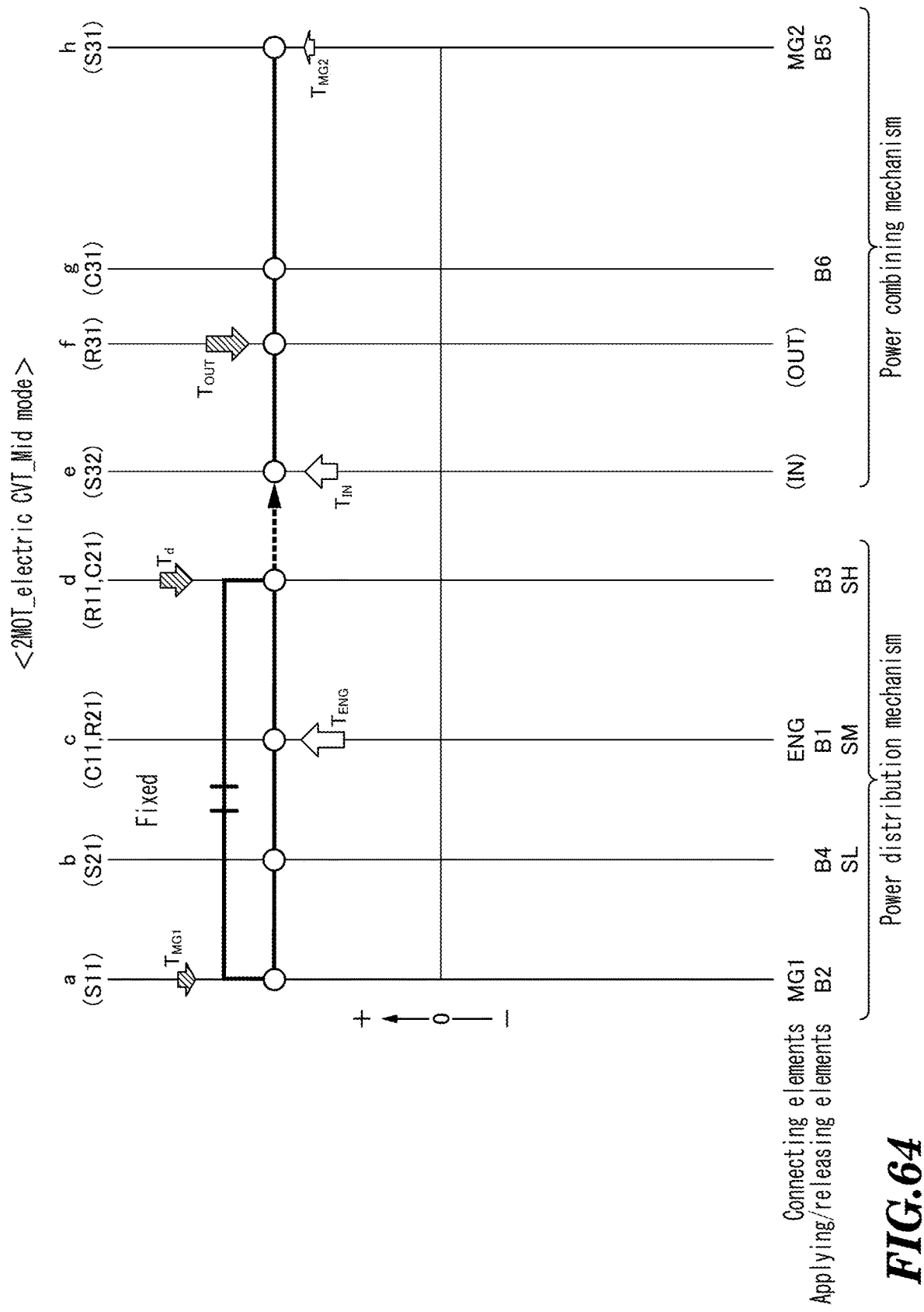
FIG. 64 is a nomographic chart of the 2MOT_electric CVT_Mid mode according to the second embodiment.

From the state shown in FIG. 62, as shown in FIG. 63, when the first motor-generator MG1 is controlled to be driven as the generator and the second motor-generator GM2 is controlled to be driven as the electric motor to increase an electricity generating torque TMG1 of the first motor-generator MG1 and the speed of the second motor-generator MG2, a state shown in FIG. 64 results.

In the driving mode shift control of the embodiment which has been described above, in shifting the driving mode from the 2MOT_electric CVT_Lo mode to the 2MOT_electric CVT_Mid mode, when the vehicle speed comes nearer to the predetermined vehicle speed V21 in the 2MOT_electric CVT_Lo mode, the reaction torque TB6 which is applied to the rotation element g which is fixed by the sixth brake mechanism B6 is brought down towards 0 by engaging the clutch mechanism C1 and controlling to drive the second motor-generator MG2 as the generator while holding the revolution speed of the output shaft OUT, and the sixth brake mechanism B6 is released when the absolute value of the reaction torque TB6 is equal to or smaller than the predetermined threshold Tth. When controlling to drive the second motor-generator MG2, the torque of the output shaft OUT is held by controlling to drive the first motor-generator MG1 as the electric motor. In this way, the revolution speed of the output shaft OUT does not change before and after the mode shifting and the reaction torque TB6 generated in the rotation element g when the rotation element g which is fixed by the sixth brake mechanism B6 is released stays nearer to 0. Therefore, noise or vibration which is generated in shifting from the 2MOT_electric CVT_Lo mode that the driving force characteristic is different to the 2MOT_electric CVT_Mid mode can be reduced further.

Third Embodiment

Next, a power transmission apparatus 100C according to a third embodiment of the invention will be described by reference to FIGS. 65 and 66. However, like reference numerals to those of the first embodiment will be given to configurations common to the first embodiment, whereby the description of the first embodiment will be used.

Figure 65:
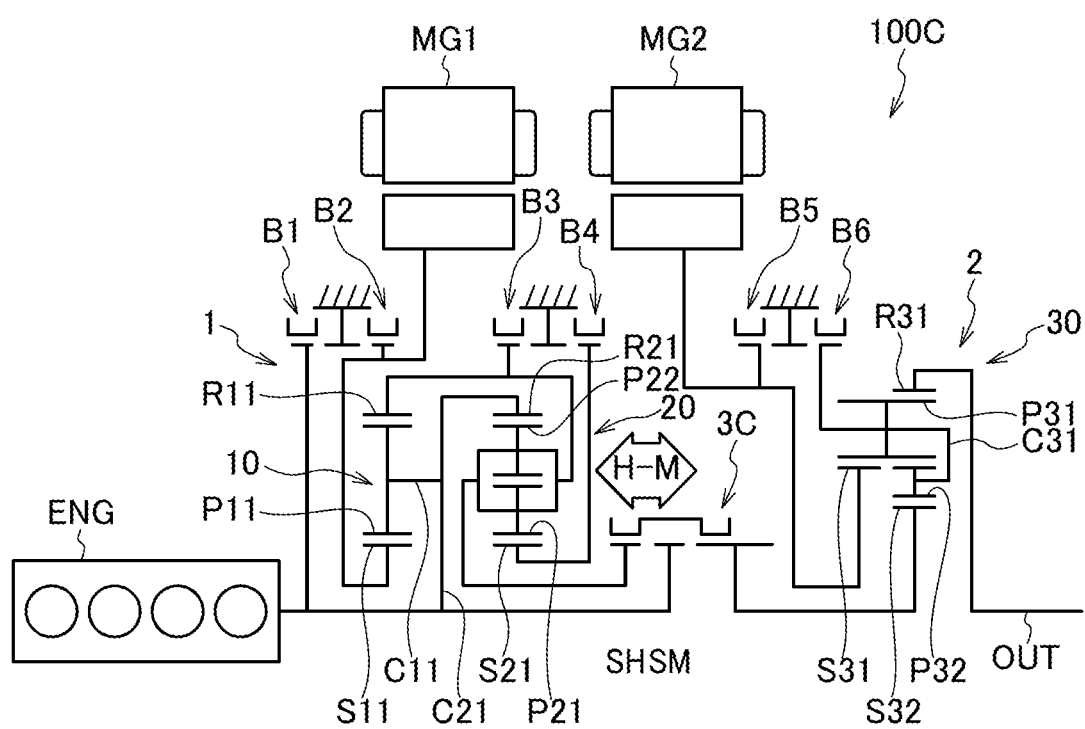
FIG. 65 is a skeleton diagram of a power transfer apparatus according to a third embodiment of the invention.

As shown in FIG. 65, the power transmission apparatus 100C according to the third embodiment of the invention differs from the first embodiment in that a selection mechanism 3C has two selection elements SH and SM with the selection element SL of the selection mechanism 3 of the first embodiment omitted. According to the power transmission apparatus 100C of the third embodiment configured as described above, as shown in FIG. 66, the first gear and the second gear of the fixed gear mode which are realized in the first embodiment cannot be realized. However, the power transmission apparatus 100C of the third embodiment has an advantage that the construction thereof becomes simpler than that of the power transmission apparatus 100 of the first embodiment.

Fourth Embodiment

Next, a power transmission apparatus 100D according to a fourth embodiment of the invention will be described by reference to FIGS. 67 and 68. However, like reference numerals to those of the first embodiment will be given to configurations common to the first embodiment, whereby the description of the first embodiment will be used.

Figure 67:
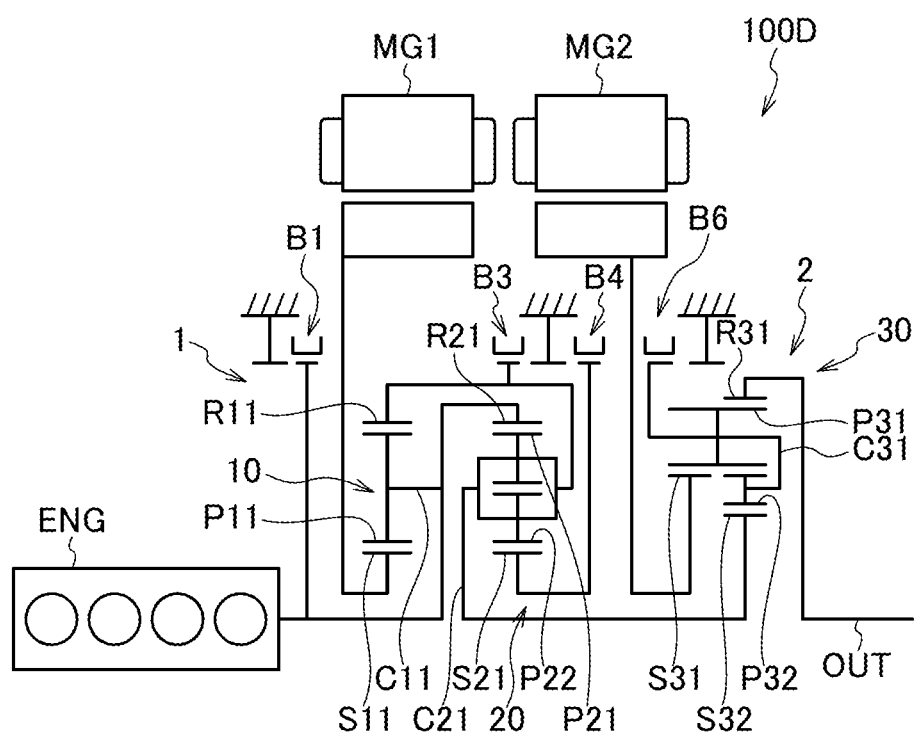
FIG. 67 is a skeleton diagram of a power transfer apparatus according to a fourth embodiment of the invention.

As shown in FIG. 67, the power transmission apparatus 100D according to the fourth embodiment of the invention differs from the first to third embodiments in that the selection mechanism 3 is omitted. According to the power transmission apparatus 100D of the fourth embodiment which is configured as described above, as shown in FIG. 68, the other gears except the sixth gear of the fixed gear mode cannot be realized. However, the power transmission apparatus 100D of the fourth embodiment has an advantage that the construction thereof becomes simpler than those of the power transmission apparatuses 100, 100B, 100C of the first to third embodiments.

Fifth Embodiment

Next, a power transmission apparatus 100E according to a fifth embodiment of the invention will be described by reference to FIGS. 69 and 70. However, like reference numerals to those of the first embodiment will be given to configurations common to the first embodiment, whereby the description of the first embodiment will be used.

Figure 69:
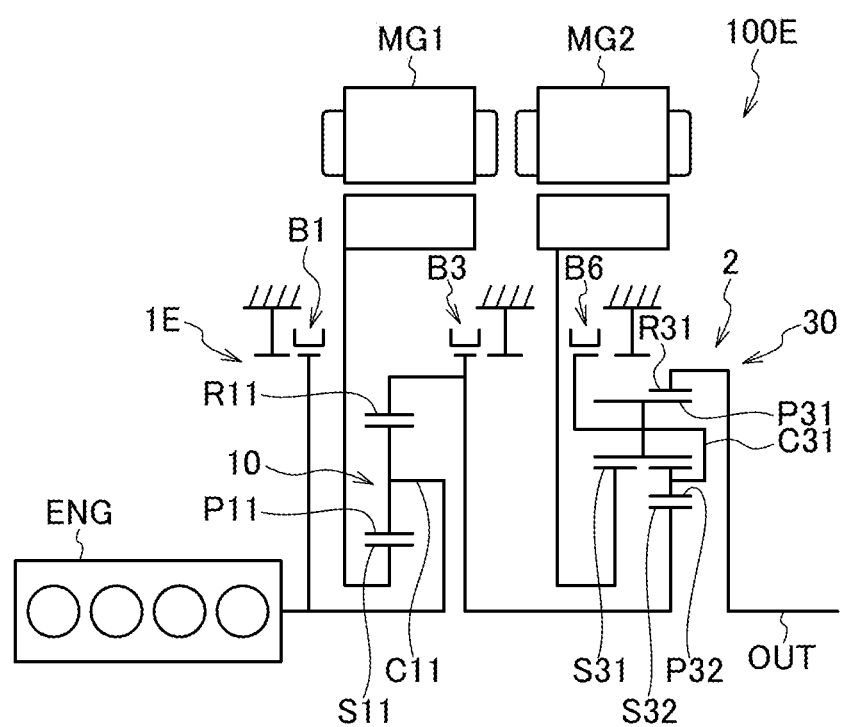
FIG. 69 is a skeleton diagram of a power transfer apparatus according to a fifth embodiment of the invention.

As shown in FIG. 69, the power transmission apparatus 100E according to the fifth embodiment of the invention differs from the first to third embodiments in that the selection mechanism 3 is omitted and differs from the first to fourth embodiments in that a power distribution mechanism 1E is made up of three rotation elements a, c, d. To describe the differences specifically, the power distribution mechanism 1E of the power transmission apparatus 100E of the fifth embodiment is made up of only a single pinion planetary gear mechanism 10, and the rotation element b of the first to fourth embodiments which is made up of the double pinion planetary gear mechanism 20 is omitted. According to the power transmission apparatus 100E of the fifth embodiment which is configured as described above, as shown in FIG. 70, the fixed gear mode cannot be realized. However, the power transmission apparatus 100E of the fifth embodiment has an advantage that the construction thereof becomes simpler than those of the power transmission apparatuses 100, 100B, 100C, 100E of the first to fourth embodiments.

Sixth Embodiment

Next, a power transmission apparatus 100F according to a sixth embodiment of the invention will be described by reference to FIGS. 71 and 72. However, like reference numerals to those of the first embodiment will be given to configurations common to the first embodiment, whereby the description of the first embodiment will be used.

Figure 71:
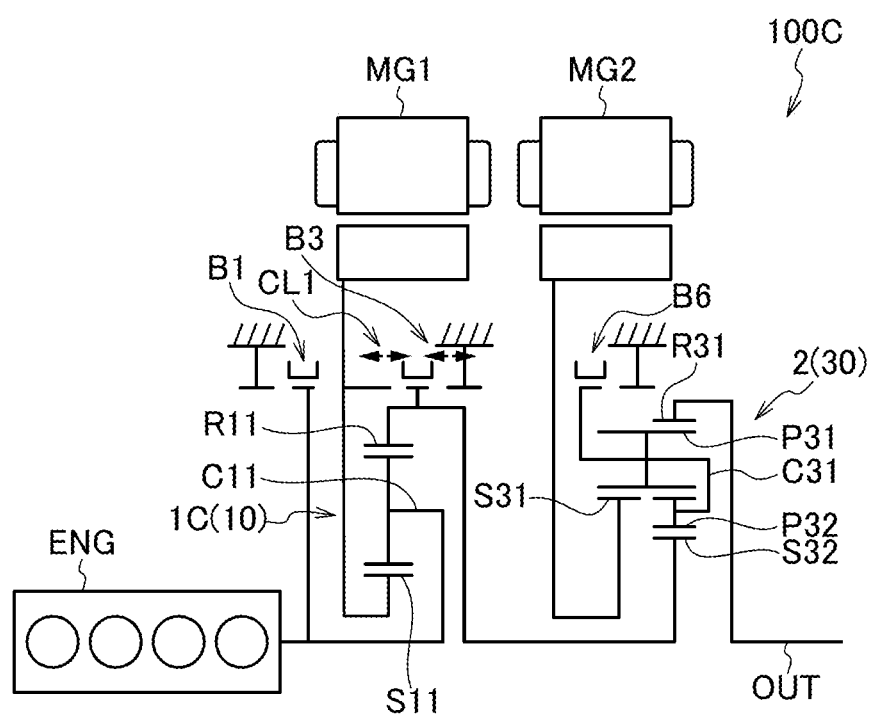
FIG. 71 is a skeleton diagram of a power transfer apparatus according to a sixth embodiment of the invention.

As shown in FIG. 71, the power transmission apparatus 100F according to the sixth embodiment of the invention differs from the first to third embodiments in that the selection mechanism 3 is omitted and differs from the first to fourth embodiments in that a power distribution mechanism 1F is made up of three rotation elements a, c, d. To describe the differences specifically, the power distribution mechanism 1F of the power transmission apparatus 100F of the sixth embodiment is made up of only a single pinion planetary gear mechanism 10, and the rotation element b of the first to fourth embodiments which is made up of the double pinion planetary gear mechanism 20 is omitted. According to the power transmission apparatus 100F of the sixth embodiment which is configured as described above, as shown in FIG. 72, the fixed gear mode cannot be realized. However, the power transmission apparatus 100F of the sixth embodiment has an advantage that the construction thereof becomes simpler than those of the power transmission apparatuses 100, 100B, 100C, 100E of the first to fourth embodiments.

The invention is not limited to the embodiments that have been described heretofore and hence can be modified or improved as required. For example, while the power transmission apparatus is described as being installed on the hybrid electric vehicle, the power transmission apparatus may be installed on an electric vehicle which runs on the power of an electric vehicle.

Modified Example 1

For example, the power combining mechanism 2 may configured so that the rotation element e which is connected to the power distribution mechanism 1, the rotation element f which is connected to the output shaft OUT, the rotation element h which is connected to the second motor-generator MG2 which is the second electric motor, and the rotation element g which is connected to the sixth brake mechanism which is the first fixing mechanism are aligned sequentially in that order on the nomographic chart. Even with the power combining mechanism 2 configured as described above, the power of the first motor-generator MG1 which is connected to the power distribution mechanism 1 is transmitted to the power combining mechanism 2 to be combined with the power of the second motor-generator MG2, thereby making it possible to realize the two motor EV driving mode.

Modified Example 2

The operation table shown in the embodiment described above does not show all the operation patterns that can be realized in the power transmission apparatus 100 of the invention. For example, in the power transmission apparatus 100 including the third brake mechanism B3 which can fix selectively at least one of the rotation element d of the power distribution mechanism 1 which is connected to the power combining mechanism 2 and the rotation element e of the power combining mechanism 2 which is connected to the power distribution mechanism 1 so as not to rotate, the power transmission between the power combining mechanism 2 and the power distribution mechanism 1 is stopped by applying the third brake mechanism B3, whereby the one motor EV driving mode by the second motor-generator MG2 which is the second electric motor can be realized.

Further, a differential speed changer of four elements using a single pinion or a double pinion may be used as a modified example of the power combining mechanism 2.

In addition, the brakes and the clutch which are described to exemplify the fixing mechanisms are not limited to dog mechanisms and hence can be modified or improved as required.

The threshold Tth used in the step ST14 shown in FIG. 51 in the first embodiment and the threshold Tth which is used in the step ST25 shown in FIG. 60 in the second embodiment are described as the values coming nearer to 0. However, the thresholds Tth may be 0. In this case, since the sixth brake mechanism B6 is released in such a state that the reaction torque TB6 is not applied to the rotation element g, noise or vibration which is generated by releasing the sixth brake mechanism B6 when the driving mode is shifted between the modes having the different driving force characteristics can be eliminated completely.

While the invention has been described in detail and by reference to the specific embodiments, it is obvious to those skilled in the art to which the invention pertains that various alterations or modifications can be made thereto without departing from the spirit and scope of the invention.

This patent application is based on Japanese Patent Application (No. 2014-266414) filed on Dec. 26, 2014, Japanese Patent Application (No. 2014-266415) filed on Dec. 26, 2014, Japanese Patent Application (No. 2014-266416) filed on Dec. 26, 2014, and Japanese Patent Application (No. 2014-266417) filed on Dec. 26, 2014, the contents of which are incorporated herein by reference.

DESCRIPTION OF REFERENCE NUMERALS AND CHARACTER

100, 100B, 100C, 100D, 100E, 100F power transmission apparatus
1 power distribution mechanism
2 power combining mechanism
3 selection mechanism (first connection mechanism)
10 planetary gear mechanism (first differential speed changer)
20 planetary gear mechanism (first differential speed changer)
30 planetary gear mechanism (second differential transmission)
40, 40B ECU
101, 201 mode determination portion
103, 203 speed determination portion
105, 207 drive control portion
107, 209 torque determination portion
109, 211 shift control portion
205 connection control portion
ENG engine (internal combustion engine)
MG1 first motor-generator (first electric motor)
MG2 second motor-generator (second electric motor)
OUT output shaft
B1 first brake mechanism (second fixing mechanism)
B2 second brake mechanism (sixth fixing mechanism)
B3 third brake mechanism (fourth fixing mechanism)
B4 fourth brake mechanism (third fixing mechanism)
B5 fifth brake mechanism (fifth fixing mechanism)
B6 sixth brake mechanism (first fixing mechanism)
C1 clutch mechanism (connection mechanism)
a rotation element (rotation element connected to first electric motor)
b rotation element (rotation element connected to third fixing mechanism)
c rotation element (rotation element connected to internal combustion engine)
d rotation element (rotation element connected to power combining mechanism)
e rotation element (rotation element connected to power distribution mechanism)
f rotation element (rotation element connected to output shaft)
g rotation element (rotation element connected to first fixing mechanism)
h rotation element (rotation element connected to second electric motor)

The invention claimed is:

1. A power transmission apparatus, comprising:
an internal combustion engine;
a first electric motor;
a second electric motor;
a power distribution mechanism comprising a first differential transmission which is connected to the internal combustion engine and the first electric motor and in which at least three rotation elements enable to rotate in differential motions to one another;
a power combining mechanism comprising a second differential transmission which is connected to the power distribution mechanism, the second electric motor and an output shaft and in which four rotation elements enable to rotate in differential motions to one another;
a first fixing mechanism which enables to fix selectively one of the rotation elements of the power combining mechanism so as not to rotate; and
a second fixing mechanism which enables to fix selectively a rotation element of the power distribution mechanism which is connected to the internal combustion engine of the power distribution mechanism so as not to rotate, wherein
the power combining mechanism is configured using a Ravigneaux planetary gear mechanism, and
the Ravigneaux planetary gear mechanism has
a rotation element which is connected to the output shaft and includes a first ring gear,
a rotation element which is connected to the first fixing mechanism and includes a first carrier,
a rotation element which is connected to the second electric motor and includes a first sun gear, and
a rotation element which is connected to the power distribution mechanism and includes a second sun gear.

2. The power transmission apparatus according to claim 1, wherein the power distribution mechanism has three rotation elements, and
the power distribution mechanism has
a rotation element which is connected to the first electric motor,
the rotation element which is connected to the internal combustion engine, and
a rotation element which is connected to the power combining mechanism.

3. The power transmission apparatus according to claim 1, wherein the power distribution mechanism has four rotation elements, and
the apparatus comprises a third fixing mechanism which enables to fix selectively the rotation element of the power distribution mechanism which is connected to neither the internal combustion engine nor the first electric motor so as not to rotate.

4. The power transmission apparatus according to claim 3, wherein the power distribution mechanism is configured using a combination of a single pinion planetary gear mechanism and a double pinion planetary gear mechanism, the single pinion planetary gear mechanism has a third sun gear, a second ring gear, and a second carrier, the double pinion planetary gear mechanism has a fourth sun gear, a third ring gear, and a third carrier, and the power distribution mechanism has a rotation element which is connected to the first electric motor and includes the third sun gear, a rotation element which is connected to the third fixing mechanism and includes the fourth sun gear, the rotation element which is connected to the internal combustion engine and includes the third ring gear and the second carrier, and a rotation element which is connected to none of the first electric motor, the third fixing mechanism and the internal combustion engine and includes the second ring gear and the third carrier.

5. The power transmission apparatus according to claim 4, wherein the rotation element which is connected to none of the first electric motor, the third fixing mechanism and the internal combustion engine is connected to the power combining mechanism.

6. The power transmission apparatus according to claim 5, further comprising:

a first connecting mechanism which enables to selectively connect the rotation element of the power combining mechanism which is connected to the power distribution mechanism to at least the rotation element which is connected to none of the first electric motor, the third fixing mechanism and the internal combustion engine in the rotation elements of the power distribution mechanism, and the rotation element which is connected to the internal combustion engine.

7. The power transmission apparatus according to claim 5, further comprising:

a first connecting mechanism which enables to selectively connect the rotation element of the power combining mechanism which is connected to the power distribution mechanism to the rotation element which is connected to none of the first electric motor, the third fixing mechanism and the internal combustion engine in the rotation elements of the power distribution mechanism, the rotation element which is connected to the internal combustion engine, and the rotation element which is connected to the third fixing mechanism.

8. The power transmission apparatus according to claim 1, comprising:

a fourth fixing mechanism which enables to fix selectively at least one of a rotation element of the power distribution mechanism which is connected to the power combining mechanism and the rotation element of the power combining mechanism which is connected to the power distribution mechanism so as not to rotate.

9. The power transmission apparatus according to claim 1, comprising:

a fifth fixing mechanism which enables to fix selectively the rotation element which is connected to the second electric motor so as not to rotate.

10. The power transmission apparatus according to claim 1, comprising:

a sixth fixing mechanism which enables to fix selectively a rotation element which is connected to the first electric motor so as not to rotate.

11. A vehicle comprising the power transmission apparatus according to claim 1.

12. A power transmission control method for the vehicle according to claim 11, wherein the power transmission apparatus has at least a first power combining mode and a second power combining mode which have different driving force characteristics, and the method includes:

a mode determination step of determining whether or not a present power combining mode is the first power combining mode;

a speed determination step of determining whether or not a speed deviation which is a difference between a predetermined speed and a driving speed of the vehicle is equal to or smaller than a first threshold;

a driving control step of controlling to drive at least the second electric motor in an event that it is determined in the mode determination step that the present power combining mode is the first power combining mode and that it is determined in the speed determination step that the speed deviation is equal to or smaller than the first threshold;

a torque determination step of determining whether or not a torque applied to the rotation element which is fixed by the first fixing mechanism is equal to or smaller than a second threshold; and a shifting step of executing a shift from the first power combining mode to the second power combining mode by releasing the rotation element which is fixed by the first fixing mechanism so as to rotate in an event that it is determined in the torque determination step that the torque is equal to or smaller than the second threshold.

13. The power transmission control method according to claim 12, wherein in the driving control step, the second electric motor is controlled to be driven as a generator, and the torque applied to the rotation element which is fixed by the first fixing mechanism is brought down towards 0 while holding a revolution speed of the output shaft.

14. The power transmission control method according to claim 12, wherein a maximum speed of the vehicle in the first power combining mode differs from a maximum speed of the vehicle in the second power combining mode.

15. The power transmission control method according to claim 12, wherein a maximum torque of the output shaft in the first power combining mode differs from a maximum torque of the output shaft in the second power combining mode.

16. The power transmission control method according to claim 12, wherein a maximum speed of the vehicle in the first power combining mode is smaller than a maximum speed of the vehicle in the second power combining mode.

17. The power transmission control method according to claim 12, wherein a maximum torque of the output shaft in the first power combining mode is greater than a maximum torque of the output shaft in the second power combining mode.

18. The power transmission control method apparatus according to claim 12, wherein the power distribution mechanism is configured using a combination of a single pinion planetary gear mechanism and a double pinion planetary gear mechanism, and the single pinion planetary near mechanism has a third sun gear and a second carrier, the double pinion planetary gear mechanism has a fourth sun gear and a third ring gear,
wherein power distribution mechanism has
a rotation element which is connected to the first electric motor and includes the third sun gear,
a rotation element which is connected to the third fixing mechanism includes the fourth sun gear, and
a rotation element which is connected to the internal combustion engine includes the third ring gear and the second carrier.

* * * * *